(12) United States Patent
Sodeyama

(10) Patent No.: US 12,454,062 B2
(45) Date of Patent: Oct. 28, 2025

(54) NURSING CARE ROBOT

(71) Applicant: Sony Group Corporation, Tokyo (JP)

(72) Inventor: Yoshinao Sodeyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 54 days.

(21) Appl. No.: 18/565,642

(22) PCT Filed: Jan. 18, 2022

(86) PCT No.: PCT/JP2022/001667
§ 371 (c)(1),
(2) Date: Nov. 30, 2023

(87) PCT Pub. No.: WO2022/259595
PCT Pub. Date: Dec. 15, 2022

(65) Prior Publication Data
US 2024/0261979 A1    Aug. 8, 2024

(30) Foreign Application Priority Data
Jun. 10, 2021    (JP) .................................. 2021-097442

(51) Int. Cl.
*B25J 5/00*      (2006.01)
*B25J 11/00*     (2006.01)
*B25J 19/02*     (2006.01)

(52) U.S. Cl.
CPC ............. *B25J 11/009* (2013.01); *B25J 5/007* (2013.01); *B25J 19/023* (2013.01)

(58) Field of Classification Search
CPC ........ B25J 11/009; B25J 5/007; B25J 19/023; B25J 5/00; B25J 19/02; B25J 19/021;
(Continued)

(56) References Cited

U.S. PATENT DOCUMENTS 9,579,558 B2 * 2/2017 Desberg ................... B62K 9/00
9,592,603 B2 * 3/2017 Hardouin ............... B25J 13/003
(Continued)

FOREIGN PATENT DOCUMENTS

CN     106422349 A  *  2/2017
EP     3525199 A1   *  8/2019 ............. A63H 3/365
(Continued)

OTHER PUBLICATIONS

International Search Report and Written Opinion mailed on Mar. 22, 2022, received for PCT Application PCT/JP2022/001667, filed on Jan. 18, 2022, 10 pages including English Translation.

*Primary Examiner* — Khoi H Tran
(74) *Attorney, Agent, or Firm* — XSENSUS LLP

(57) ABSTRACT

A nursing care robot according to the present disclosure includes: a head section; a chest section; an arm section mounted on the chest section; a movable neck provided between the head section and the chest section, and having a neck joint axis; a movable shoulder provided between the chest section and the arm section, and having a shoulder joint axis; and a movable hip provided below the chest section, and having a hip joint axis, in which, as viewed from a side direction in a standard posture, the neck joint axis is offset in a backward direction from the shoulder joint axis, and the hip joint axis is offset in a forward direction from the shoulder joint axis.

12 Claims, 42 Drawing Sheets

(58) Field of Classification Search
CPC ........ B25J 19/022; B25J 19/025; B25J 19/04; A63H 11/00
USPC ........................................................ 700/245
See application file for complete search history.

(56) References Cited

U.S. PATENT DOCUMENTS

| | | | | |
|---|---|---|---|---|
| 10,835,188 | B2* | 11/2020 | Otsuka | A61B 5/6896 |
| 10,940,399 | B2* | 3/2021 | McMullen | A63H 3/003 |
| 11,180,205 | B2* | 11/2021 | Amino | B25J 5/007 |
| 11,498,222 | B2* | 11/2022 | Takada | B25J 9/161 |
| 2002/0062178 | A1* | 5/2002 | Takahashi | B62D 57/032 |
| | | | | 700/245 |
| 2005/0228540 | A1* | 10/2005 | Moridaira | A63H 11/00 |
| | | | | 700/245 |
| 2009/0114460 | A1* | 5/2009 | Amino | B62D 57/028 |
| | | | | 901/1 |
| 2013/0204436 | A1* | 8/2013 | Kim | G06F 17/00 |
| | | | | 901/47 |
| 2014/0039675 | A1* | 2/2014 | Ead | G06N 3/008 |
| | | | | 700/245 |
| 2018/0370032 | A1* | 12/2018 | Ichikawa | B25J 11/0015 |
| 2024/0091964 | A1* | 3/2024 | Smith | B25J 19/02 |
| 2024/0092133 | A1* | 3/2024 | Mitsuyama | B60G 17/016 |
| 2025/0107755 | A1* | 4/2025 | Fukushima | B25J 13/081 |

FOREIGN PATENT DOCUMENTS

| | | |
|---|---|---|
| JP | 2002-307338 A | 10/2002 |
| JP | 2011-101918 A | 5/2011 |
| JP | 2018-124399 A | 8/2018 |
| JP | 2019-055463 A | 4/2019 |
| JP | 2019-089197 A | 6/2019 |
| JP | 2019-130610 A | 8/2019 |
| JP | 6588624 B2 | 10/2019 |
| WO | 2009/125648 A1 | 10/2009 |

* cited by examiner

FIG. 12

| | | BEST VALUE | BEST RATIO BASED ON L1 AS 1 | ALLOWABLE RATIO RANGE BASED ON L1 AS 1 |
|---|---|---|---|---|
| FRONT-BACK OFFSET DISTANCE BETWEEN HIP AND SHOULDER | L1 | 18.8 mm | 1 | — |
| FRONT-BACK OFFSET DISTANCE BETWEEN SHOULDER AND NECK | L2 | 12.6 mm | L2/L1 = 0.67 | 0 < L2/L1 < 1.5 |
| FRONT-BACK DISTANCE BETWEEN BASE CENTER AND HIP CENTER | L3 | 17 mm | L3/L1 = 0.90 | 0 < L3/L1 < 1.5 |
| UP-DOWN DISTANCE BETWEEN HIP AND SHOULDER | L4 | 201.2 mm | L4/L1 = 10.70 | 8.0 < L4/L1 < 12.0 |
| | | | BEST RATIO BASED ON L4 AS 1 | ALLOWABLE RATIO RANGE BASED ON L4 AS 1 |
| UP-DOWN DISTANCE BETWEEN HIP AND SHOULDER | L4 | 201.2 mm | 1 | — |
| UP-DOWN DISTANCE BETWEEN SHOULDER AND NECK | L5 | 95.8 mm | L5/L4 = 0.48 | 0.2 < L5/L4 < 0.6 |

FIG. 13

| | | BEST VALUE | BEST RATIO BASED ON L6 AS 1 | ALLOWABLE RATIO RANGE BASED ON L6 AS 1 |
|---|---|---|---|---|
| WHOLE, HEAD-BODY PROPORTION | VERTICAL HEAD WIDTH (TOTAL HEAD HEIGHT) | L6 | 212 mm | 1 | — |
| | UP-DOWN DISTANCE BETWEEN SHOULDER AND NECK | L5 | 95.8 mm | L5/L6 = 0.45 | 0.3 < L5/L6 < 0.6 |
| | HEAD TOP HEIGHT (BODY HEIGHT) | L7 | 812 mm | L7/L6 = 3.83 | 3.3 < L7/L6 < 5.0 |
| | HORIZONTAL HEAD WIDTH | L8 | 225 mm | L8/L6 = 1.06 | 1.0 ≤ L8/L6 < 1.3 |
| | FRONT-TO-BACK HEAD WIDTH | L9 | 228 mm | L9/L6 = 1.08 | 1.0 ≤ L9/L6 < 1.5 |
| | DISTANCE BETWEEN CENTERS OF SHOULDER JOINTS | L10 | 212 mm | L10/L6 = 1.00 | 0.8 < L10/L6 < 1.2 |
| | SHOULDER WIDTH | L11 | 296 mm | L11/L6 = 1.40 | 1.2 < L11/L6 < 1.6 |
| | HORIZONTAL BASE WIDTH | L12 | 433 mm | L12/L6 = 2.04 | 1.5 < L12/L6 < 2.5 |
| | FRONT-TO-BACK BASE WIDTH | L13 | 400 mm | L13/L6 = 1.89 | 1.5 < L13/L6 < 2.5 |
| | DISTANCE BETWEEN CENTERS OF CIRCUMFERENCES OF SPHERICAL SECTIONS | L14 | 93 mm | L14/L6 = 0.44 | 0.35 < L14/L6 < 0.55 |
| | UP-DOWN DISTANCE BETWEEN CENTER OF EYEBALL AND BOTTOM OF CHIN | L17 | 72.8 mm | L17/L6 = 0.34 | 0.2 < L17/L6 < 0.5 |
| | | | | BEST RATIO BASED ON L14 AS 1 | ALLOWABLE RATIO RANGE BASED ON L14 AS 1 |
| EYE | DISTANCE BETWEEN CENTERS OF EYEBALLS | L15 | 85 mm | L15/L14 = 0.91 | 0.8 < L15/L14 < 1 |
| | DIAMETER OF CIRCUMFERENCE OF EYEBALL SECTION | L16 | 34 mm | L16/L14 = 0.37 | 0.3 < L16/L14 < 0.5 |

FIG. 14

| | | | BEST VALUE | BEST RATIO BASED ON L17 AS 1 | ALLOWABLE RATIO RANGE BASED ON L17 AS 1 |
|---|---|---|---|---|---|
| NECK, SHOULDER | UP-DOWN DISTANCE BETWEEN CENTER OF EYEBALL AND BOTTOM OF CHIN | L17 | 72.8 mm | 1 | — |
| | UP-DOWN DISTANCE BETWEEN CENTER OF EYEBALL AND CENTER OF SHOULDER | L18 | 137.3 mm | L18/L17 = 1.89 | 1.3 < L18/L17 < 2.5 |
| | UP-DOWN DISTANCE BETWEEN CENTER OF EYEBALL AND CENTER OF NECK | L19 | 41.6 mm | L19/L17 = 0.57 | 0.4 < L19/L17 < 1.0 |
| | DIAMETER OF SHOULDER JOINT | L20 | 84 mm | L20/L17 = 1.15 | 0.7 < L20/L17 < 1.5 |
| | DISTANCE BETWEEN CENTER OF NECK AND FACE FRONT SURFACE SECTION | L21 | 120.9 mm | L21/L17 = 1.66 | 1.4 < L21/L17 < 1.8 |
| | DISTANCE BETWEEN CENTER OF NECK AND CHEST FRONT SURFACE SECTION | L22 | 124.4 mm | L22/L17 = 1.71 | 1.4 < L22/L17 < 1.8 |
| | | | | BEST RATIO BASED ON L21 AS 1 | ALLOWABLE RATIO RANGE BASED ON L21 AS 1 |
| EYE | DISTANCE BETWEEN CENTER OF NECK AND CHEST FRONT SURFACE SECTION | L22 | 124.4 mm | L22/L21 = 1.03 | 1 < L22/L21 < 1.3 |

FIG. 15

| | | | |
|---|---|---|---|
| [ARM] | | | |
| SP | SHOULDER PITCH | −35 TO +135deg | (EXTENSION DIRECTION (DIRECTION OF RAISING ARM FORWARD IS +) |
| SR | SHOULDER ROLL | +7 TO +135deg | (+ IN ABDUCTION DIRECTION (DIRECTION OF RAISING ARM OUTWARD) |
| SY | SHOULDER YAW | −50 TO +90deg | (ADDUCTION DIRECTION (DIRECTION OF APPLYING FORCE IN ARM-WRESTLING IS +) |
| EP | ELBOW PITCH | 0 TO +100deg | (FLEXION DIRECTION IS +) |
| WP | WRIST PITCH | −75 TO +50deg | (DIRECTION OF RAISING WRIST UPWARD IS +) |
| WY | WRIST YAW | −90 TO +90deg | |
| HA | HAND | −7 TO +100deg | (SIDE WHERE FINGERS ARE OPEN IS +) |
| [NECK] | | | |
| NR | NECK ROLL | −13 TO +13deg | |
| NP | NECK PITCH | −14 TO +50deg | (UPWARD DIRECTION IS +) |
| NY | NECK YAW | −43 TO +43deg | |
| [WAIST] | | | |
| TP | HIP PITCH | −25 TO +15deg | (UPWARD DIRECTION (SIDE WHERE BACK IS ARCHED) IS +) |

FIG. 26

| USER No. 1: t1-1 APPLICATION ||||| 
|---|---|---|---|---|
| POSITION | GAZE TIME | SPEECH TIME | SMILE | UNWILLINGNESS |
| P1 | 10s | — | — | — |
| P2 | 20s | 2s | Good | — |
| P3 | 90s | 10s | Good | — |

FIG. 27

| START TIME | APPLICATION TO BE IMPLEMENTED | OBJECT PERSON AND IMPLEMENTATION ORDER |
|---|---|---|
| 6:30 | GREETING/CALMING DOWN + VITAL | LIVING SEAT NO. 1, 2, 6, 9, 10 |
| 7:30 | EXCRETION ASSISTANCE | STANDBY FOR REQUEST |
| 8:30 | GREETING/CALMING DOWN + VITAL | LIVING SEAT NO. 1, 2, 6, 9, 10 |
| 10:30 | TEA SERVING + VITAL | LIVING SEAT NO. 1, 2, 6, 7, 9, 10 |
| 13:30 | GREETING/CALMING DOWN + VITAL | LIVING SEAT NO. 1, 2, 9, 10 |
| 15:30 | TEA SERVING + VITAL | LIVING SEAT NO. 1, 2, 9, 10 |
| 16:30 | GREETING/CALMING DOWN + VITAL | LIVING SEAT NO. 1, 2, 6, 9, 10 |
| 18:30 | GREETING/CALMING DOWN + VITAL | LIVING SEAT NO. 1, 2, 6, 7, 9, 10 |
| 20:00 | EXCRETION ASSISTANCE | STANDBY FOR REQUEST |
| 21:00 | NIGHT WATCHING + VITAL | RESIDENCE ROOM NO. 1, 2, 6, 7, 9, 10 |
| 22:00 | NIGHT WATCHING + VITAL | RESIDENCE ROOM NO. 1, 2, 6 |
| 23:00 | NIGHT WATCHING + VITAL | RESIDENCE ROOM NO. 1, 2, 6, 7, 9, 10 |
| 0:00 | NIGHT WATCHING + VITAL | RESIDENCE ROOM NO. 1, 2, 6 |
| 1:00 | NIGHT WATCHING + VITAL | RESIDENCE ROOM NO. 1, 2, 6, 7, 9, 10 |
| 2:00 | NIGHT WATCHING + VITAL | RESIDENCE ROOM NO. 1, 2, 6 |
| 3:00 | NIGHT WATCHING + VITAL | RESIDENCE ROOM NO. 1, 2, 6, 7, 9, 10 |
| 4:00 | NIGHT WATCHING + VITAL | RESIDENCE ROOM NO. 1, 2, 6 |
| 5:00 | NIGHT WATCHING + VITAL | RESIDENCE ROOM NO. 1, 2, 6, 7, 9, 10 |

FIG. 31

| ROBOT OPERATION SCHEDULE SETTING | | | | | | |
|---|---|---|---|---|---|---|
| SHIFT-SCHEDULAR | | | | | | |
| | | 6:10,22:30 CLOCK | 22 TO 0 O CLOCK | | | |
| | 6 | 10 | 14 | 18 | | |
| APPLICATION LIST | 7 | 11 | 15 | 19 | | |
| TEA SERVING | 8 | 12 | 16 | 20 | | |
| SNACK SERVING | | | | | | |
| MEAL TIME SERVING | 9 | 13 | 17 | 22 | | |
| RECREATION | | | | | | |
| | RETURN | | EDIT | | CONFIRM | |

FIG. 37

S371
- STAFF MEMBER A NEEDS TO TIMELY SERVE SNACK TO USER WHO HAS WOKEN UP AND COME TO LIVING ROOM DURING WAKE-UP ASSISTANCE IN RESIDENCE ROOM, AND HAS HIGH WORKLOAD
- IN LIVING ROOM, RIGHT AFTER WAKING UP FROM NAP, ELDERLY WOMAN LOOKS BORED. IN ADDITION, ELDERLY WOMAN DOES NOT LIKE NEW SNACK; THEREFORE, SHE IS NOT POSITIVE ABOUT HAVING SNACK.

S372
WHEN ELDERLY WOMAN IS SEATED, NURSING CARE ROBOT GOES TO PICK UP SNACK FOR ELDERLY WOMAN.

S373
NURSING CARE ROBOT SERVES SNACK WHILE TALKING WITH ELDERLY WOMAN AND ENCOURAGES ELDERLY WOMAN TO HAVE SNACK

TODAY'S SNACK IS A STRAWBERRY DESSERT, AND STRAWBERRY IS HIGH IN VITAMIN C! PLEASE TRY IT, YOU WILL GET ENERGY!

S374
I'M HAPPY THAT YOU ATE A LOT

- WORKLOAD OF STAFF MEMBER A IS REDUCED.
- ELDERLY WOMAN FORGETS BOREDOM AND HAS POSITIVELY EATEN UP NEW SNACK.

NURSING CARE ROBOT

CROSS-REFERENCE TO RELATED APPLICATIONS

The present application is based on PCT filing PCT/JP2022/001667, filed Jan. 18, 2022, which claims priority from Japanese Patent Application No. 2021-097442, filed Jun. 10, 2021, the entire contents of each are incorporated herein by reference.

TECHNICAL FIELD

The present disclosure relates to a nursing care robot.

BACKGROUND ART

There are robots having a plurality of joint axes for industrial use (see PTLs 1 and 2). Meanwhile, development is desired of a nursing care robot that assists nursing care of an elderly person with dementia as a care-receiving object person in, for example, a nursing facility such as a nursing home.

CITATION LIST

Patent Literature

PTL 1: Japanese Unexamined Patent Application Publication No. 2011-101918
PTL 2: International Publication No. WO2009/125648

SUMMARY OF THE INVENTION

Specifically, in a case where an elderly person with dementia or the like is a care-receiving object person, a nursing care robot is desired to have a configuration having high acceptability for the object person.

It is desirable to provide a nursing care robot that makes it possible to enhance acceptability for a care-receiving object person.

A nursing care robot according to an embodiment of the present disclosure includes: a head section; a chest section; an arm section mounted on the chest section; a movable neck provided between the head section and the chest section, and having a neck joint axis; a movable shoulder provided between the chest section and the arm section, and having a shoulder joint axis; and a movable hip provided below the chest section, and having a hip joint axis, in which, as viewed from a side direction in a standard posture, the neck joint axis is offset in a backward direction from the shoulder joint axis, and the hip joint axis is offset in a forward direction from the shoulder joint axis.

In the nursing care robot according to the embodiment of the present disclosure, as viewed from the side direction in the standard posture, the neck joint axis is offset in the backward direction from the shoulder joint axis, and the hip joint axis is offset in the forward direction from the shoulder joint axis.

BRIEF DESCRIPTION OF DRAWINGS

FIG. 12 is an explanatory diagram illustrating an example of dimensions of respective parts of the nursing care robot according to the first embodiment.

FIG. 13 is an explanatory diagram illustrating an example of dimensions of respective parts of the nursing care robot according to the first embodiment.

FIG. 14 is an explanatory diagram illustrating an example of dimensions of respective parts of the nursing care robot according to the first embodiment.

FIG. 15 is an explanatory diagram illustrating an example of movable ranges of joint axes of respective parts of the nursing care robot according to the first embodiment.

FIG. 26 is an explanatory diagram illustrating an example of an evaluation data output result by the "greeting/calming down-vital measurement application" by the robot operating system according to the first embodiment.

FIG. 27 is an explanatory diagram illustrating a creation example of an implementation schedule of a plurality of applications by the robot operating system according to the first embodiment.

FIG. 31 is an explanatory diagram illustrating an example of a setting interface of an implementation schedule of applications by the robot operating system according to the first embodiment.

FIG. 37 is an explanatory diagram illustrating a working example of a "snack serving application" by the robot operating system according to the first embodiment.

MODES FOR CARRYING OUT THE INVENTION

Figure 1:
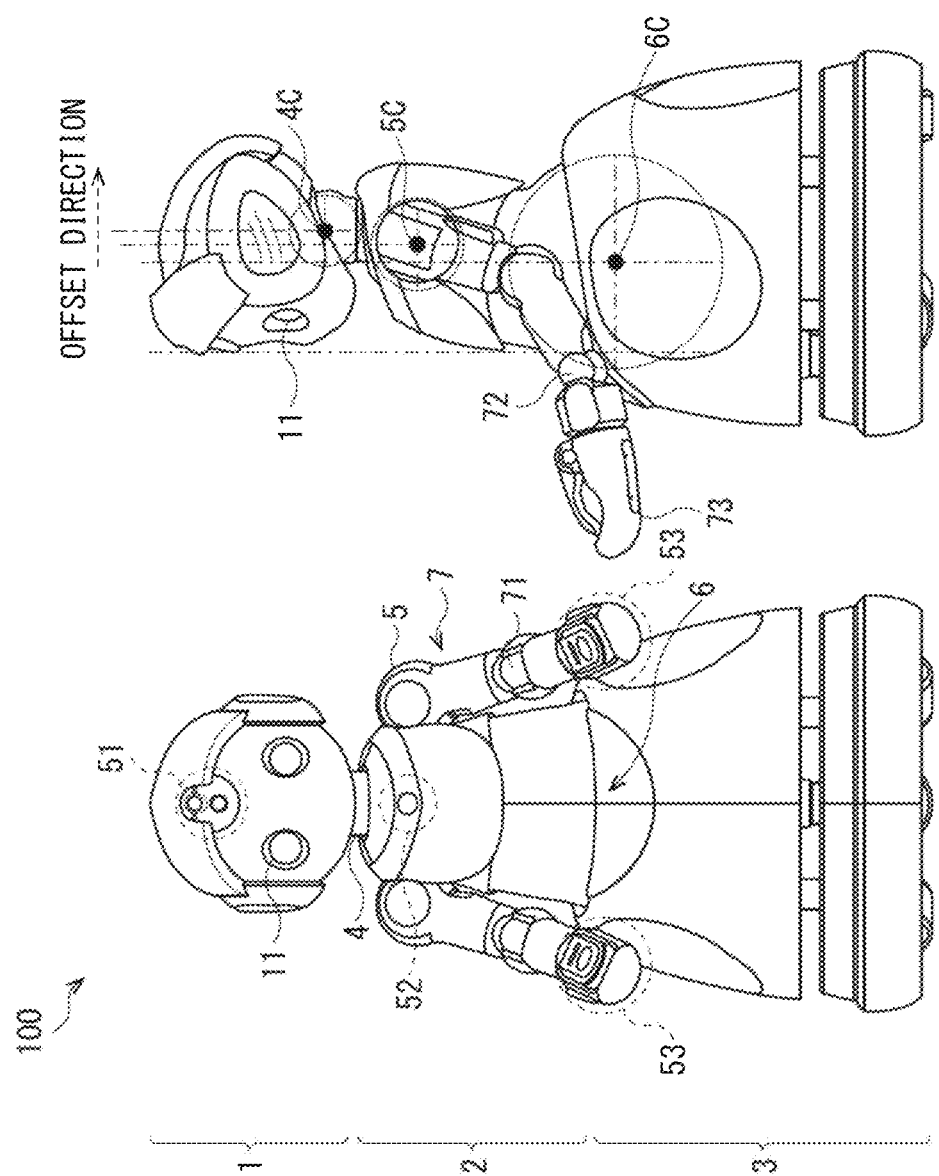
FIG. 1 is an appearance diagram illustrating an example of appearance as viewed from a front direction and a side direction of a nursing care robot according to a first embodiment of the present disclosure.

Some embodiments of the present disclosure are described below in detail with reference to the drawings. It is to be noted that description is given in the following order.
0. Comparative Example
1. First Embodiment
 1.1 Configuration Example of Nursing Care Robot (FIGS. 1 to 20)
 1.2 Workings and Effects of Nursing Care Robot
 1.3 Configuration Example and Operation Example of Robot Operating System (FIGS. 21 to 43)
 1.4 Workings and Effects of Robot Operating System
2. Other Embodiments 0. Comparative Example (Configuration Desired for Nursing Care Robot)

In a nursing facility such as a nursing home, an object person with dementia may become anxious in staff absence time and waiting time of the care-receiving object person in a living room that are caused by a manpower shortage. Examples of becoming anxious include becoming restless, feeling lonely, getting angry, and the like. As a result of becoming anxious, a possibility of injury due to sudden standing or the like, or life rhythm disturbance may occur. This also leads to an increase in level of nursing care needed, which increases care needs. It is necessary to deal in parallel with private room care, and the level of difficulty in dealing is high, and a burden on a staff member is also high. As a watching device in a nursing facility, there are existing passive watching sensors (such as a fixed point camera and a bed sensor); however, in a case where a fall or the like occurs, it is only possible to make a report after the fall or the like, and it is difficult to detect that the care-receiving object person has become anxious. Many care-receiving object persons and their families are unwilling to use surveillance camera sensors, and acceptability from care-receiving object persons is low.

There is also an example of use of an existing robot (such as a single-arm mobile manipulator) for nursing care. However, in a case where the shape of such a robot is too large or too small, acceptability from elderly persons with dementia is low, which results in the robot not being recognized as an interaction partner. In a case where the robot differs from a human in positions and motion ranges of joint axes, it is difficult to understand what the robot is doing, which causes an issue that the robot gives a sense of fear or does not establish communication. In addition, a table-size robot is small; therefore, there is a less possibility that the robot is feared. However, the table-size robot is not able to autonomously move between users, and applications thereof are limited.

In joint axis configurations in typical industrial vertical articulated robot manipulators and human-type robots, with importance placed mainly on controllability and driving efficiency, axis configurations are laid out on the same axis without being offset. Controllability and driving efficiency as a robot arm are increased; however, joint axes of an actual human body are not disposed on the same axis. In a case where a robot is caused to have appearance resembling a human in order to enhance acceptability, the robot does not have a natural form, which decreases acceptability. Alternatively, even if all joint axes are disposed on the same axis, it is possible to have a natural posture by having, for example, a configuration of a multi-degree-of-freedom robot such as a human cervical spine and a human lumbar spine; however, the number of degrees of freedom increases to thereby make a system complicated more than necessary, which is disadvantageous.

It is therefore desirable to develop a nursing care robot that makes it possible to enhance acceptability for a care-receiving object person.

(About Operation of Nursing Care Robot)

As described above, the existing passive watching sensors have low acceptability to the care-receiving object person. Even if a sensor or a camera, and a speaker or the like that are mounted in a living environment are used to speak to the care-receiving object person, many object persons have difficulty in sound source localization, and it is difficult to establish communication.

There are some facilities in which, as a means of preventing care-receiving object persons from becoming anxious, a television is set up in a living room for viewing; however, an optimum viewing position differs among the object persons, and due to differences in hearing and cognitive characteristics, a situation is not such that all the persons watch the television with satisfaction. Placing individual monitors on respective desks may be a solution; however, power supply management and wiring installation cost are necessary, and cost is not low. For example, many nursing homes having unit-type private rooms operate a common facility's living room that serves as a daily living space that makes object persons feel like staying at home or serves the purpose of not loosing connection with other people and society; therefore, acceptability of all persons always watching individual monitors is low.

As described above, a robot such as a single-arm mobile manipulator has low acceptability from elderly persons with dementia, which results in difficulty in recognizing the robot as an interaction partner. In addition, a table-size robot is small; therefore, there is a less possibility that the robot is feared. However, the table-size robot is not able to autonomously move between care-receiving object persons, and applications thereof are limited. In a case where one robot is provided for each object person, charging management and movement/arrangement are frequent, and system management man-hours are large. As a result, installation cost is also high.

In addition, a mobile platform type robot or a robot having the form of an industrial robot manipulator differs from a human in positions and motion ranges of joint axes, and it is difficult to understand what the robot is doing, which causes issues that the robot gives a sense of fear to the object person, and that it is difficult to establish communication. An action plan with importance placed on efficiency of time and distance is mainly adopted also as an approach to a destination, and acceptability from the care-receiving object person is not considered.

As a vital measurement application, there are needs for measuring a body temperature, a heart rate, a blood pressure, and oxygen saturation, and there are various measuring instruments; however, a shortage of staff man-hours results in a situation in which it is difficult to perform measurement with high frequency, and a need for automation is high. Automation is necessary specifically for body temperature measurement as an infection prevention measure, and the need for automation is high.

Automatic measurement is also possible by mounting a contactless vital sensor on an indoor wall surface or a ceiling; however, it is difficult to perform sensing at an optimum measurement position for each care-receiving object person, and measurement accuracy is low. Automatic measurement by a wearable vital sensor is also possible; however, power supply management and wearing state management for the number of wearable vital sensors for respective object persons are frequent, and system management man-hours are large. Many care-receiving object persons feel discomfort with a wearing article such as a watch and an accessory and take off or bump the wearing article, and acceptability is low. A small sensor or the like imitating a button for clothes may be a solution; however, individual management man-hours are similarly large.

It is therefore desirable to develop a robot operating system that makes it possible to enhance acceptability of a nursing care robot for the care-receiving object person.

1. First Embodiment

[1.1 Configuration Example of Nursing Care Robot]

(Overview of Nursing Care Robot)

Figure 2:
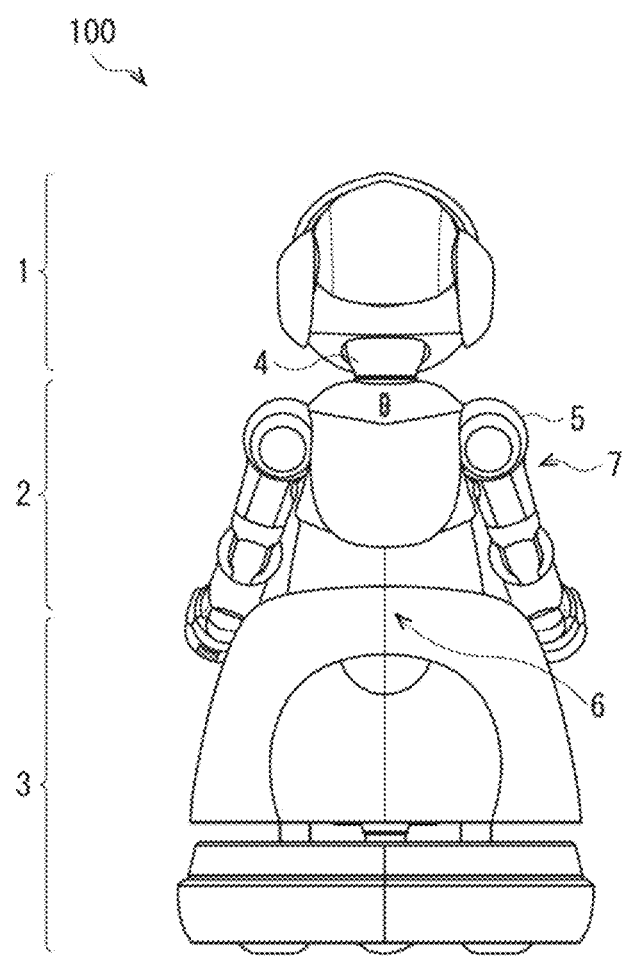
FIG. 2 is an appearance diagram illustrating an example of appearance as viewed from a back direction of the nursing care robot according to the first embodiment.
Figure 3:
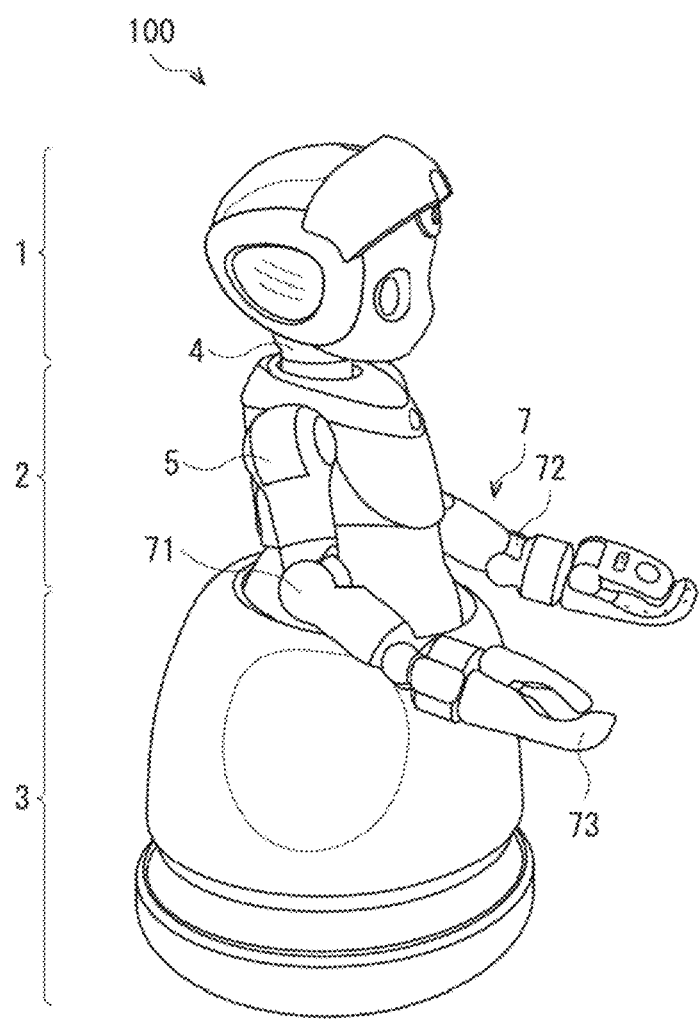
FIG. 3 is an appearance diagram illustrating an example of appearance as viewed from a front oblique direction of the nursing care robot according to the first embodiment.
Figure 4:
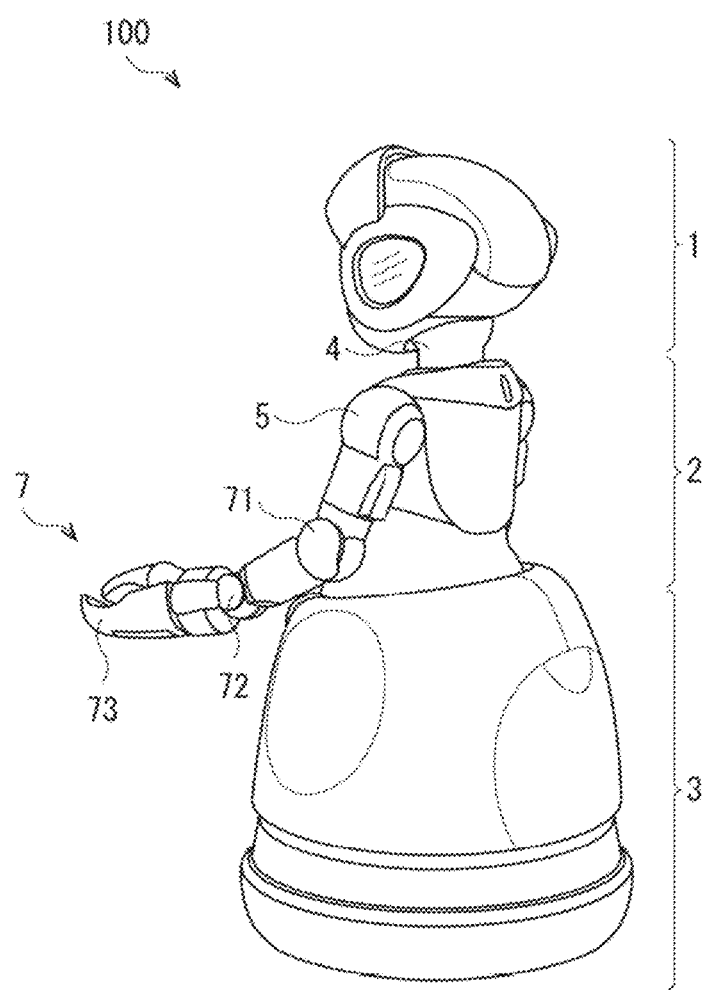
FIG. 4 is an appearance diagram illustrating an example of appearance as viewed from a back oblique direction of the nursing care robot according to the first embodiment.
Figure 5:
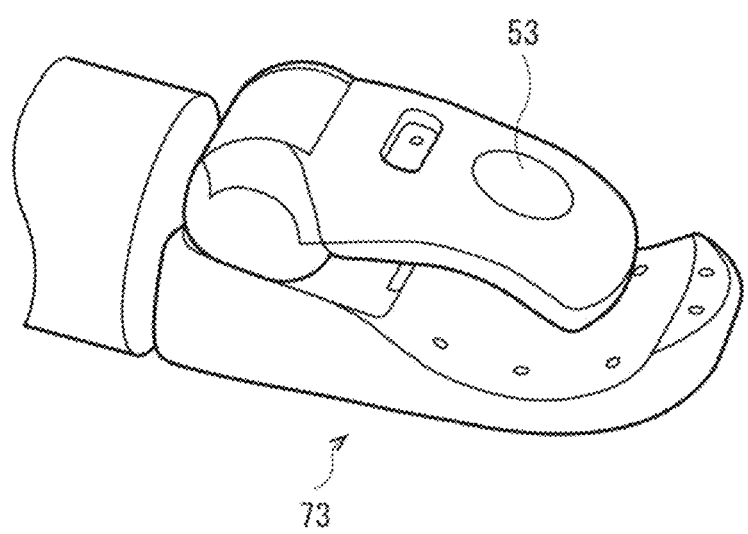
FIG. 5 is an appearance diagram illustrating an example of appearance of a hand of the nursing care robot according to the first embodiment.
Figure 6:
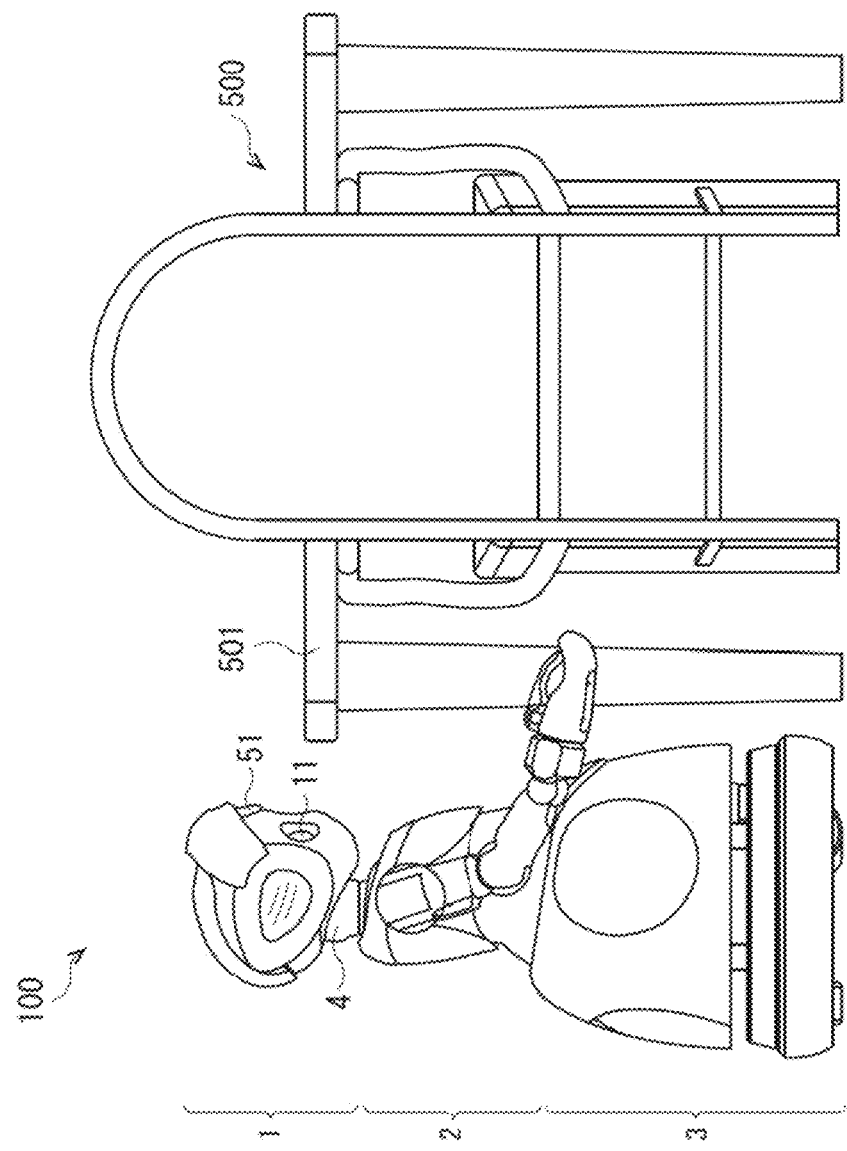
FIG. 6 is an explanatory diagram illustrating comparison between a size of the nursing care robot according to the first embodiment and a size of a typical table.

FIG. 1 illustrates an example of appearance as viewed from a front direction and a side direction of a nursing care robot 100 according to a first embodiment of the present disclosure. A front appearance diagram is illustrated on left side in FIG. 1, and a side appearance diagram is illustrated on right side in FIG. 1. FIG. 2 illustrates an example of appearance as viewed from a back direction of the nursing care robot 100. FIG. 3 illustrates an example of appearance as viewed from a front oblique direction of the nursing care robot 100. FIG. 4 illustrates an example of appearance as viewed from a back oblique direction of the nursing care robot 100. FIG. 5 illustrates an example of appearance of a hand 73 of the nursing care robot 100. FIG. 6 illustrates comparison between a size of the nursing care robot 100 and a size of a typical table 500.

The nursing care robot 100 according to the first embodiment includes a head section 1 including an eyeball section 11, a chest section 2, and a base section 3 that supports the chest section 2. A bottom section of the base section 3 includes, for example, an omnidirectional mobile platform. This makes the nursing care robot 100 movable in all directions.

The nursing care robot 100 further includes arm sections 7 mounted on an upper left section and an upper right section of the chest section 2. The nursing care robot 100 further includes a movable neck 4 that is provided between the head section 1 and the chest section 2 and has a neck joint axis 4C. The nursing care robot 100 further includes a movable shoulder 5 that is provided between the chest section 2 and the arm section 7 and has a shoulder joint axis 5C. The nursing care robot 100 further includes a movable hip 6 that is provided below the chest section 2 and has a hip joint axis 6C.

The arm section 7 includes an elbow section 71, a wrist 72, and the hand 73.

A head sensor 51 is provided on a front upper section of the head section 1. The head sensor 51 is, for example, a distance image sensor.

A chest sensor 52 is provided on a front upper section of the chest section 2. The chest sensor 52 is, for example, a contactless vital sensor.

A hand sensor 53 is provided on the hand 73. The hand sensor 53 is, for example, a contact vital sensor.

The nursing care robot 100 is operated by a robot operating system to be described later. As described later, the robot operating system according to the first embodiment implements a plurality of applications for causing the nursing care robot 100 to execute a nursing care action in a nursing facility in accordance with a schedular created on the basis of judgement of a nursing care staff member, and robot operation individual setting for each care-receiving object person. The applications include greeting/calming down to a care-receiving object person, and vital measurement. The nursing care robot 100 is configured to be able to implement an application that aims to prevent the care-receiving object person from becoming anxious and to regulate a life rhythm. The nursing care robot 100 is a humanoid mobile manipulator-robot that is able to carry out applications such as condition observation, communication, and a peripheral work task for the care-receiving object person with high quality of acceptability. The nursing care robot 100 is able to perform human recognition and face recognition with the head sensor 51, and is able to carry out interaction while tracking eyes of the object person. The height of the nursing care robot 100 is a height that allows a care-receiving object person in a seated posture on a chair to slightly overlook the nursing care robot 100. In addition, the height of the nursing care robot 100 is a height that allows the nursing care robot 100 to overlook a top of the typical table 500, as illustrated in FIG. 6.

(Details of Sensor Configuration)

The head sensor 51 is, for example, a distance image sensor. The head sensor 51 is configured to cause a sensing direction to become substantially the same direction as a visual line direction of the nursing care robot 100, thereby allowing for practice of a humanitude motion, practice of a face tracking motion, or the like. Here, the height of the typical table 500 is, for example, about 700 mm, and the typical table 500 in nursing facilities is, for example, a height of about 660 mm. For example, as illustrated in FIG. 6, the head sensor 51 is disposed at a position at which the head sensor 51 is able to overlook a top 501 of the table 500. The head section 1 is disposed at a position for looking up at the face of the care-receiving object person in a state of sitting on a chair (seated posture). The head sensor 51 is mounted upwards by, for example, about 5 degrees at a high position of the head section 1 (e.g., a position at a height of about 760 mm). The head sensor 51 is disposed not to protrude too much from an outside diameter line of the head section 1. This makes it possible to perform recognition of an object on the standard table 500 or recognition of the face of the care-receiving object person in a seated posture across the table 500, for example, as illustrated in FIG. 6. In addition, it is possible to perform recognition of the face of the care-receiving object person in a seated posture on a standard bed or recognition of the face of the care-receiving object person in a supine posture on the standard bed. In addition, it is possible to perform face recognition at an angle for looking up at the care-receiving object person in a seated posture at a short distance, face recognition at an angle for looking up at the care-receiving object person in a standing posture at a short distance, or the like.

The chest sensor 52 is, for example, a contactless vital sensor. Examples of the contactless vital sensor include a temperature sensor, a heart rate sensor, a respiration sensor, and the like. The chest sensor 52 is mounted upwards by, for example, 10 degrees at a front upper position (e.g., a position at a height of about 537 mm) of the chest section 2. This makes it possible to perform measurement by the chest sensor 52 without being affected by a motion of the head section 1. In addition, it is possible to reduce blind spots generated by the arm section 7 during manipulation. In addition, it is possible to perform vital sensing from the face of a care-receiving object person in a seated posture, the face of a care-receiving object person in a standing posture at a long distance (e.g., about 2 m), the face of a care-receiving object person in a supine posture at a short distance, or the like. In addition, it is possible to constantly perform sensing of change in condition of the object person during implementation of an application.

The hand sensor 53 is, for example, a contact vital sensor. Examples of the contact vital sensor include a heart rate sensor, a blood pressure sensor, an oxygen saturation measurement sensor, and the like. The hand sensor 53 is disposed outside a thumb in a tip of the hand 73, for example, as illustrated in FIG. 5. Accordingly, the hand 73 does not hold a hand of the object person during vital sensing. It is possible to perform vital sensing not by voluntarily causing the hand sensor 53 to touch the object person, but by causing the object person to place a hand of the object person on the hand sensor 53 or hold the hand sensor 53. Such a hand sensor 53 is a well-known interface for elderly persons with dementia, and has high acceptability for the object persons. In addition, it is possible to separately configure a sensor for grip force control inside the hand.

(Configuration Values of Respective Components)

Figure 7:
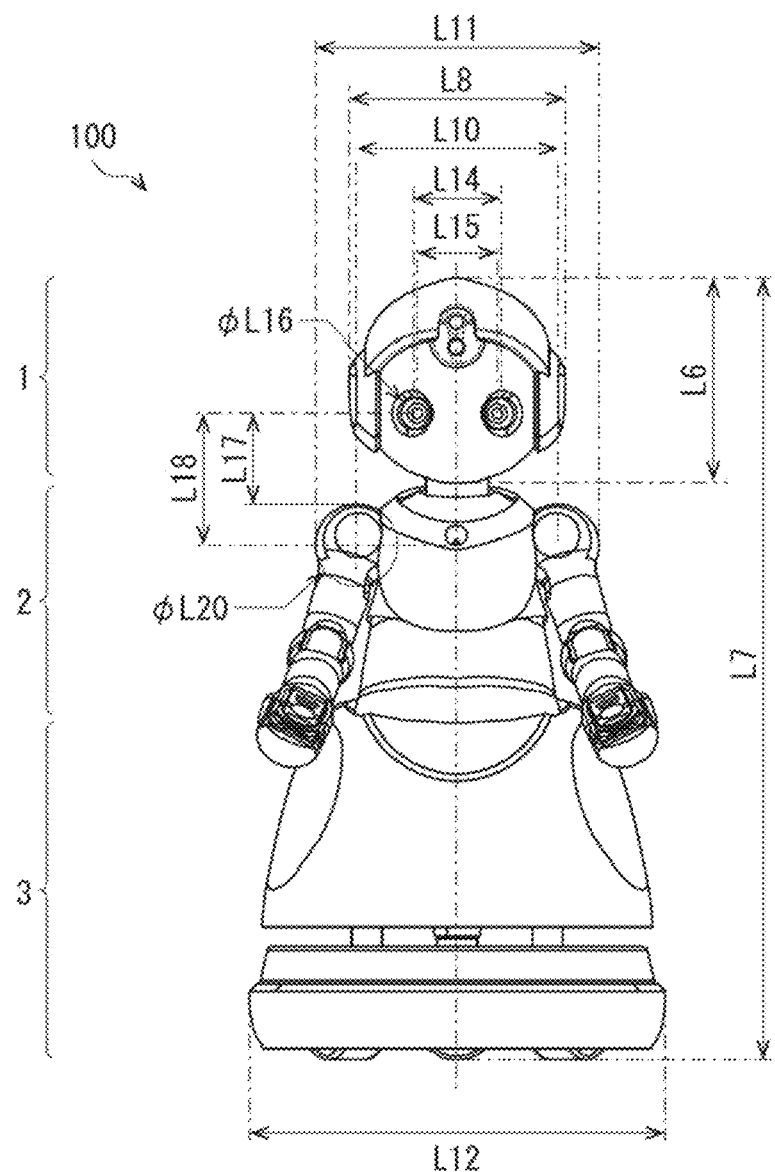
FIG. 7 is a front view of parameters of dimensions of respective parts of the nursing care robot according to the first embodiment.
Figure 8:
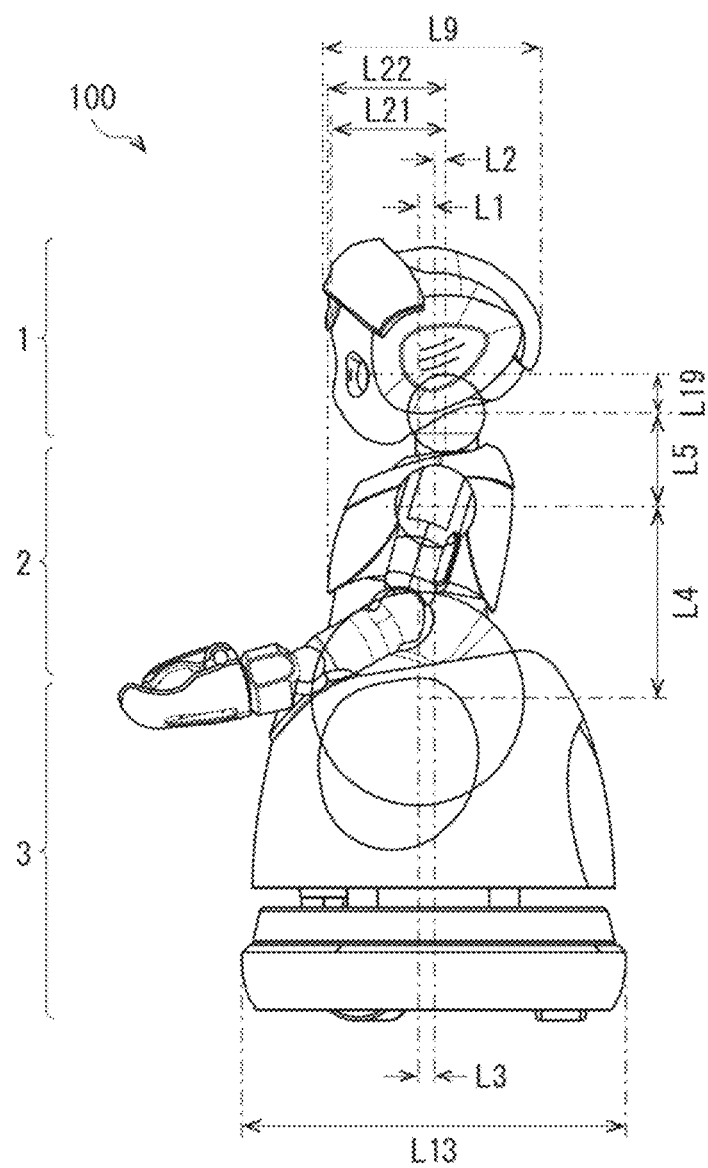
FIG. 8 is a side view of parameters of dimensions of respective parts of the nursing care robot according to the first embodiment.
Figure 9:
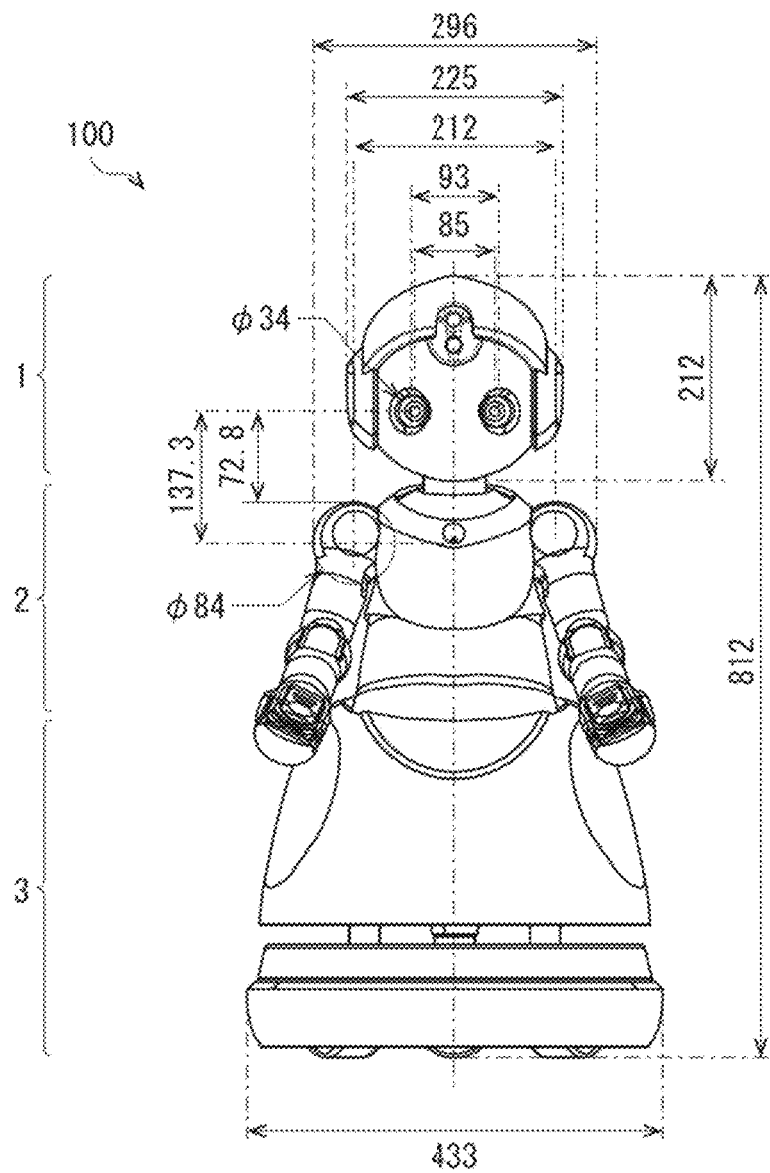
FIG. 9 is a front view of an example of dimensions of respective parts of the nursing care robot according to the first embodiment.
Figure 10:
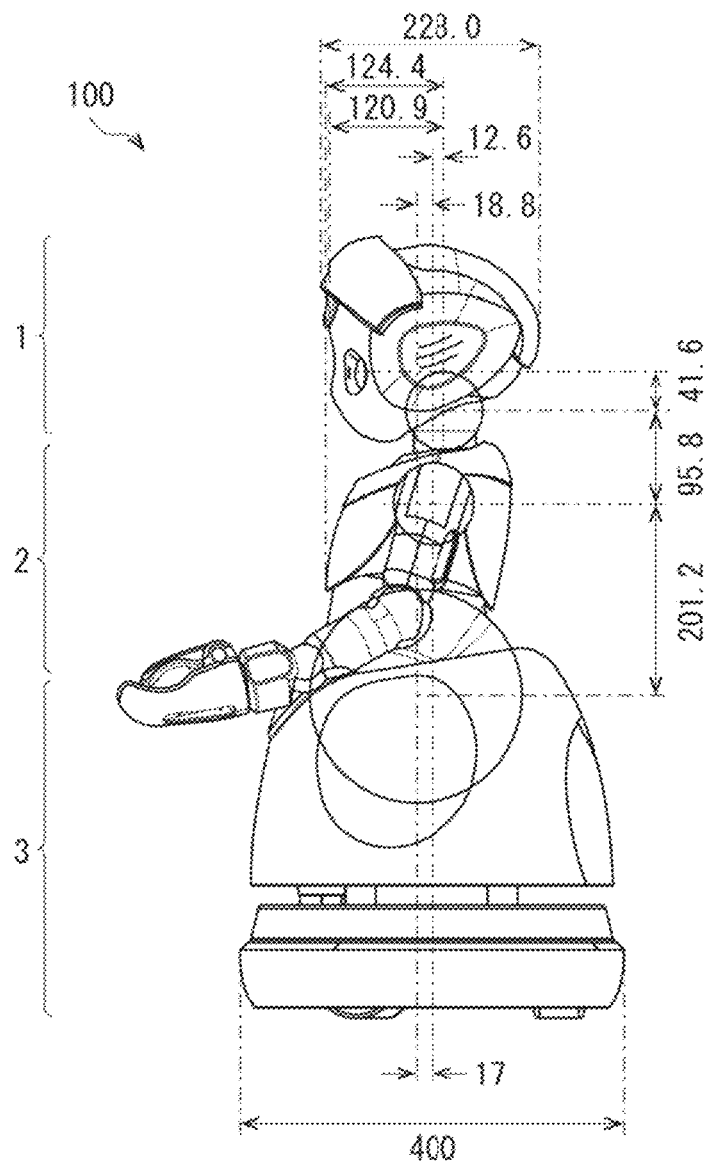
FIG. 10 is a side view of an example of dimensions of respective parts of the nursing care robot according to the first embodiment.
Figure 11:
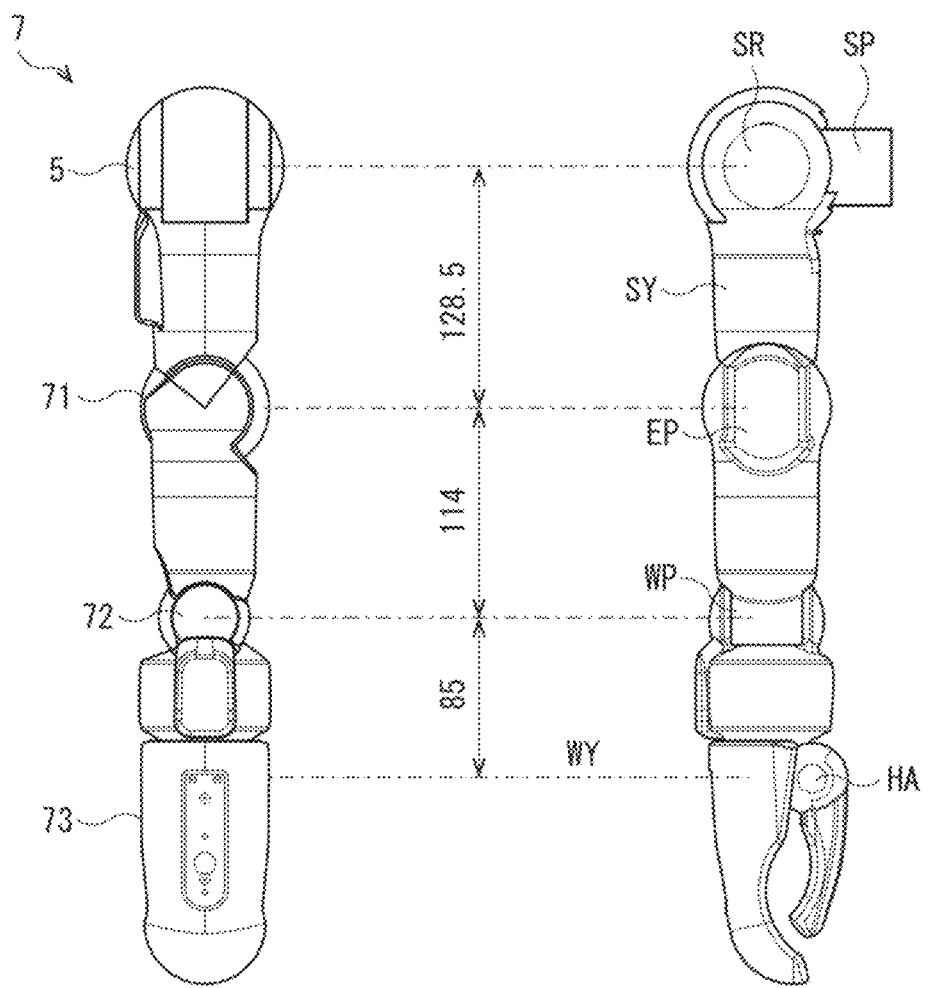
FIG. 11 is a configuration diagram illustrating an example of dimensions of respective parts of an arm section of the nursing care robot according to the first embodiment.

FIG. 7 is a front view of parameters of dimensions of respective parts of the nursing care robot 100. FIG. 8 is a side view of parameters of dimensions of respective parts of the nursing care robot 100. FIG. 9 is a front view of an example of dimensions of respective parts of the nursing care robot 100. FIG. 10 is a side view of an example of dimensions of respective parts of the nursing care robot 100. FIG. 11 is a configuration diagram illustrating an example of dimensions of respective parts of the arm section 7 of the nursing care robot 100. FIGS. 12 to 14 each are an explanatory diagram illustrating an example of dimensions of respective parts of the nursing care robot 100. FIG. 15 is an explanatory diagram illustrating an example of movable ranges of joint axes of respective parts of the nursing care robot 100.

FIGS. 9 to 11 each illustrate an example of best values of dimensions of respective parts. FIGS. 12 to 14 each illustrate an example of best values of dimensions of respective parts, an example of best values of dimension ratios of respective parts, and an example of values in allowable ratio ranges of dimension ratios of respective parts. It is to be noted that specific numerical values illustrated in FIGS. 9 to 15 are examples, and any other numerical values may be taken.

The respective parts are configured to have values illustrated in FIGS. 9 to 15, which makes it possible to enhance acceptability for a care-receiving object person. Configuration values of representative portions are described below.

In the nursing care robot 100, as viewed from a side direction in a standard posture, the neck joint axis 4C is offset in a backward direction from the shoulder joint axis 5C, and the hip joint axis 6C is offset in a forward direction from the shoulder joint axis 5C, as illustrated on right side in FIG. 1. Accordingly, as viewed from the side direction in the standard posture, front-back direction positions of three joint axes including the neck joint axis 4C, the shoulder joint axis 5C, and the hip joint axis 6C are disposed not in a vertical series, but are offset in the same backward direction.

The nursing care robot 100 satisfies the following conditional expressions (1) and (2) to offset the three joint axes as described above. Here, L1 indicates a distance between the hip joint axis 6C and the shoulder joint axis 5C in a front-back direction, L2 indicates a distance between the shoulder joint axis 5C and the neck joint axis 4C in the front-back direction, L4 indicates a distance between the hip joint axis 6C and the shoulder joint axis 5C in an up-down direction, and L5 indicates a distance between the shoulder joint axis 5C and the neck joint axis 4C in the up-down direction.

$$0 < L2/L1 < 1.5 \qquad (1)$$

$$0.2 < L5/L4 < 0.6 \qquad (2)$$

The nursing care robot 100 is configured to satisfy the following conditional expression (3) regarding a head-body proportion. Accordingly, the nursing care robot 100 is configured to have a relatively large head-body proportion. Here, L6 indicates a total head height (height) in the standard posture, and L7 indicates a body height.

$$3.3 < L7/L6 < 5.0 \qquad (3)$$

The eyeball section 11 is disposed at a position lower than a center position in the up-down direction of the head section 1. The nursing care robot 100 is configured to satisfy the following conditional expression (4) regarding the position of the eyeball section 11. Here, L6 indicates the total head height in the standard posture, and L17 indicates a distance from a center position of the eyeball section 11 to a bottom of a chin of the head section 1 in the up-down direction.

$$0.2 < L17/L6 < 0.5 \qquad (4)$$

The nursing care robot 100 is configured to make the length of the neck 4 short to an extent that an upper end of the chest section 2 and the bottom of the chin of the head section 1 are substantially in contact with each other, as viewed from the front direction. Accordingly, the nursing care robot 100 is configured to satisfy, for example, the following conditional expression (5). Here, L5 indicates a distance between the shoulder joint axis 5C and the neck joint axis 4C in the up-down direction, and L6 indicates the total head height in the standard posture.

$$0.3 < L5/L6 < 0.6 \qquad (5)$$

The nursing care robot 100 is configured to make a section (a cheek shape) on side lower than the eyeball section 11 in the head section 1 large to an extent that the upper end of the chest section 2 and the bottom of the chin of the head section 1 are substantially in contact with each other, as viewed from the front direction. Accordingly, the nursing care robot 100 is configured to satisfy, for example, the following conditional expressions (6) and (7). Here, L17 indicates a distance from the center position of the eyeball section 11 to the bottom of the chin of the head section 1 in the up-down direction, L18 indicates a distance from the center position of the eyeball section 11 to the shoulder joint axis 5C in the up-down direction, and L19 indicates a distance from the center position of the eyeball section 11 to the neck joint axis 4C in the up-down direction.

$$1.3 < L18/L17 < 2.5 \qquad (6)$$

$$0.4 < L19/L17 \leq 1.0 \qquad (7)$$

The nursing care robot 100 is configured to make a motion range of a pitch axis of the neck 4 larger in an upward direction than in a downward direction (see FIG. 15).

The nursing care robot 100 is configured to cause a face front surface section of the head section 1 and a front surface section of the chest section 2 to be located at substantially the same position as viewed from the side direction in the standard posture, and to cause the face front surface section of the head section 1 to be located behind the front surface section of the chest section 2. Accordingly, the nursing care robot 100 is configured to satisfy, for example, the following conditional expression (8). Here, L21 indicates a distance from the neck joint axis 4C to the face front surface section of the head section 1 as viewed from the side direction in the standard posture, and L22 indicates a distance from the neck joint axis 4C to the front surface section of the chest section 2 as viewed from the side direction in the standard posture.

$$1 < L22/L21 < 1.3 \qquad (8)$$

(Configuration of Eyeball Section)

Figure 16:
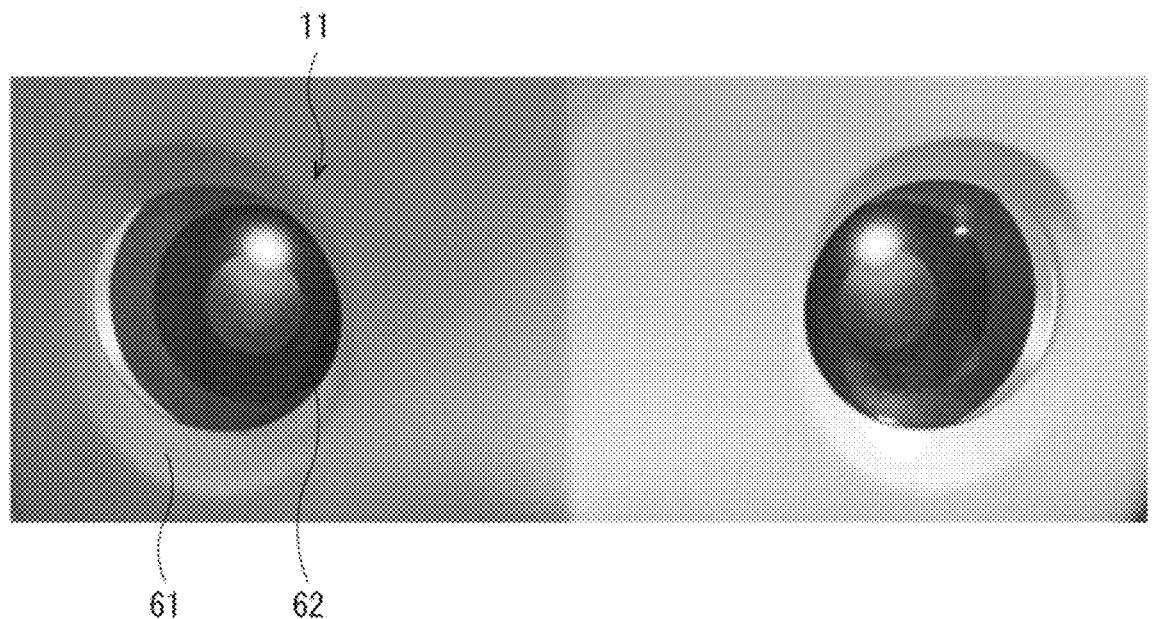
FIG. 16 is an appearance diagram illustrating a configuration example of an eyeball section of the nursing care robot according to the first embodiment.
Figure 17:
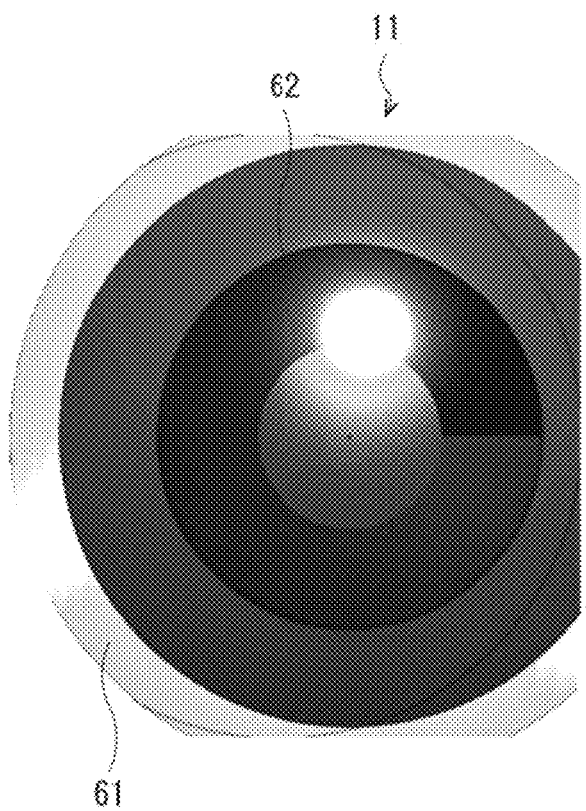
FIG. 17 is an appearance diagram illustrating a configuration example of the eyeball section of the nursing care robot according to the first embodiment.
Figure 18:
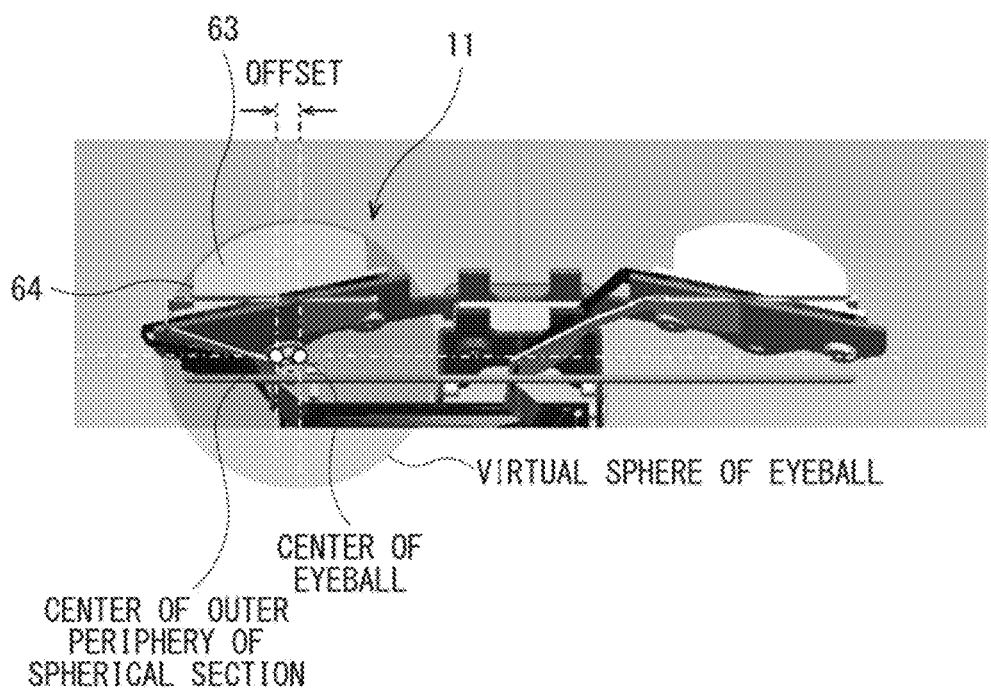
FIG. 18 is a cross-sectional view of a configuration example of the eyeball section of the nursing care robot according to the first embodiment.
Figure 19:
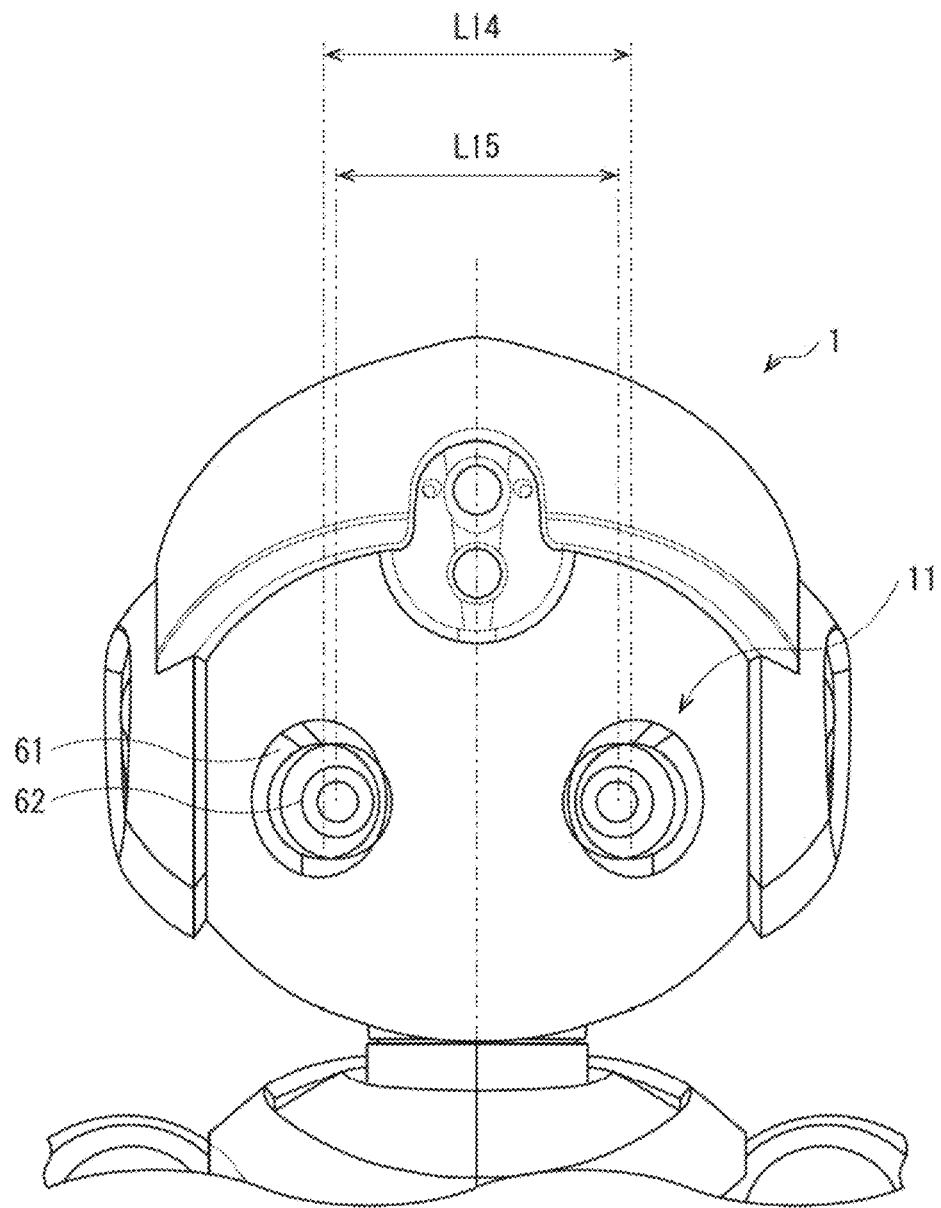
FIG. 19 is a front view of parameters of dimensions of the eyeball section of the nursing care robot according to the first embodiment.
Figure 20:
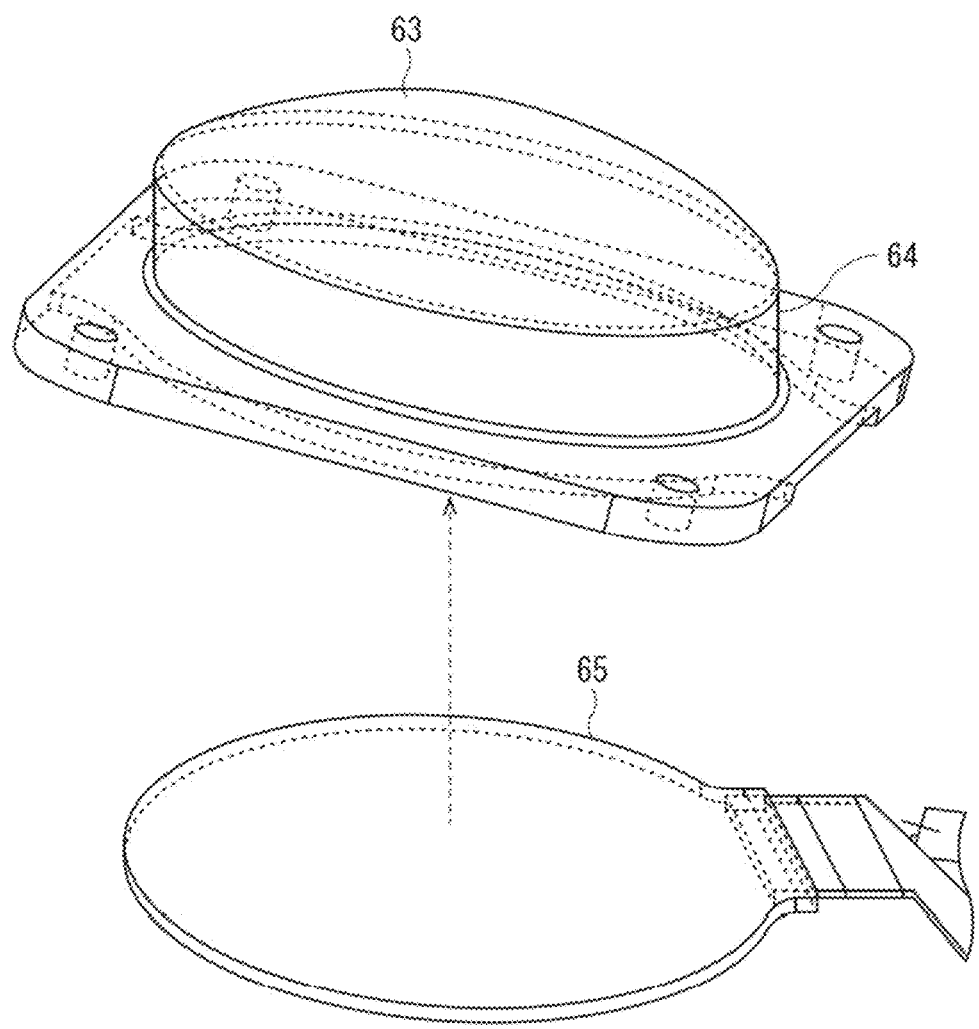
FIG. 20 is an exploded view of an internal configuration example of the eyeball section of the nursing care robot according to the first embodiment.

FIGS. 16 and 17 each are an appearance diagram illustrating a configuration example of the eyeball section 11 of the nursing care robot 100. FIG. 18 is a cross-sectional view of a configuration example of the eyeball section 11 of the nursing care robot 100. FIG. 19 is a front view of parameters of dimensions of the eyeball section 11 of the nursing care robot 100. FIG. 20 is an exploded view of an internal configuration example of the eyeball section 11 of the nursing care robot 100.

The eyeball section 11 includes a transparent solid cylindrical section 64 having a first end surface and a second end surface, as illustrated in FIG. 20. The eyeball section 11 further includes a planar display 65 that is provided on side of the first end surface (lower side in FIG. 20) of the cylindrical section 64 and displays an operation of an iris section 62. The eyeball section 11 further includes a hemispherical transparent spherical section 63 that is provided on side of the second end surface (upper side in FIG. 20) of the cylindrical section 64 and outputs display light from the display 65 incoming through the cylindrical section 64. The spherical section 63 configures a hemispherical transparent spherical lens. An outer peripheral shape of the spherical section 63 is configured to be a sclera section 61, as illustrated in FIG. 16.

A center position of an eyeball of the eyeball section 11 is configured to be offset inward from a center position of an outer periphery of the spherical section 63, as illustrated in FIG. 18.

A method of representing a robot's eye is to display an iris or the like in animation on a display using an LCD (liquid crystal display) or an OLED (Organic Light Emitting Diode). A typical display has a planar shape; therefore, an eyeball displayed thereon is not three-dimensional representation, and is limited to two-dimensional representation. A planar representation causes an issue that reality of the robot is lost and it is difficult to see display except for from the front depending on a display viewing angle. In addition, a convergence angle operation is also represented planarly, and is incomprehensible.

In addition, there is a technique in which a spherical eyeball component is physically designed, and driven by an actuator. In this case, a structure is complicated, and it is difficult to realize change in expression of an eye, representation of blinking, and the like even if the position of an iris is changeable. As display by a stereoscopic display, using a spherical display or holography technology may be a solution, but at present, cost is large, and it is difficult to mount the stereoscopic display or holography technology due to a restriction on a space layout of a robot head. In addition, in a case of only a sphere without the cylindrical section 64, mainly a peripherical section is thin and a stereoscopic effect is inferior, and it is difficult to align the center of the iris with the center of the eyeball, thereby resulting in unnatural representation.

Accordingly, the nursing care robot 100 has a configuration in which the eyeball section 11 includes the hemispherical transparent spherical section 63 and the transparent solid cylindrical section 64. Furthermore, the spherical section 63 and the cylindrical section 64 are disposed to be superimposed on the planar display 65 that displays an operation of the iris section 62. An outer peripheral surface of the cylindrical section 64 is configured to be non-transparent so as to prevent entry of light. This makes a display image seen from the spherical section 63 clear without distortion. A stereoscopic effect of depth is obtained by disposing the spherical section 63 at a distance from the display 65. The spherical section 63 is configured to suppress reflection of light while having a certain degree of gloss. In the spherical section 63, a circular colored section represents a motion (line of sight) of the iris section 62 in upward, downward, leftward, and rightward directions.

The center of the sphere of the spherical portion 63 is designed as a virtual rotation center of the eyeball, and the operation of the iris section 62 to be displayed is also controlled with reference to the center of the sphere of the spherical section 63. A more natural spherical shape in which the initial position of the iris is brought slightly inward is realized by providing the cylindrical section 64.

The nursing care robot 100 performs human recognition and face recognition with use of, for example, the head sensor 51, and controls the position of the iris section 62 of the eyeball section 11, and axes (Roll, Pitch, and Yaw) of the neck 4 to gaze at an object person. The position of the iris section 62 tracks and gazes at the position of the object person in the upward, downward, leftward, and rightward directions, and represents a distance to the object person with use of a convergence angle (close-set eyes and wide-set eyes). The nursing care robot 100 has a configuration that makes it easy for the object person to see where the line of sight of the nursing care robot 100 is directed (specifically in a near-far direction). For elderly persons with dementia in nursing facilities, high acceptability and high recognizability are desired. The eyeball section 11 is configured to meet this need.

As described above, in the nursing care robot 100, the eyeball section 11 has a three-dimensional stereoscopic configuration, and it is possible to display the operation of the iris section 62 at low cost. Accordingly, a face having an eye that looks as if an eyeball sphere is contained is realized. In the eyeball section 11, the spherical section 63 includes a hemispherical spherical lens; therefore, there is no distortion in a lens effect, and there is no feeling of strangeness as an eyeball. It is possible to represent a highlight of a pupil as reflected light of a real light; therefore, responsiveness is also real-time, and there is no feeling of strangeness. Acceptability and recognizability of the nursing care robot 100 are improved for care-receiving object persons by controlling movement of the line of sight before the neck 4 or an overall operation.

According to the configuration of the above eyeball section 11, unlike the planar display, it looks as if display or movement is performed on a built-in sphere having high visibility from any angle, there is no distortion, and the eyeball section 11 looks like an eyeball. The center of the iris section 62 and the center of the sphere of the spherical section 63 are aligned with each other, and there is no feeling of strangeness in the thickness and shape of the sphere. Reflected light of ambient light is reflected on a surface of the spherical section 63, and it is possible to naturally represent a highlight of the pupil in real time. An effect of obtaining a sense of eye contact for a care-receiving object person is achieved.

[1.2 Workings and Effects of Nursing Care Robot]

The nursing care robot 100 according to the first embodiment allows an actual machine configuration of robot hardware to have specifications for enhancing acceptability (easy to understand what the nursing care robot 100 is doing without being feared) from care-receiving object persons in a human coexistence environment. In particular, it is possible to have specifications for enhancing acceptability from care-receiving object persons who are characterized in cognition, such as an elderly person with dementia or an infant.

The nursing care robot 100 according to the first embodiment has an actual machine configuration that enhances the following acceptability.

With regard to size, a configuration is adopted that has a sense of reality equivalent to a 2-year-old child and is moderately small, has a height that allows a sitting elderly person to overlook the nursing care robot 100, and does not give senses of intimidation and fear to a care-receiving object person. A configuration is adopted in which the head section 1 has a height that allows the head section 1 to overlook the top of the typical table 500. A configuration is adopted in which the height of the shoulder 5 and the length of the arm section 7 are approachable to an end of the typical table 500. With regard to form, a form is adopted that has a large head-body proportion and resembles a cute grandchild. The eyeball section 11 has a configuration that is located at a height position at which it is easy to meet eyes, and allows the care-receiving object person to understand the meaning of the line of sight or an image displayed on the eyeball section 11. With regard to operation, a configuration is adopted that has no axis of freedom and no motion range different from those of a human, has no fearful motion, and makes it possible to understand what the nursing care robot 100 is doing. A configuration is adopted in which a humanitude motion is implementable. A configuration is adopted in which a basic application is implementable in an active watching robot.

According to the nursing care robot 100 according to the first embodiment, the following workings and effects are obtained.

1. The above-described actual machine configuration that enhances acceptability is adopted, which makes it possible to enhance acceptability (without being feared, or easy to understand) from elderly persons with dementia, while having a minimum-degree-of-freedom configuration.
2. Acceptability from elderly persons with dementia is high, which makes it possible to come close to a care-receiving object person and provide applications such as active watching, greeting/calming down, vital measurement, tea serving, and story recreation.
3. Even in a living room or a residence room during absence of a staff member, it is possible to prevent a care-receiving object person from becoming anxious and calm down the object person.

4. The life rhythm of a care-receiving object person is regulated by repeatedly implementing applications according to a schedule.
5. The life rhythm of a care-receiving object person is regulated and the care-receiving object person is prevented from becoming anxious, which leads to stabilization in the entire facility, and also leads to an improvement in efficiency of an entire nursing care work and cost reduction.
6. It is possible for one robot to deal with care-receiving object persons in one unit (about 10 people) in a nursing facility.
7. The QOL (Quality of Life) of care-receiving object persons increases.
8. It is possible to reduce a workload of a staff member and carry out a care work with peace of mind.
9. The number of applicants for admission to a facility that has introduced the nursing care robot 100 increases.
10. The number of job applicants as nursing care staff members or nursing staff members in a facility that has introduced the nursing care robot 100 increases.
11. It is possible for care-receiving object persons to love the nursing care robot 100 like a child or a grandchild, and to live with a role by taking care of the nursing care robot 100.

Furthermore, the following workings and effects are obtained.
1. With regard to a sensor position, a wide space is easily formed at a front upper position of the head section 1 and a front upper position of the chest section 2, which increases a degree of freedom for a sensor layout. For example, it is possible to dispose a sensor at a position having a high vital sensing ability with respect to a care-receiving object person in a seated posture or a standing posture.
2. Components tend to be concentrated in a front of a head section, and the weight of the front of the head section tends to be increased; however, positions in the front-back direction of three joint axes including the neck joint axis 4C, the shoulder joint axis 5C, and the hip joint axis 6C are disposed to be offset in the same backward direction, which makes it difficult to cause eccentric loading as gravity center balance from above the hip 6.

[1.3 Configuration Example and Operation Example of Robot Operating System]
(Overview of Robot Operating System)

Figure 21:
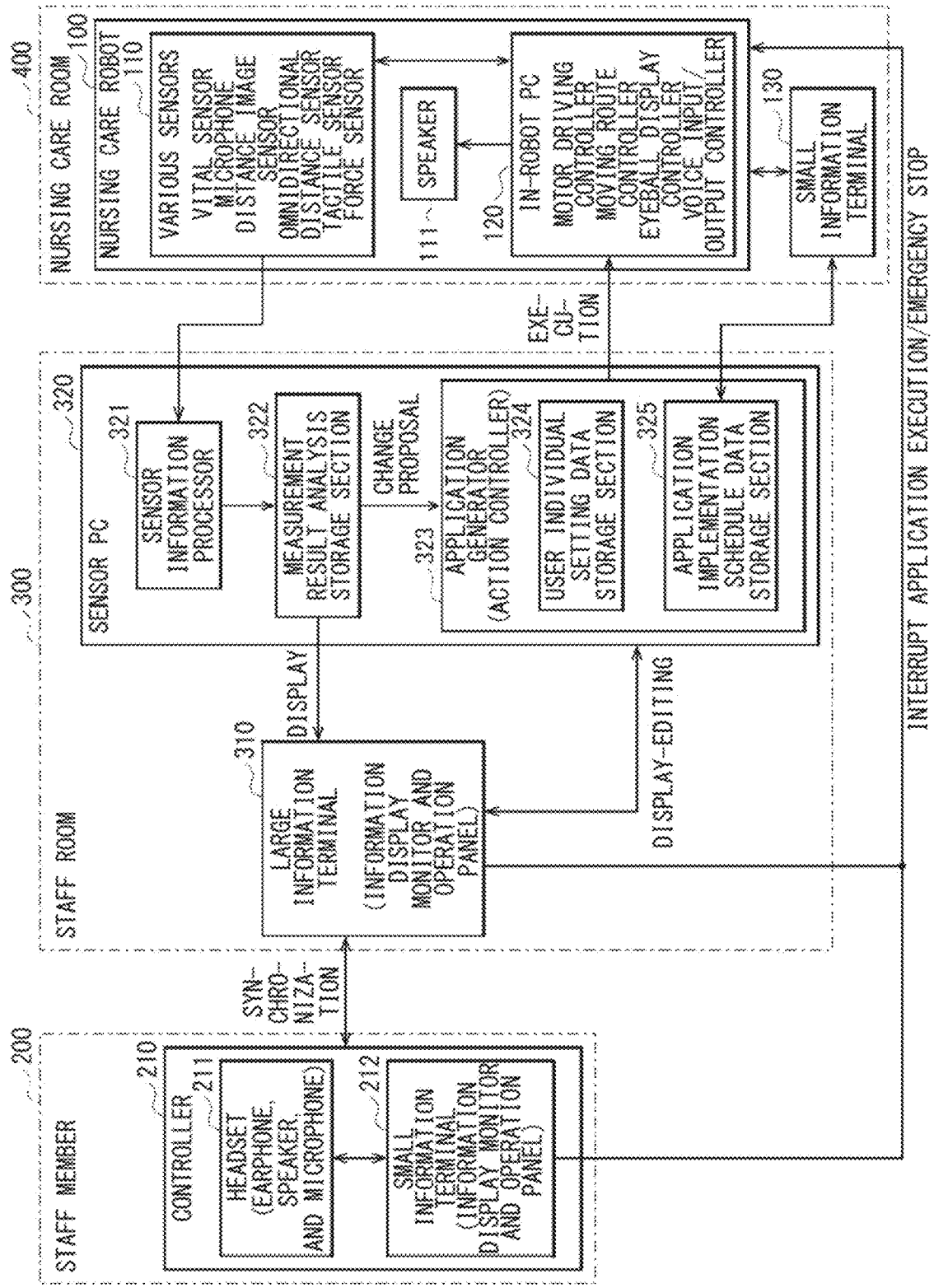
FIG. 21 is a block diagram schematically illustrating a configuration example of a robot operating system according to the first embodiment.

FIG. 21 schematically illustrates a configuration example of the robot operating system according to the first embodiment.

The robot operating system according to the first embodiment includes a controller 210, a large information terminal 310, a center PC (personal computer) 320, the nursing care robot 100, and a small information terminal 130.

Figure 28:
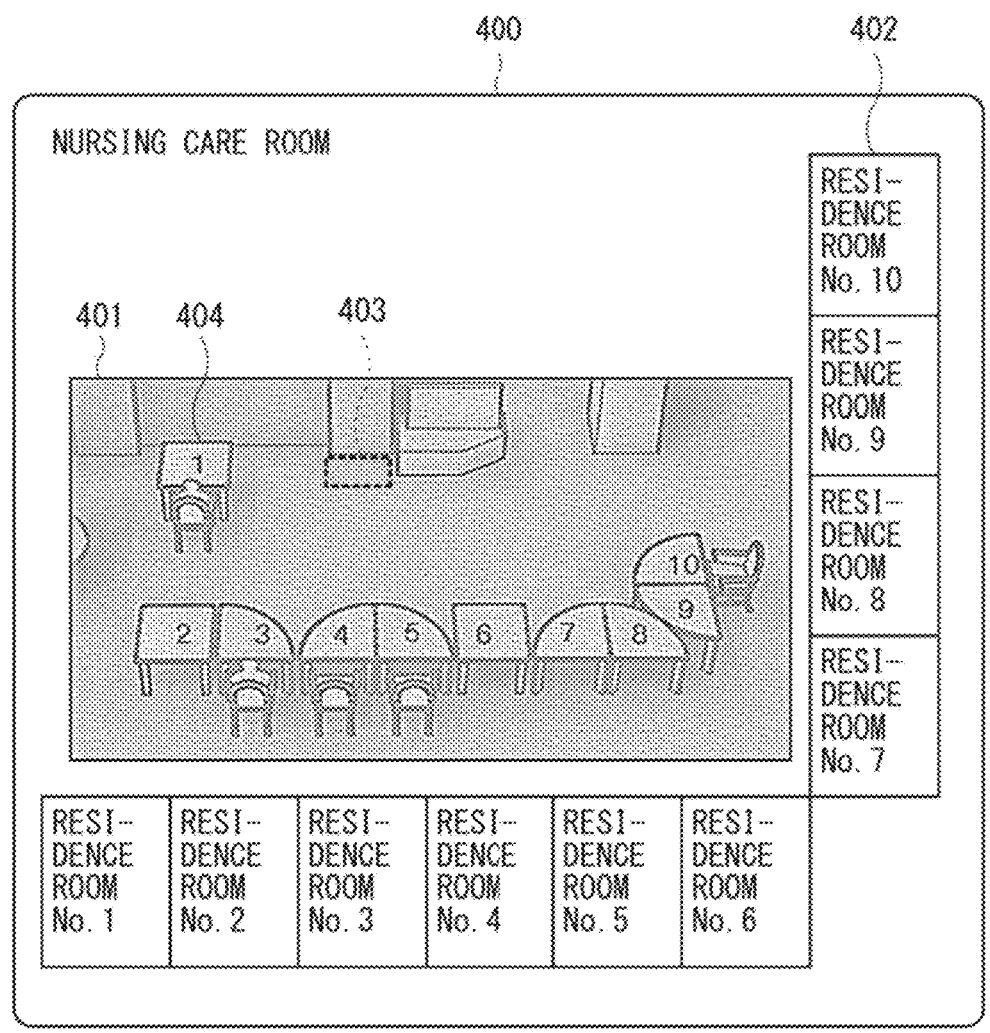
FIG. 28 is an explanatory diagram illustrating an example of a nursing care room as an object of the robot operating system according to the first embodiment.

The nursing care robot 100 is operated in a nursing care room 400 having a living room 401 and a residence room 402, for example, as illustrated in FIG. 28 to be described later. A plurality of nursing care robots 100 may be present. In this case, the plurality of nursing care robots 100 are simultaneously operated by the robot operating system according to the first embodiment. The nursing care robot 100 includes various sensors 110, a speaker 111, and an in-robot PC 120.

The various sensors 110 include a vital sensor, a microphone, a distance image sensor, an omnidirectional distance sensor, a tactile sensor, and a force sensor. Some of the various sensors 110 are provided in the head sensor 51, the chest sensor 52, and the hand sensor 53 that are described above.

The in-robot PC 120 includes a motor driving controller, a moving route controller, an eyeball display controller, and voice input/output controller. The in-robot PC 120 may include, for example, a computer including a CPU (Central Processing Unit), a ROM (Read Only Memory), and a RAM (Random Access Memory). In this case, various types of processing by the in-robot PC 120 may be realized by causing the CPU to execute processing based on a program stored in the ROM or the RAM. In addition, various types of processing by the in-robot PC 120 may be realized by causing the CPU to execute processing based on a program supplied from outside by, for example, a wired or wireless network.

The small information terminal 130 includes an information display monitor and an operation panel. The small information terminal 130 is holdable by the hand 73 of the nursing care robot 100.

The controller 210 is a robot controller device that is portable or wearable by a staff member 200. A plurality of controllers 210 may be present and may be portable by a plurality of staff members 200. The controller 210 includes a headset 211 (an earphone, a speaker, and a microphone), and a small information terminal (an information display monitor and an operation panel) 212. A care-receiving object person 101 may be curious about accessories and reach for the accessories; therefore, it is sufficient if the earphone of the headset 211 has inconspicuous appearance such as a small inner earphone type. It is possible to perform a real-time command operation (such as selection of the object person 101, application selection, start, and stop) on the nursing care robot 100 by voice input from the controller 210. The staff member 200 is notified of presentation of a watching result and presentation of abnormality from the nursing care robot 100 through the controller 210. In addition, it is possible to output a voice of the staff member 200 to the object person 101 from the speaker 111 of the nursing care robot 100 through the controller 210.

The headset 211 includes an earphone, a speaker, and a microphone. The small information terminal 212 includes an information display monitor and an operation panel) 212.

The small information terminal 212 corresponds to a specific example of an "information terminal" in the technology of the present disclosure.

The large information terminal 310 and the center PC 320 are disposed in a staff room 300, for example.

The large information terminal 310 includes, for example, an information display monitor and an operation panel.

The center PC 320 includes a sensor information processor 321, a measurement result analysis storage section 322, and an application generator 323. The center PC 320 may include, for example, a computer including a CPU, a ROM, and a RAM. In this case, various types of processing by the center PC 320 may be realized by causing the CPU to execute processing based on a program stored in the ROM or the RAM. In addition, various types of processing by the center PC 320 may be realized by causing the CPU to execute processing based on a program supplied from outside by, for example, a wired or wireless network.

The application generator 323 includes a user individual setting data storage section 324 and an application implementation schedule data storage section 325.

The sensor information processor 321 corresponds to a specific example of an "information processor" in the technology of the present disclosure. The application generator 323 corresponds to a specific example of an "action controller" in the technology of the present disclosure. The user individual setting data storage section 324 corresponds to a specific example of an "individual setting storage section" in the technology of the present disclosure. The application implementation schedule data storage section 325 corresponds to a specific example of a "schedule storage section" in the technology of the present disclosure. The measurement result analysis storage section 322 corresponds to a specific example of an "evaluation data storage section" in the technology of the present disclosure.

It is to be noted that some or all of pieces of processing to be performed by the center PC 320 may be performed by the in-robot PC 120. In addition, some or all of pieces of processing to be performed by the center PC 320 may be performed by a server on a cloud.

(Processing to be Performed by Each Component of Robot Operating System)

A real need arising from nursing facilities is to stabilize the mental condition of the object person 101 by watching (condition observation and communication) during absence time of the staff member 200 for the care-receiving object person 101. Approaches such as beforehand watching of the care-receiving object person 101, and greeting, talking, and encouragement are continued by the nursing care robot 100 that actively goes to acquire information by using a moving mechanism and a manipulator to thereby calm down the mental condition and keep a stable condition. Furthermore, an application group installed on the robot operating system aims at reduction in workload of the staff member 200 and further stabilization of the mental condition of the care-receiving object person 101.

The sensor information processor 321 evaluates the condition of a care-receiving object person on the basis of measurement information measured by the various sensors 110 included in the nursing care robot 100. On the basis of a result of evaluation by the sensor information processor 321, the application generator 323 causes the nursing care robot 100 to gradually approach the object person while temporarily stopping at a plurality of approaching positions (via points) having different distances to the object person, and causes the nursing care robot 100 to execute a nursing care action including condition observation on the object person and communication with the object person. The communication with the object person includes speech to the object person. The plurality of approaching positions may include, for example, a long-distance position P3, a medium-distance position P2, and a short-distance position P1 illustrated in FIG. 22 to be described later.

The sensor information processor 321 may evaluate the condition of the object person on the basis of measurement information measured at each of the plurality of approaching positions. The evaluation of the condition of the object person by the sensor information processor 321 includes evaluation of whether or not the object person has a negative reaction. In a case where the sensor information processor 321 evaluates that the object person has no negative reaction, the application generator 323 may cause the nursing care robot 100 to gradually approach the object person.

Figure 22:
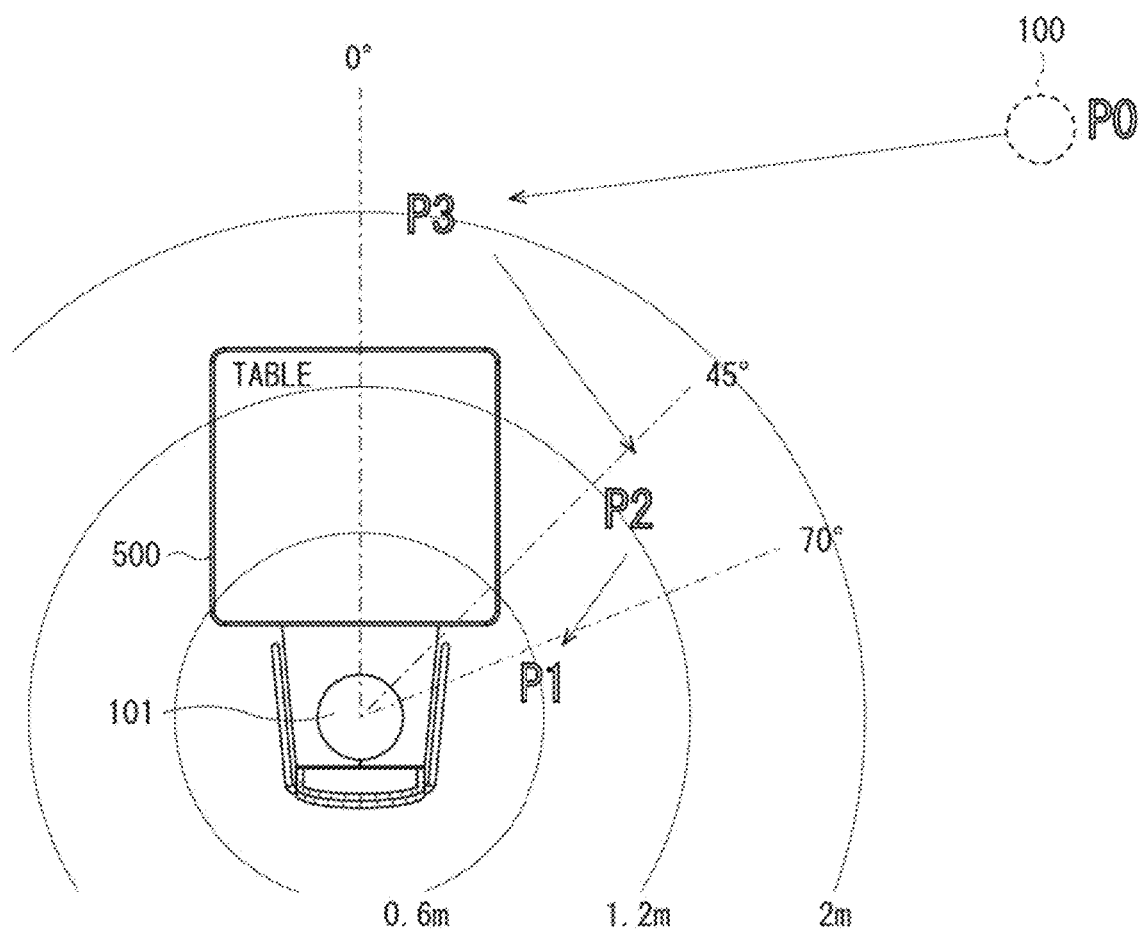
FIG. 22 is an explanatory diagram illustrating an example of approaching positions with respect to an object person of the nursing care robot operated by the robot operating system according to the first embodiment.

FIG. 22 schematically illustrates an example of approaching positions with respect to the object person of the nursing care robot 100 operated by the robot operating system according to the first embodiment.

The application generator 323 temporarily stops, for example, the nursing care robot 100 at an initial position P0→the long-distance position P3→the medium-distance position P2→the short-distance position P1 in stages. The application generator 323 causes the nursing care robot 100, for example, to direct its own face and posture in a direction of the face of the object person 101 and execute speech to and a motion toward the object person 101.

Here, the long-distance position P3 may be in the vicinity of a distance radius of 2 m in the forward direction with respect to the object person 101, the medium-distance position P2 may be in the vicinity of a distance radius distance of 1.2 m in the forward direction with respect to the object person 101, and the short-distance position P1 may be in the vicinity of a distance radius distance of 0.6 m in the forward direction with respect to the object person 101. The application generator 323 observes the reaction of the object person 101 at each stopping at each approaching position (via point), and causes the nursing care robot 100 to gradually approach the object person 101 while confirming that no negative reaction arises. With regard to the negative reaction, a recognition result that the object person 101 shakes his or her head from side to side, completely looks down and is not able to make eye contact, directs his or her face toward a position opposite the position of the nursing care robot 100, makes an extremely loud voice, or extremely changes his or her posture is defined as a disliking condition or a surprised condition.

The sensor information processor 321 may further determine presence or absence of an obstacle on the basis of measurement information. The application generator 323 may change the approach angle of the nursing care robot 100 from the front direction with respect to the object person 101 on the basis of the presence or absence of an obstacle facing the front of the object person 101 that is determined by the sensor information processor 321. The obstacle may be, for example, a desk, a chair, a cabinet, or the like.

In a case where the sensor information processor 321 determines that an obstacle is present, the application generator 323 may cause the nursing care robot 100 to approach the object person 101 at an approach angle that increases with decreasing distance to the object person 101. For example, in a case where the sensor information processor 321 determines that an obstacle is present, the application generator 323 may change the approach angle of the nursing care robot 100 to around a 0-degree direction with respect to the object person 101 at the long-distance position P3, around a 45-degree direction with respect to the object person 101 at the medium-distance position P2, and around a 70-degree direction with respect to the object person 101 at the short-distance position P1, as illustrated in FIG. 22.

In a case where the sensor information processor 321 determines that no obstacle is present, the application generator 323 may cause the nursing care robot 100 to approach the object person 101 while maintaining the same approach angle in the front direction regardless of the distance to the object person 101. For example, in a case where no obstacle facing the front of the object person 101 is present, the application generator 323 may cause the nursing care robot 100 to approach the object person 101 at an angle around the 0-degree direction with respect to the object person 101 at all of the long-distance position P3, the medium-distance position P2, and the short-distance position P1.

The application generator 323 may cause the nursing care robot 100 to approach the object person 101 at an approach angle that increases on side of a direction of the dominant hand of the object person 101 with decreasing distance to the object person 101.

The sensor information processor 321 may further determine, on the basis of the measurement information, whether or not the nursing care robot 100 is movable on side of the direction of the dominant hand of the object person 101. Whether or not the nursing care robot 100 is movable may be determined on the basis of, for example, the presence or absence of an obstacle or a condition that a passable floor area width is not sufficient.

In a case where the sensor information processor 321 determines that the nursing care robot 100 is not movable on side of the direction of the dominant hand of the object person 101, the application generator 323 may cause the nursing care robot 100 to approach the object person 101 from side of a direction different from the direction of the dominant hand of the object person 101.

The measurement result analysis storage section 322 stores evaluation data indicating a result of evaluation by the sensor information processor 321. The sensor information processor 321 may generate, as the evaluation data, evaluation data indicating acceptability of the nursing care robot 100 for the object person 101 on the basis of the measurement information measured by the various sensors 110 in a case where the nursing care robot 100 is caused to execute a nursing care action (see FIGS. 25, 26, and 32 to be described later). The application generator 323 may cause the nursing care robot 100 to execute a nursing care action on the basis of the evaluation data indicating the acceptability stored in the measurement result analysis storage section 322 (see FIGS. 21 to 26 and 32 to be described later).

Here, the evaluation data may include a gaze time of the object person 101 on the nursing care robot 100 (time in which faces or eyes face each other), a speech time of the object person 101, the presence or absence of detection of a smile of the object person 101, the presence or absence of a negative reaction, and the like. This evaluation data may be defined as a value of acceptability. As a result, the application generator 323 causes the nursing care robot 100 to execute a nursing care action in search of an optimum approach distance and an optimum approach based on acceptability for each object person 101.

For example, as illustrated in FIGS. 23 to 26, and the like to be described later, the application generator 323 may cause the nursing care robot 100 to execute a nursing care action based on humanitude as a standard on the basis of cognitive characteristics of the object person 101 and acceptability of the nursing care robot 100 for the object person 101.

The application implementation schedule data storage section 325 stores data of an implementation schedule of a plurality of applications for causing the nursing care robot 100 to execute a nursing care action. The application generator 323 may cause the nursing care robot 100 to execute a nursing care action by each of the applications in accordance with the implementation schedule stored in the application implementation schedule data storage section 325 (see FIGS. 27 to 31 to be described later).

The application implementation schedule data storage section 325 stores, as setting data of the implementation schedule, setting information about selection of an application to be implemented in accordance with the implementation schedule, selection of the object person 101 to implement the application, and a time at which the application is to be implemented, which are set on the basis of an instruction from the small information terminal 212 (see FIGS. 27 and 31 to be described later). After the application generator 323 causes the nursing care robot 100 to execute the nursing care action by each application in accordance with the implementation schedule stored in the application implementation schedule data storage section 325, the application generator 323 may revise the setting data of the implementation schedule stored in the application implementation schedule data storage section 325 on the basis of a result of executing the nursing care action. Thus, for example, the application generator 323 may execute "greeting/calming down-vital measurement" as a basic application, and an application such as "recreation", "tea serving", "excretion assistance", and "visit assistance" as an applied application in accordance with a shift table set by a scheduler. The small information terminal 212 receives setting of the implementation schedule from the staff member 200 of a nursing facility. The application generator 323 may present the revised setting data of the implementation schedule to the small information terminal 212 so as to allow the staff member 200 of the nursing facility to edit the setting data of the implementation schedule.

The user individual setting data storage section 324 stores individual operation parameters of the nursing care robot 100 for the object person 101 that are set on the basis of information about acceptability of the nursing care robot 100 for the object person 101 (see FIG. 32 to be described later). The application generator 323 may cause the nursing care robot 100 to execute a nursing care action on the basis of the operation parameters of the nursing care robot 100 stored in the user individual setting data storage section 324. The operation parameters may include, for example, setting related to whether or not talking is possible, a voice volume, speech speed, body motion speed, moving speed, an accessible distance, whether or not physical contact is possible, hobbies and preferences, and other special remarks. Setting of the operation parameters is received from the staff member 200 of the nursing facility through the small information terminal 212.

After the application generator 323 causes the nursing care robot 100 to execute a nursing care action on the basis of the operation parameters of the nursing care robot 100 stored in the user individual setting data storage section 324, the application generator 323 may revise the operation parameters of the nursing care robot 100 stored in the user individual setting data storage section 324 on the basis of a result of executing the nursing care action, and present the revised operation parameters of the nursing care robot 100 to the small information terminal 212 so as to allow the staff member 200 of the nursing facility to edit the operation parameters. The application generator 323 may cause the nursing care robot 100 to execute a nursing care action by performing feedback learning of an evaluation result for each application implementation, automatically generating and proposing an individual setting amendment and an schedule amendment, and causing the staff member 200 to confirm and edit them.

(Overview of Scheduler and Application)

Figure 23:
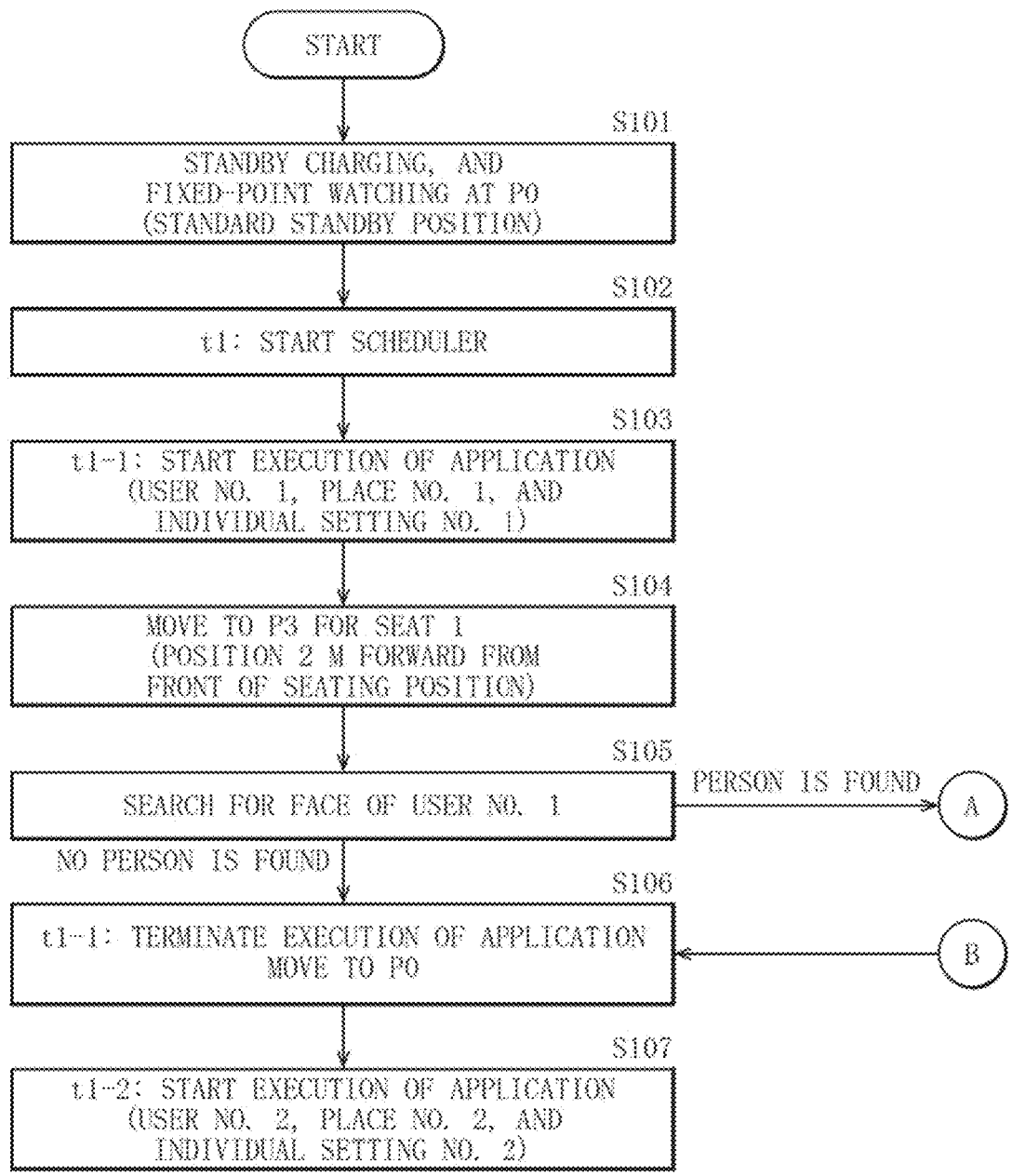
FIG. 23 is a flowchart illustrating an example of a processing operation of an "greeting/calming down-vital measurement application" by the robot operating system according to the first embodiment.
Figure 24:
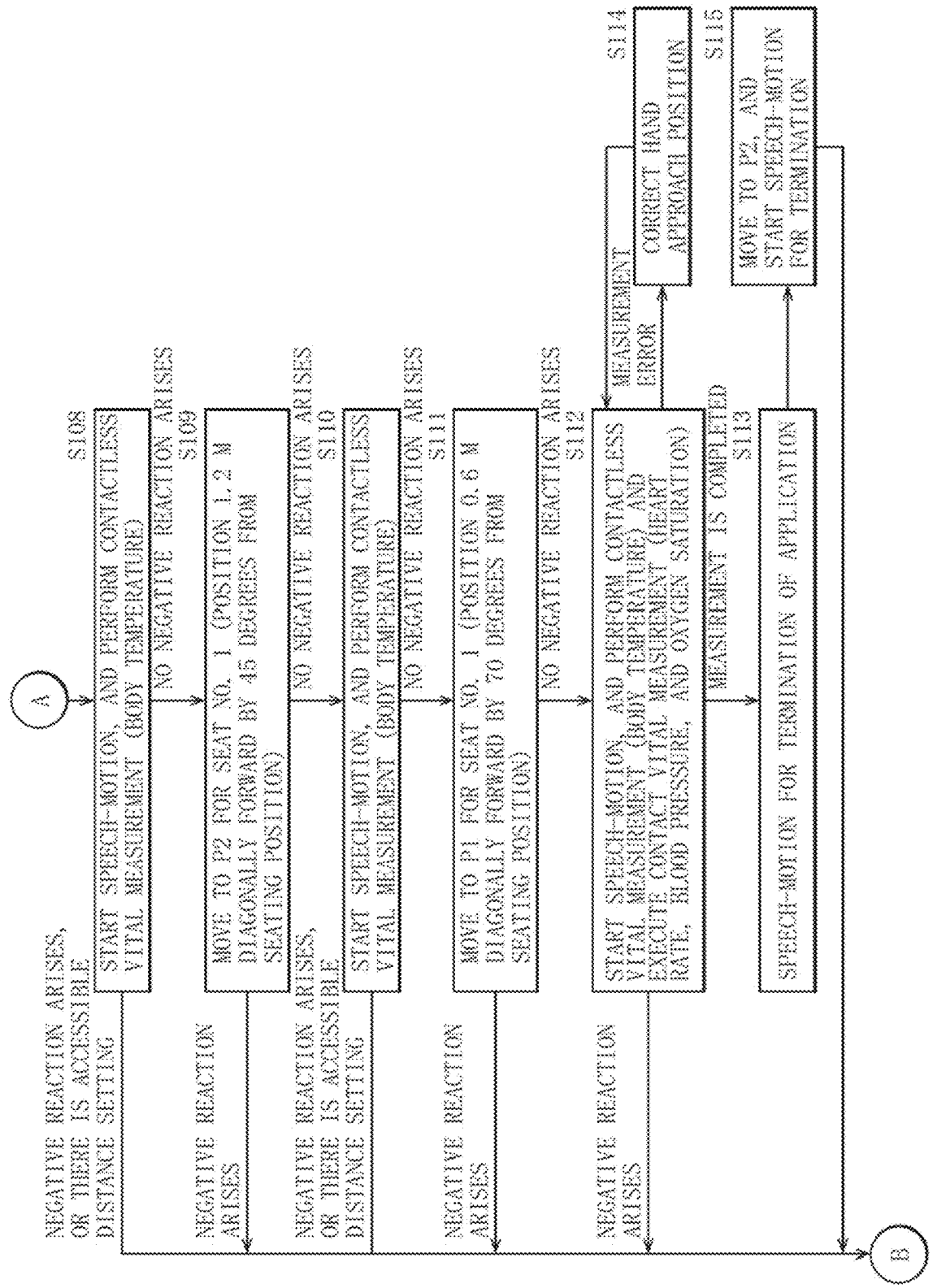
FIG. 24 is a flowchart subsequent to FIG. 23.
Figure 25:
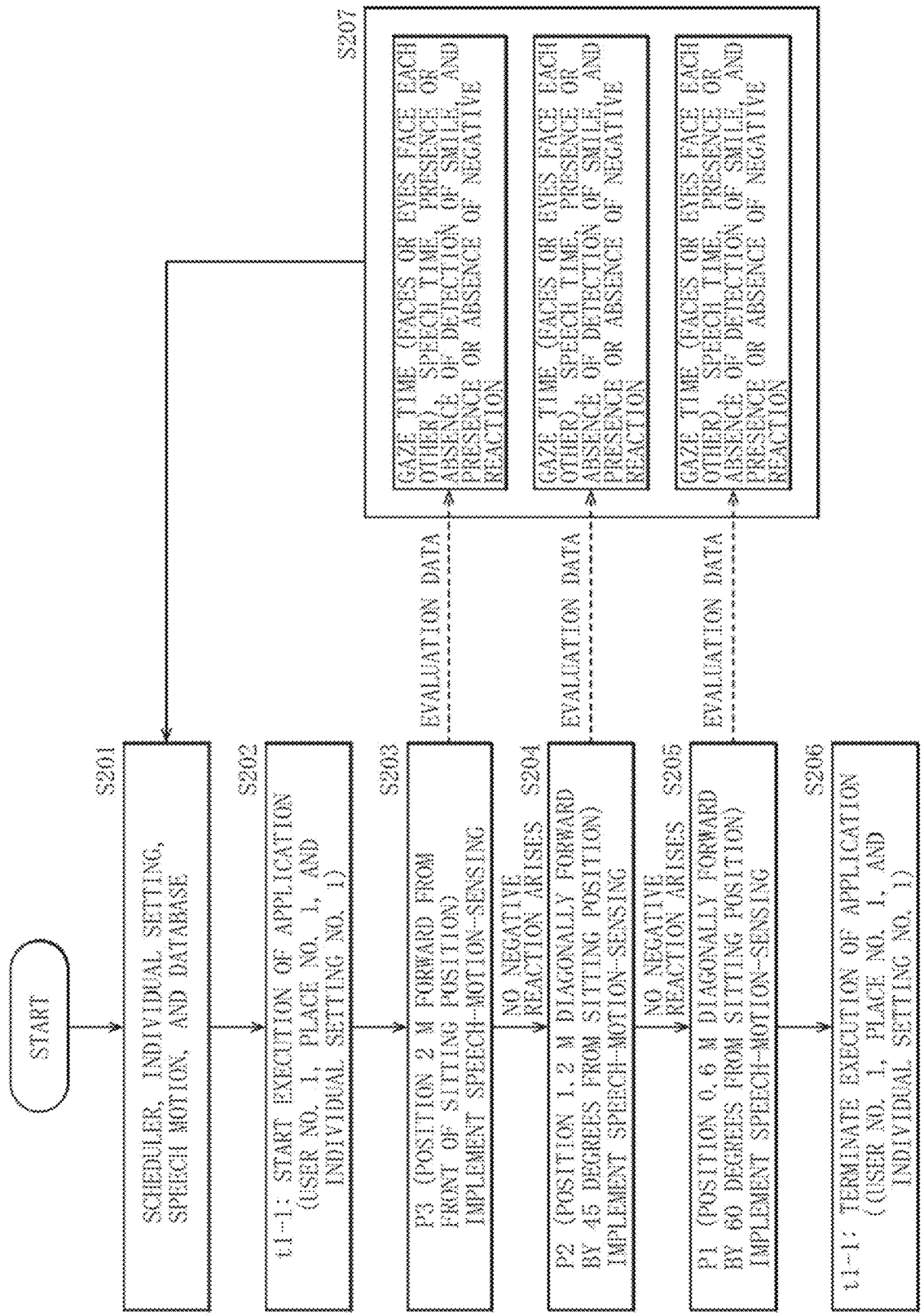
FIG. 25 is a flowchart illustrating an example of evaluation data output processing by the "greeting/calming down-vital measurement application" by the robot operating system according to the first embodiment.
Figure 29:
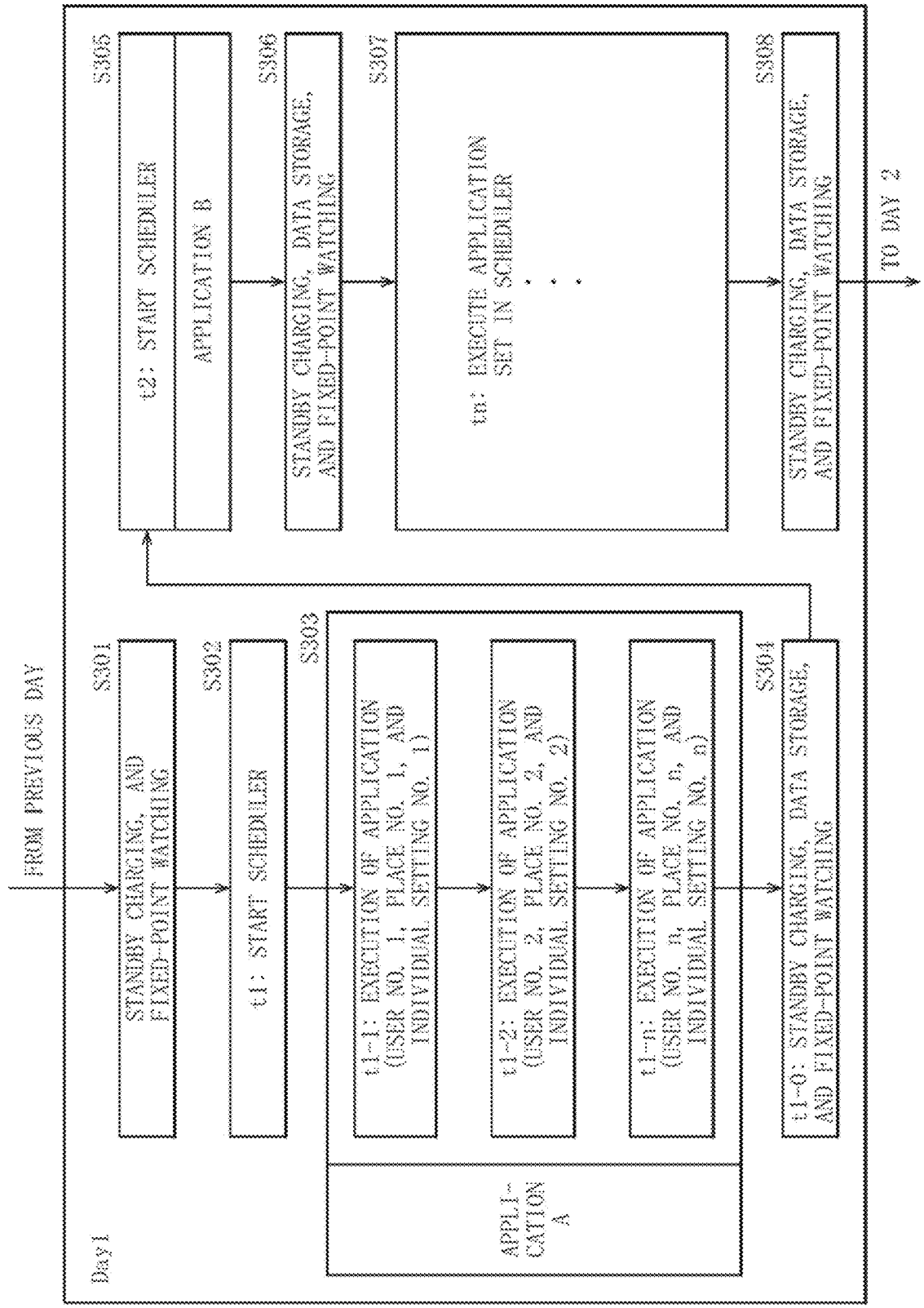
FIG. 29 is a flowchart illustrating an example of an operation of implementing a plurality of applications by the robot operating system according to the first embodiment.
Figure 30:
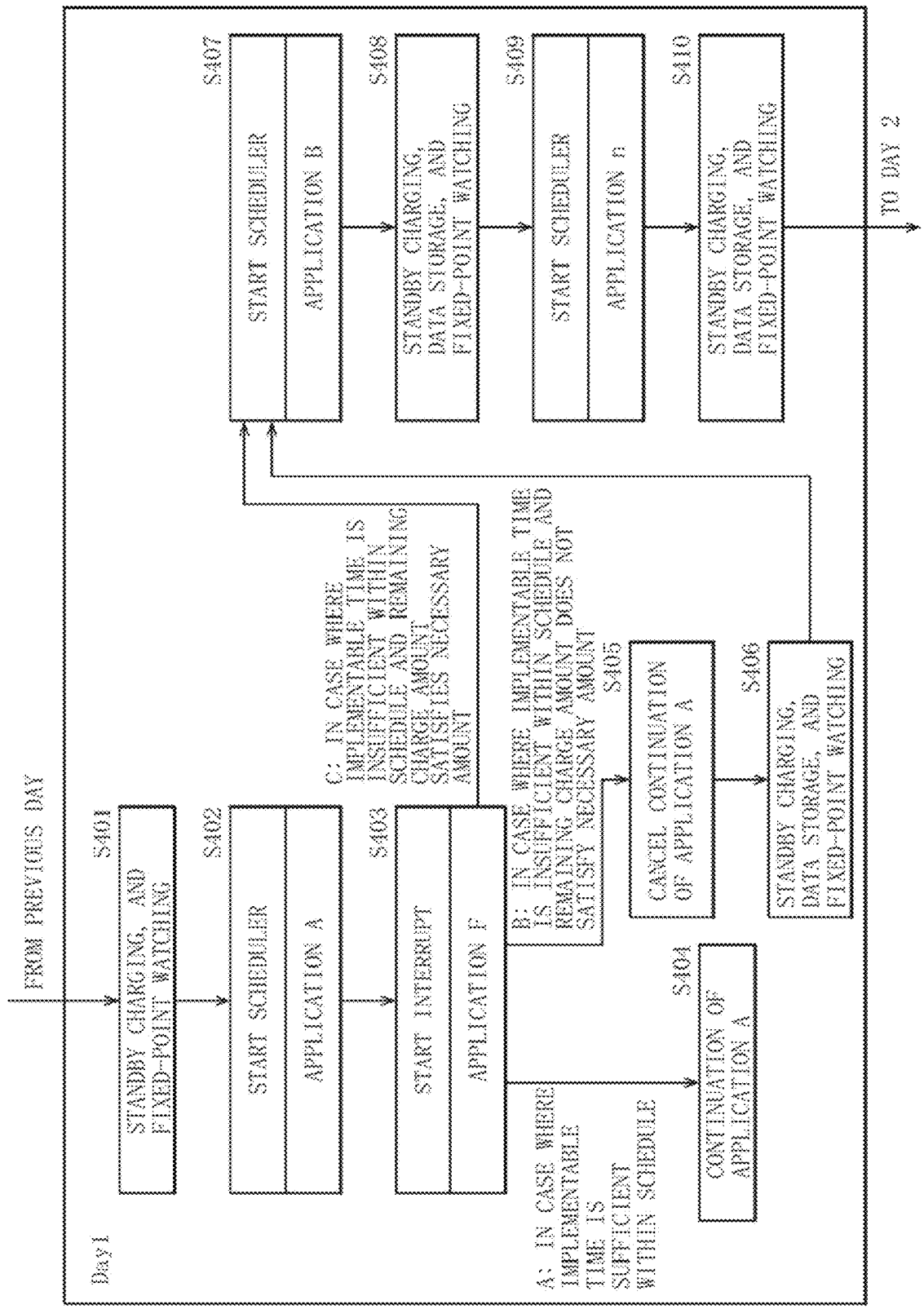
FIG. 30 is a flowchart illustrating an example of an operation of implementing an application in a case where another application is interrupted during implementation of a plurality of applications by the robot operating system according to the first embodiment.
Figure 33:
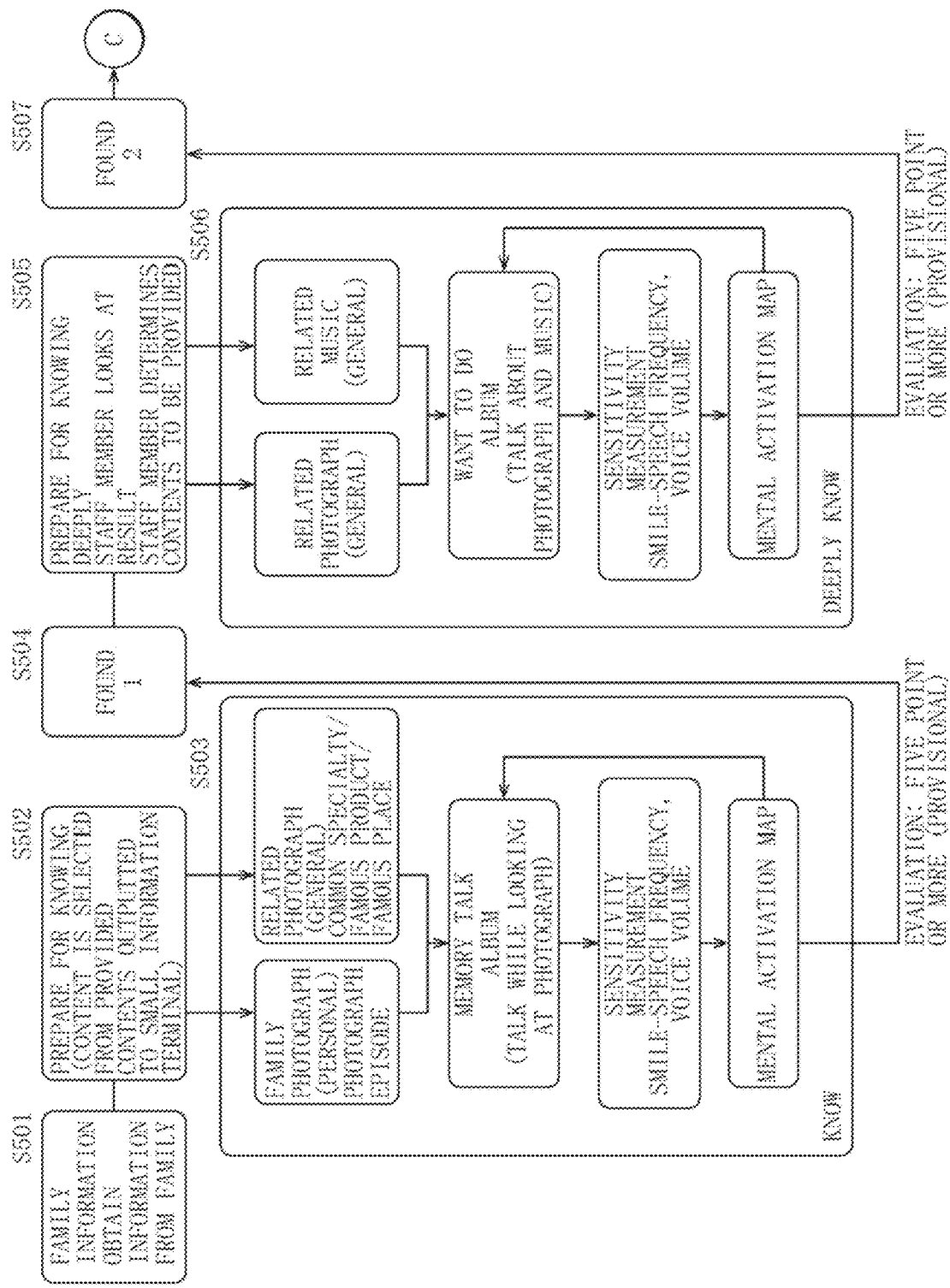
FIG. 33 is a flowchart illustrating an example of a processing operation of an "individual recreation application" by the robot operating system according to the first embodiment.
Figure 34:
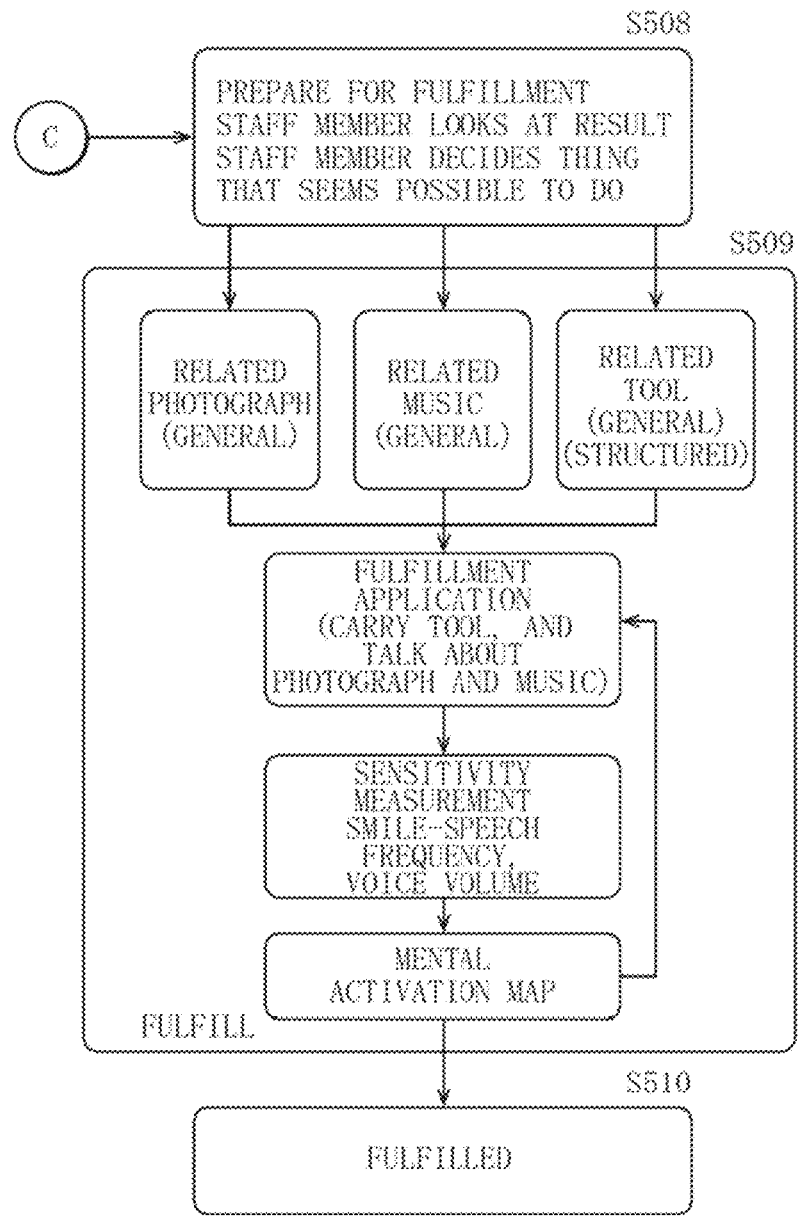
FIG. 34 is a flowchart subsequent to FIG. 33.
Figure 35:
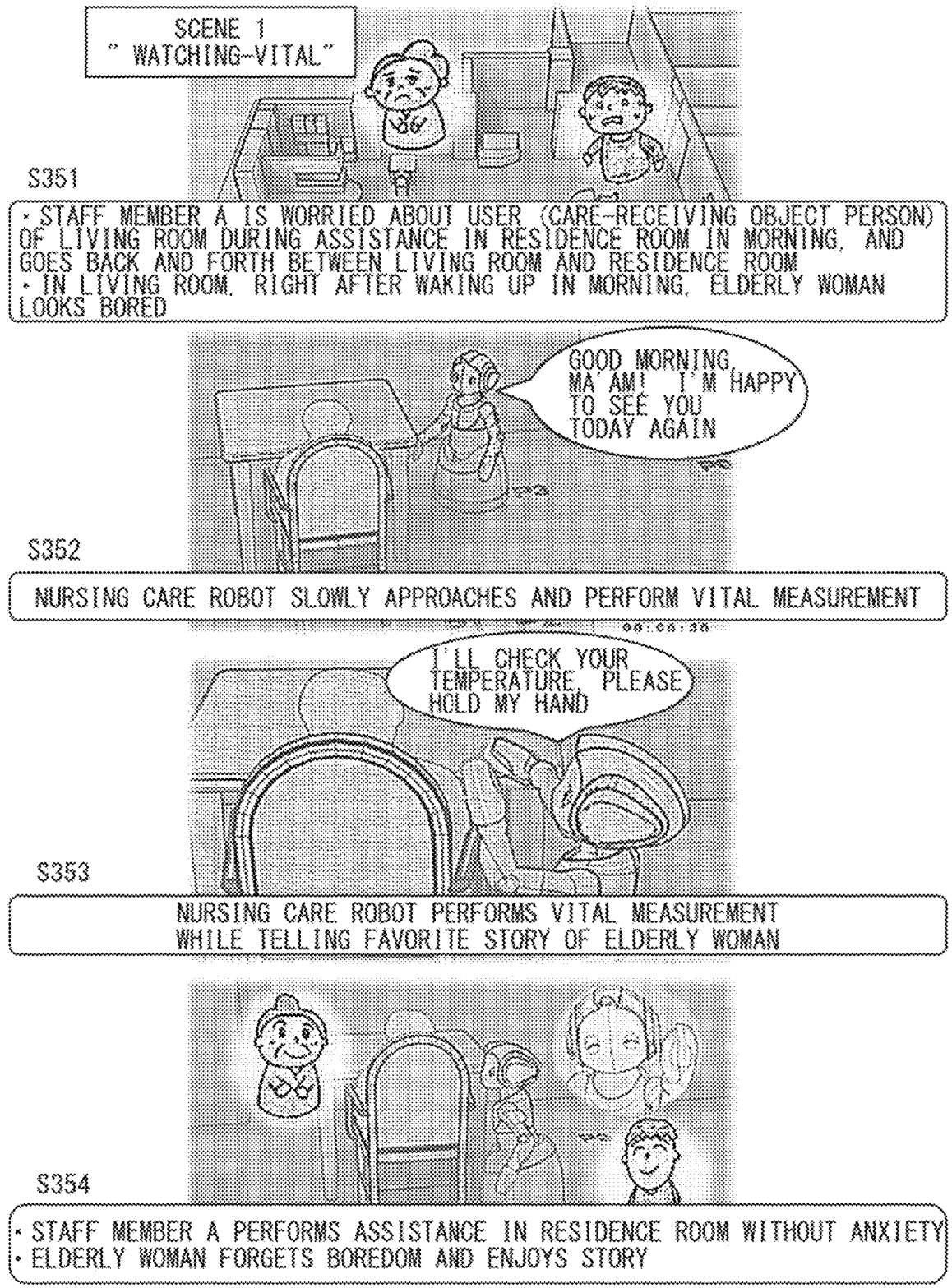
FIG. 35 is an explanatory diagram illustrating a working example of a "watching-vital application" by the robot operating system according to the first embodiment.
Figure 36:
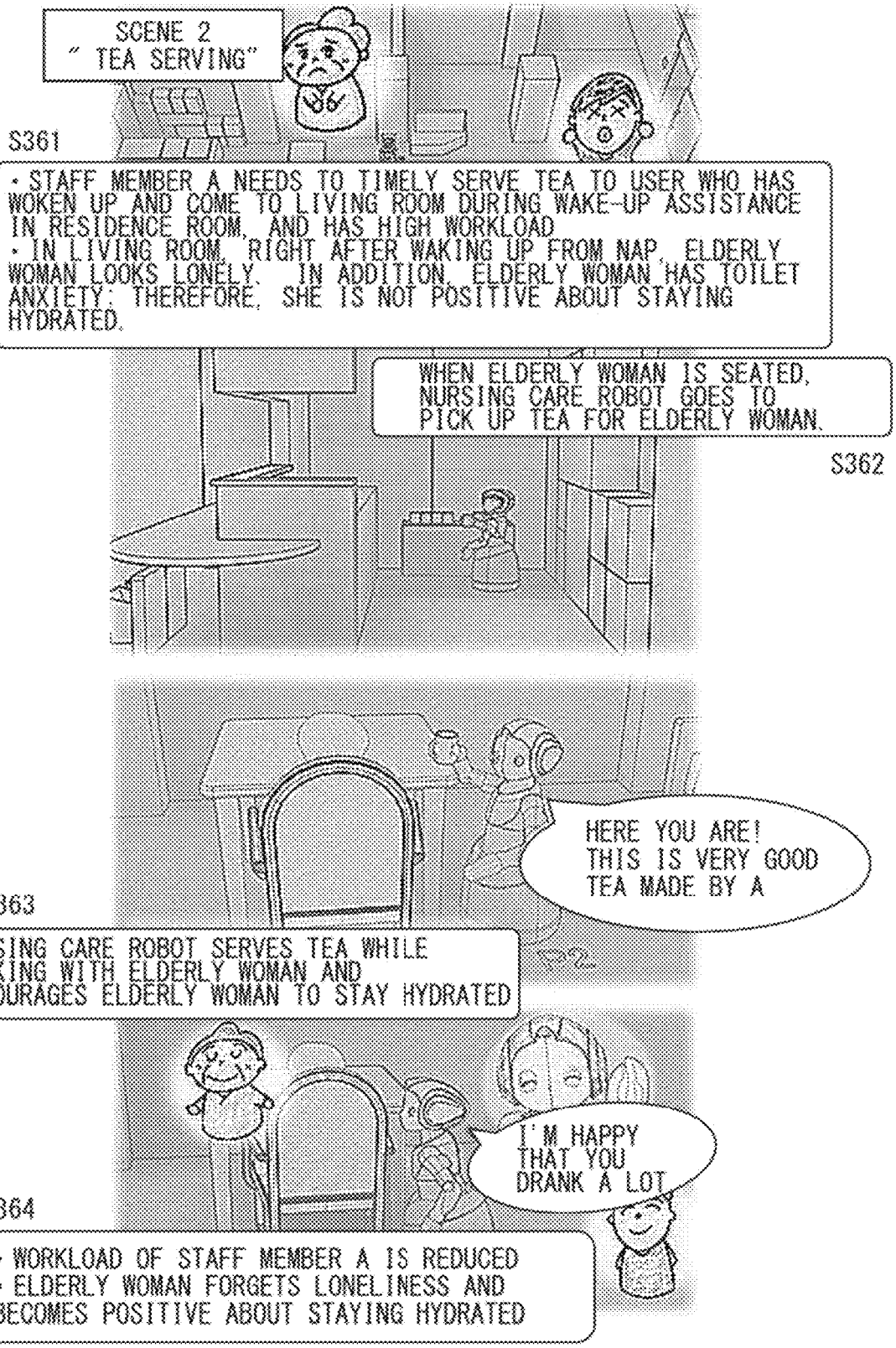
FIG. 36 is an explanatory diagram illustrating a working example of a "tea serving application" by the robot operating system according to the first embodiment.
Figure 38:
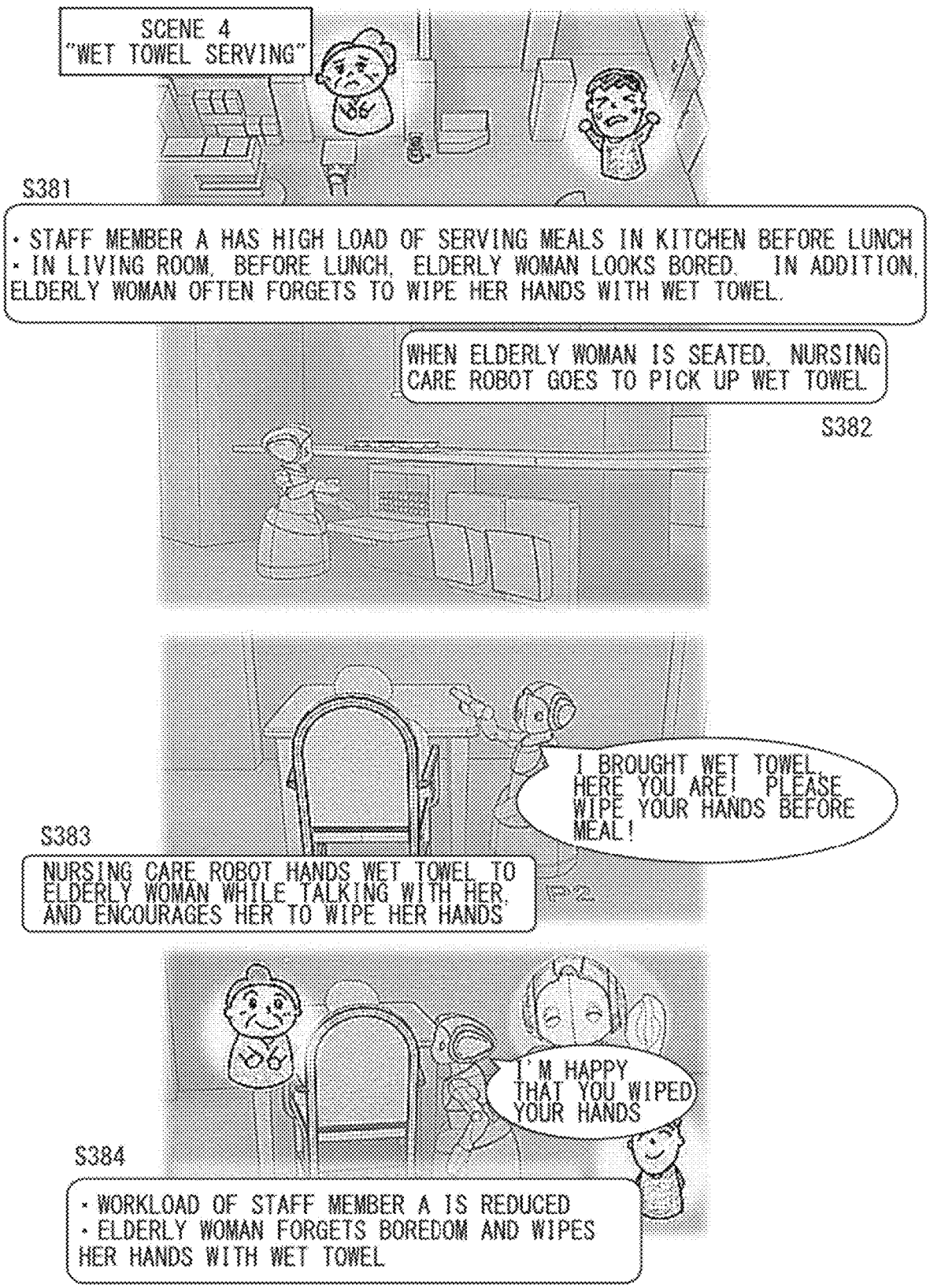
FIG. 38 is an explanatory diagram illustrating a working example of a "wet towel serving application" by the robot operating system according to the first embodiment.
Figure 39:
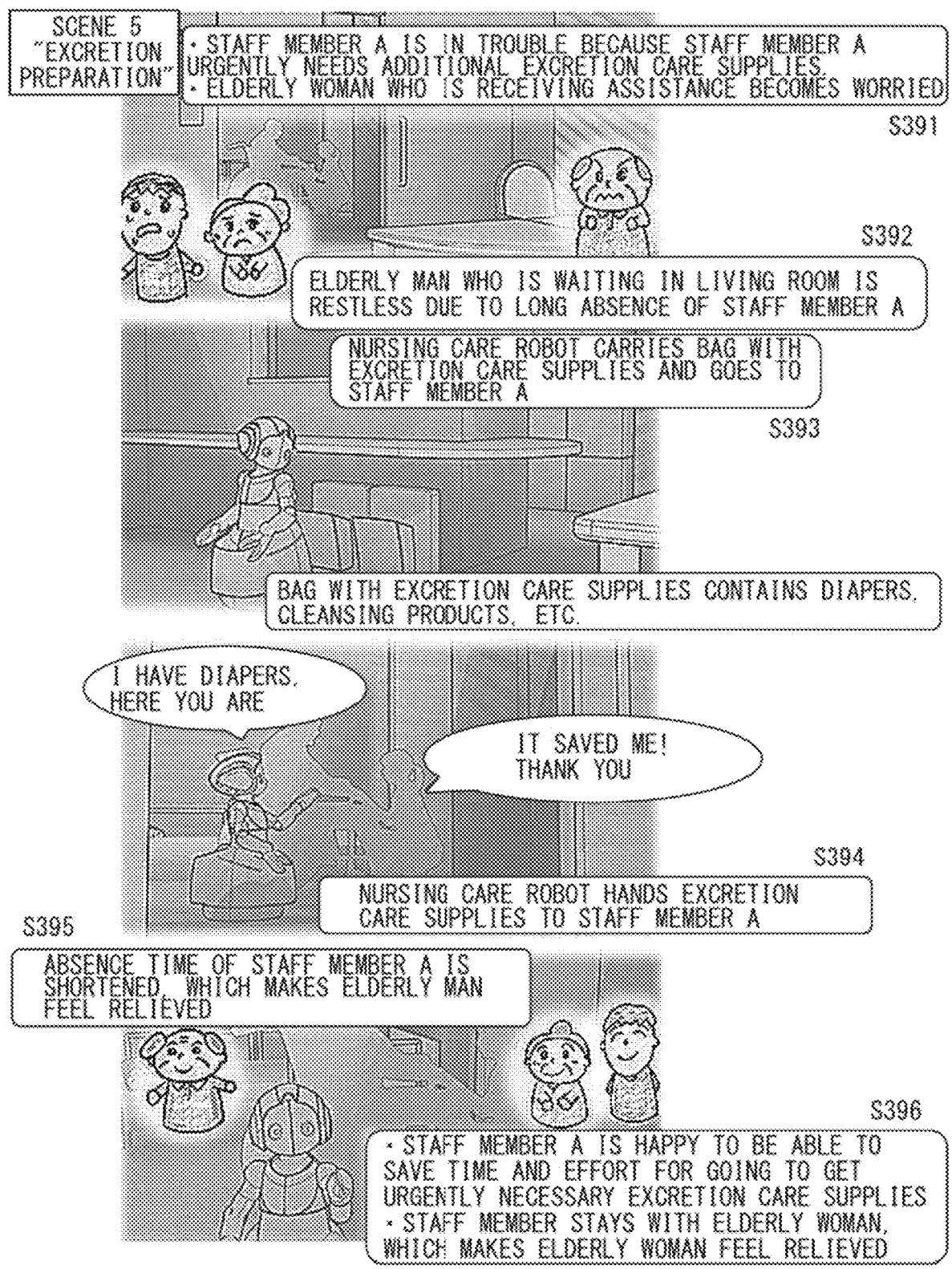
FIG. 39 is an explanatory diagram illustrating a working example of an "excretion preparation application" by the robot operating system according to the first embodiment.
Figure 40:
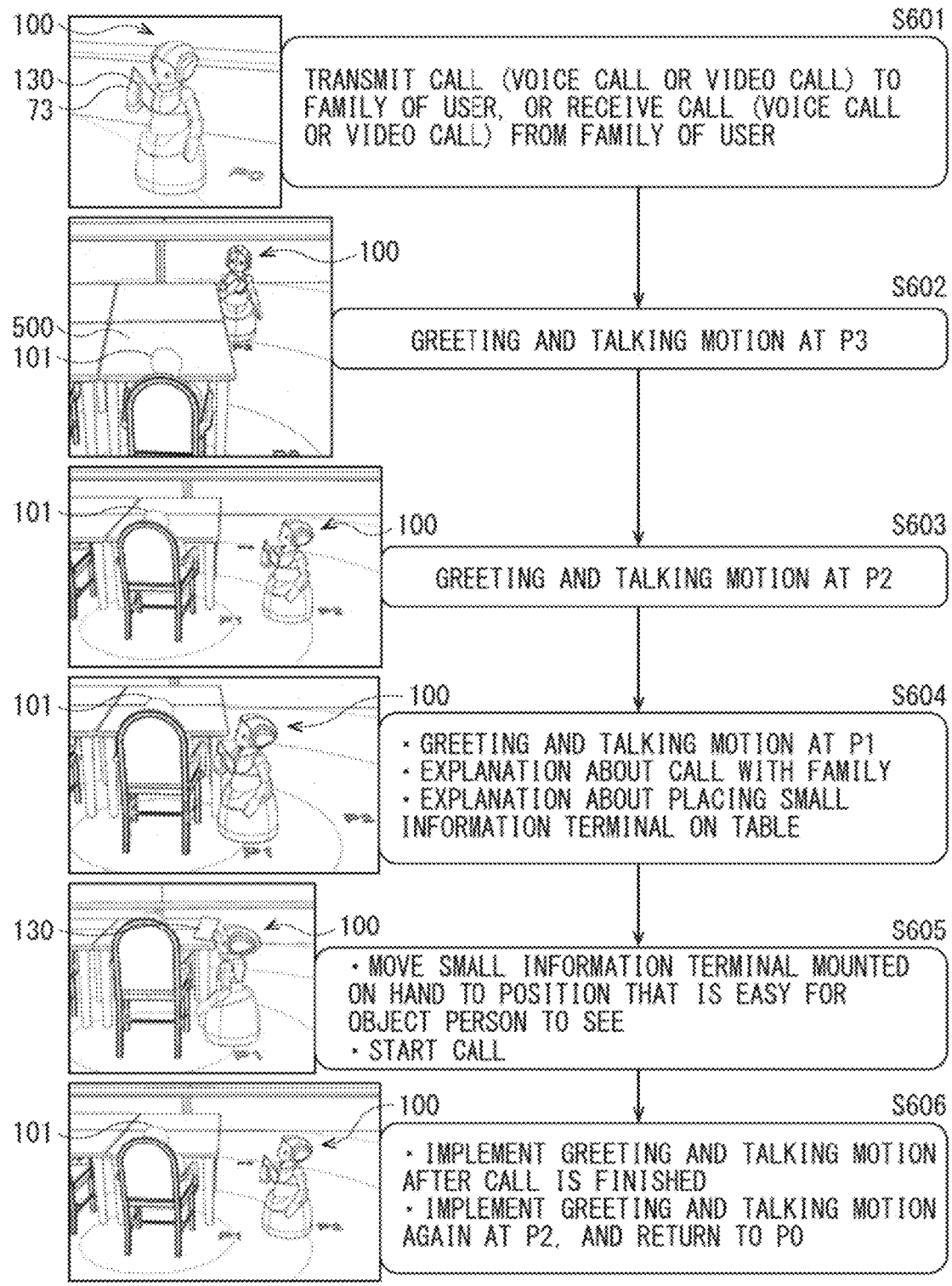
FIG. 40 is an explanatory diagram illustrating a working example of a "telephone assistance application" by the robot operating system according to the first embodiment.
Figure 41:
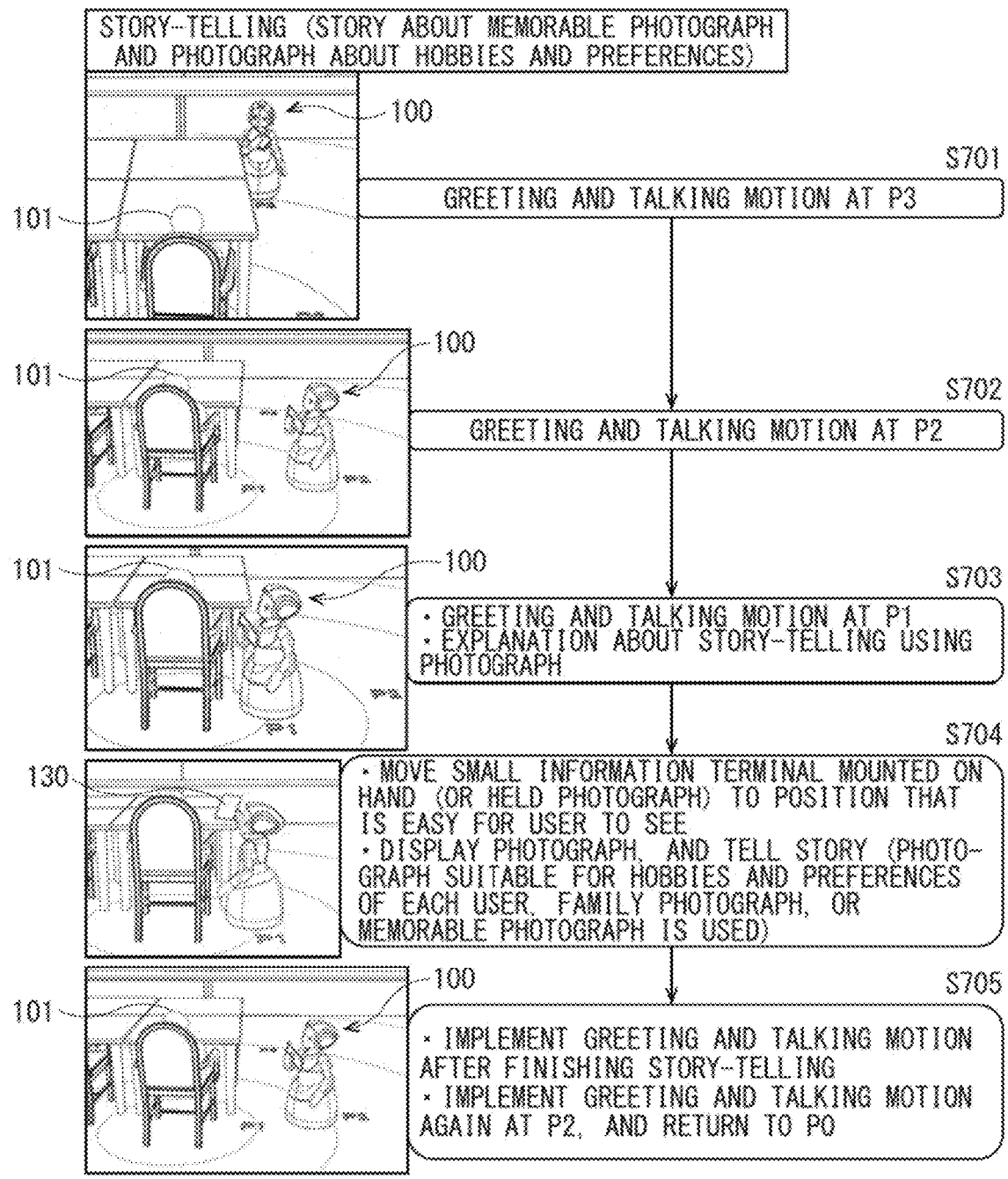
FIG. 41 is an explanatory diagram illustrating a working example of a "story-telling application" by the robot operating system according to the first embodiment.
Figure 42:
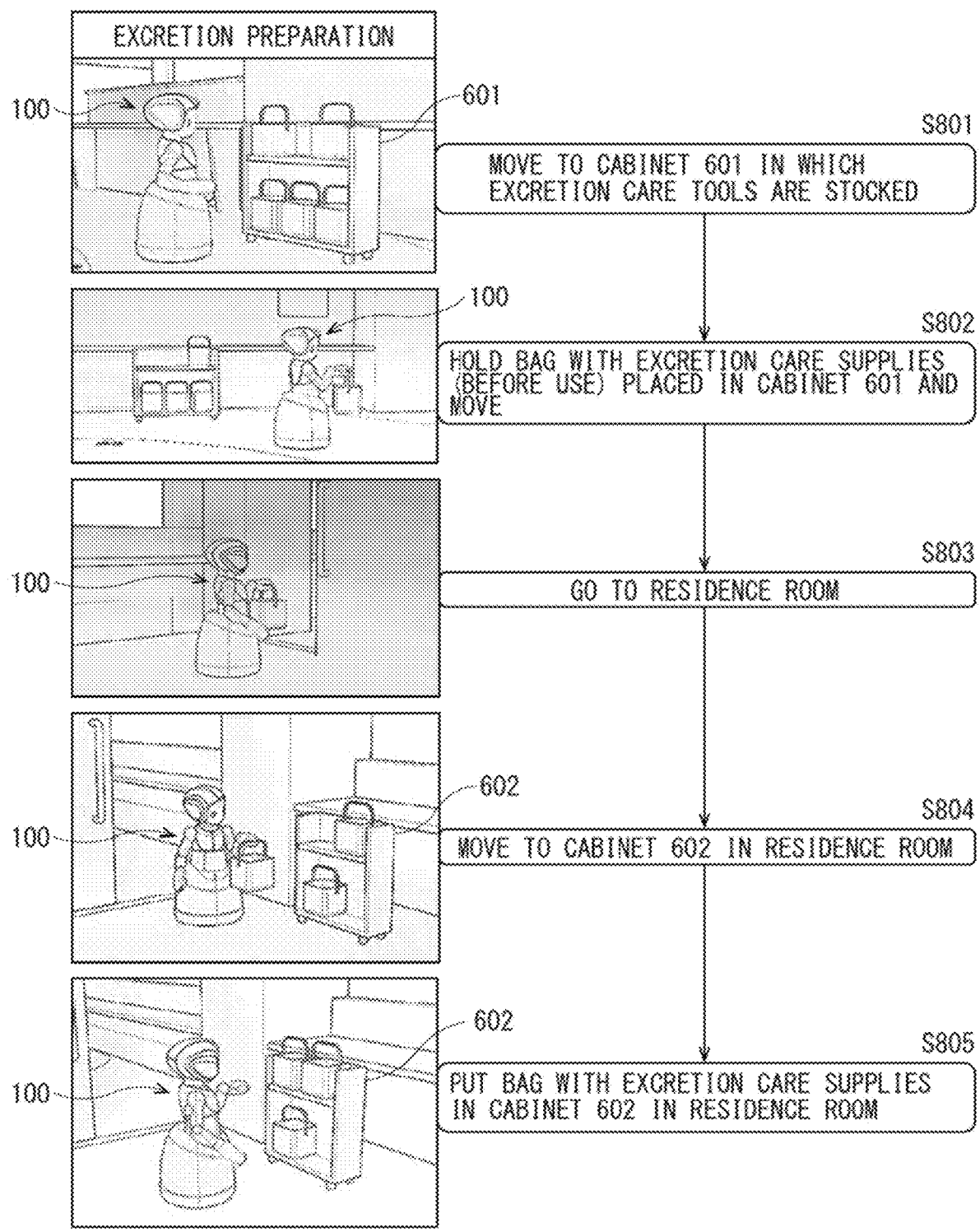
FIG. 42 is an explanatory diagram illustrating a working example of the "excretion preparation application" by the robot operating system according to the first embodiment.
Figure 43:
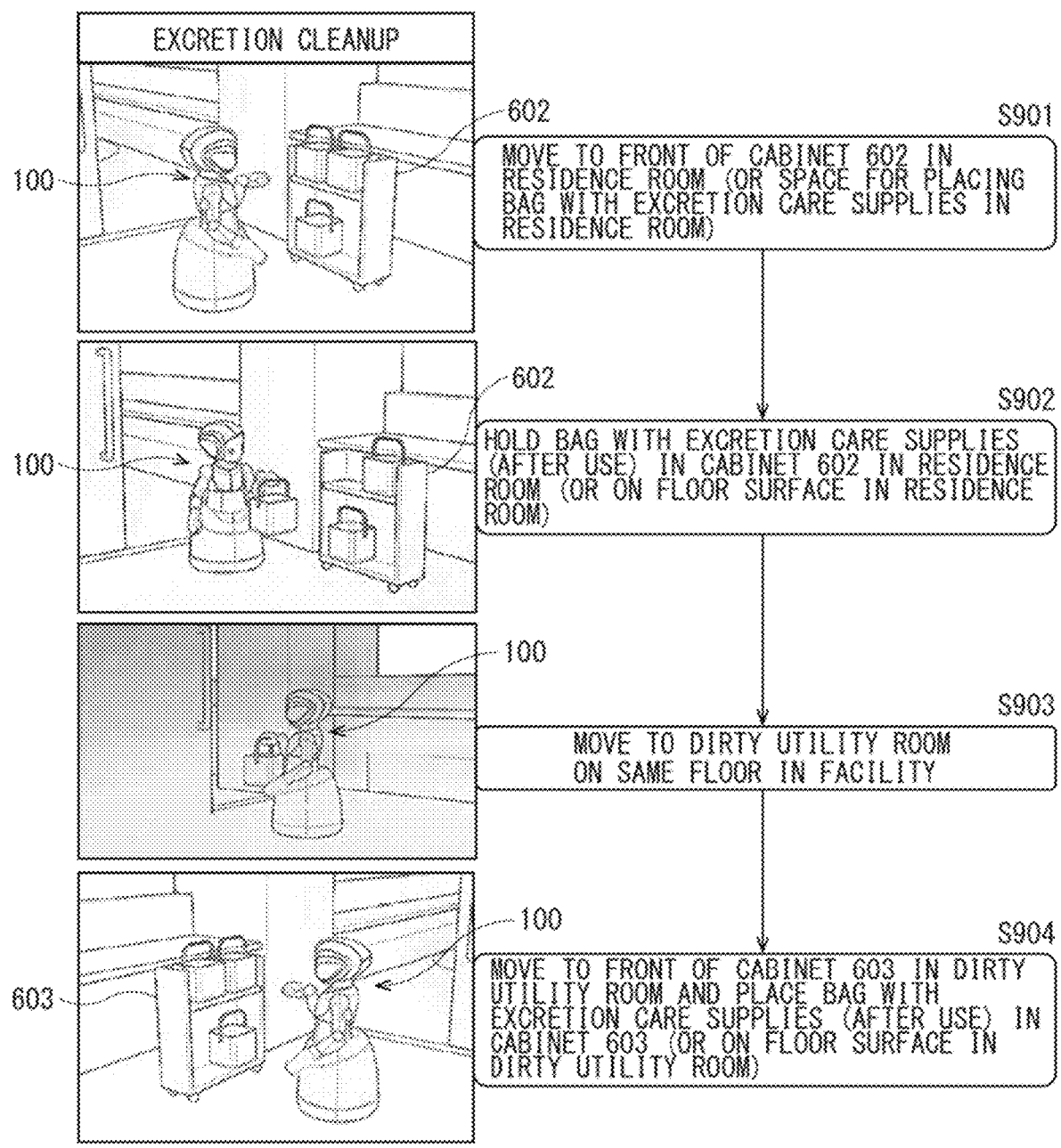
FIG. 43 is an explanatory diagram illustrating a working example of an "excretion cleanup application" by the robot operating system according to the first embodiment.

FIG. 23 is a flowchart illustrating an example of a processing operation of an "greeting/calming down-vital measurement application" by the robot operating system. FIG. 24 is a flowchart subsequent to FIG. 23. FIG. 25 is a flowchart illustrating an example of evaluation data output processing by the "greeting/calming down-vital measurement application" by the robot operating system. FIG. 26 is an explanatory diagram illustrating an example of an evaluation data output result by the "greeting/calming down-vital measurement application" by the robot operating system. FIG. 27 illustrates a creation example of an implementation schedule of a plurality of applications by the robot operating system. FIG. 28 illustrates an example of a nursing care room as an object of the robot operating system. FIG. 29 is a flowchart illustrating an example of an operation of implementing a plurality of applications by the robot operating system. FIG. 30 is a flowchart illustrating an example of an operation of implementing an application in a case where another application is interrupted during implementation of a plurality of applications by the robot operating system. FIG. 31 illustrates an example of a setting interface of an implementation schedule of applications by the robot operating system. FIG. 32 illustrates an example of a setting interface for performing individual setting for the care-receiving object person 101 by the robot operating system. FIG. 33 is a flowchart illustrating an example of a processing operation of an "individual recreation application" by the robot operating system. FIG. 34 is a flowchart subsequent to FIG. 33. FIG. 35 illustrates a working example of a "watching-vital application" by the robot operating system. FIG. 36 illustrates a working example of a "tea serving application" by the robot operating system. FIG. 37 illustrates a working example of a "snack serving application" by the robot operating system. FIG. 38 illustrates a working example of a "wet towel serving application" by the robot operating system. FIG. 39 illustrates a working example of an "excretion preparation application" by the robot operating system. FIG. 40 illustrates a working example of a "telephone assistance application" by the robot operating system. FIG. 41 illustrates a working example of a "story-telling application" by the robot operating system. FIG. 42 illustrates a working example of the "excretion preparation application" by the robot operating system. FIG. 43 illustrates a working example of an "excretion cleanup application" by the robot operating system.

The application generator 323 provides a scheduler. The application generator 323 automatically generates and proposes an execution pattern and scheduling set of applications to be executed by the nursing care robot 100 in a day. The application generator 323 proposes an optimum application set for minimizing absence time of the staff member 200 in the living room 401 (FIG. 28) in response to daily change in the nursing facility, such as change in the condition of the care-receiving object person 101 (parameters include the degree of acceptability of the nursing care robot 100 as well as change in dementia level, a physical condition, and feeling) and change in the work shift of the staff member 200. The application generator 323 provides a watching (condition observation and communication) application as a base load, and provides a peripheral work application, and a recreation application as a development of the watching application in addition to the base application.

Applications provided by the application generator 323 include the following examples.

Active watching: morning watching, afternoon watching, night watching, midnight watching
Indirect assistance: vital measurement
   Long-distance non-contact (a body temperature, and a heart rate)
   Short-distance contact (a body temperature, a blood pressure, oxygen saturation)
Order, wet towel serving, snack serving, and tea serving
Direct assistance: transfer assistance (holding on)
Peripheral work: excretion preparation, excretion cleanup, desk wiping, tea removal, snack removal, cup washing, tea making
Recreation: story-telling (story about a memorable photograph, a photogram about hobbies and preferences, and the like), singing, dancing, gymnastics, a hand massage, help with a thing wanted to do (learning about favorable things), telephone assistance (a telephone call with family)

The above-described application list is selected from an application list prepared in advance and including 50 nursing care site work items that are possible to be used in order of importance under supervision of the staff member 200 from a result of considering needs (a degree of trouble) and functions, a value to be obtained, and technical feasibility.

Active watching that as a basic application includes a plurality of variations of execution scenarios in accordance with:
   (1) different time frames including morning, afternoon, night, and midnight,
   (2) a difference between conditions on the bed of the residence room 402 (FIG. 28) and on a wheelchair in the living room 401 (FIG. 28),
   (3) a dementia level of the care-receiving object person 101, and
   (4) a difference in acceptability of the nursing care robot 100.

An individual approach, such as a way of keeping a distance to the object person 101, a way of approaching the object person 101, greeting, and interaction contents, is optimized depending on the object person 101, and is executable through a schedule and a sensing result. The individual approach is automatically generated for each object person 101 by the application generator 323, and is presented to the large information terminal 310 and the small information terminal 212. The individual approach is deployed to be executable by the nursing care robot 100 after being revised and confirmed by the staff member 200. FIGS. 35 to 39 each illustrate a storyboard of a representative example of the above-described application. FIG. 33 and FIG. 34 each illustrate an implementation flow of an individual recreation application realizable by using an approach of enhancing acceptability that is an important point of the robot operating system. This is an application for performing interaction with use of a related photographic image, digging deep into and learning about a thing each object person 101 wants to do, transmitting such information to the staff member 200 and a family, and assisting the object person 101 in fulfilling the thing the object person 101 wants to do.

The application generator 323 calculates an estimated necessary implementation time for each application and each care-receiving object person 101 (calculation based on past necessary time data), and also calculates a necessary charging standby time from a remaining power amount of the nursing care robot 100, and automatically generates a schedule shift table of applications implementable within a predetermined time. The estimated necessary implementation time for each care-receiving object person 101 is calculated from application contents, the location of the care-receiving object person 101, individual setting contents (moving speed, speech speed, and user characteristics (the amount of speech, preferences, etc.), and the like. FIG. 27 illustrates a creation example of a daily schedule. Information such as the name of the object person 101, arrangement of a seat 404, and arrangement of the residence room 402 is also first registered and used as target position information (FIG. 28). It is to be noted that FIG. 28 illustrates the position of the seat 404 and a configuration example of the residence room 402 in one unit of the nursing facility. In the robot operating system, for example, places for approaching the care-receiving object person 101 is limited to two places including the position of the seat 404 and a position in the residence room 402, and are associated with the care-receiving object person 101, which reduces an autonomous movement control load and a human recognition detection load of the nursing care robot 100, and improves realization stability of applications.

In the robot operating system, applications are executed in accordance with the set scheduler after confirmation by the staff member 200 (FIG. 29). In the robot operating system, before and after execution of the applications, the nursing care robot 100 performs charging at a charging standby point 403 (FIG. 28) in the living room 401. In addition, the center PC 320 stores input data during implementation of the applications. The nursing care robot 100 constantly watches the living room 401 at a fixed point. In watching the living room 401 at the fixed point, the nursing care robot 100 continues to detect an abnormality in an observable range by tracking, voice input, and body temperature measurement.

In the robot operating system, in a case where an application group is not finished within a calculated scheduled time due to a trouble, applications are cancelled in ascending order of application implementation priority, and execution of the next scheduler is prioritized (FIG. 30). In order to schedule the charging time of the nursing care robot 100 with time to spare, the robot operating system also reduces a standby time and allocates a reduced time to an application implementation time. A request from the staff member 200 and an interrupt application are also determined to have a high priority, and the schedule is interrupted to perform processing. A schedule after the interruption is automatically selected from implementation patterns A, B, and C and executed on the basis of the remaining power amount and the remaining application implementation time of the nursing care robot 100, and the next standby chargeable time. In a case where the scheduled application group is not finished within the calculated scheduled time due to interruption, applications are cancelled in ascending order of application implementation priority, and execution of the next scheduler is prioritized. In order to schedule the charging time of the nursing care robot 100 with time to spare, the standby time is also reduced to allocate a reduced time to the application implementation time. As an application to be used as an interrupt application, it is analyzed that high needs include requests for excretion assistance and greeting/calming down from the staff member 200.

In many nursing facilities, a life pattern for each day of the week is determined in accordance with a schedule of bathing, a hospital visit, recreation, and the like. Accordingly, in the robot operating system, the implementation schedule of the applications of the nursing care robot 100 is created, for example, on a weekly basis. For example, a monthly implementation schedule is created, where Week 1 is from Day 1 to Day 7, and Month 1 is from Week 1 to Week 4 (to Week 5 depending on the month). In addition, in a case where change in shift of the staff member 200 (change in the number of staff members) or schedule change such as a family visit or a hospital visit occurs, the robot operating system causes the staff member 200 to revise the work shift, and automatically generates a schedule and a specific flow that reflect the work data.

The robot operating system has a programming tool for the staff member 200 to manually adjust an application schedule set of the nursing care robot 100 presented by the scheduler (FIG. 31). The robot operating system further has a tool for performing individual setting for the care-receiving object person 101 (FIG. 32). The individual setting for the care receiving object person 101 includes setting related to operation parameters (whether or not talking is possible, a voice volume, speech speed, body motion speed, moving speed, an accessible distance, whether or not physical contact is possible, hobbies and preferences, and other special remarks) of the nursing care robot 100 in consideration of information about acceptability for each care-receiving object person 101. A setting operation is performed with use of the small information terminal 212. It is possible for the staff member 200 to select an application corresponding to the object person 101 and its timing from the list and perform rearrangement by drag-and-drop with use of the small information terminal 212. The staff member 200 may also determine use of the application in real time for execution. In the robot operating system, an adjustment result by determination by the staff member 200 performed by the tool illustrated in FIGS. 31 and 32 is put into a database and used for learning, which also improves quality of an automatic generation result such as individual setting.

The robot operating system according to the first embodiment is not a fully autonomous robot system. It is difficult even for an AI (artificial intelligence) to generate action modification of the nursing care robot 100 corresponding to complicated situation change in a nursing care site, and the action modification is a system realized only by the co-creation of the experienced staff member 200 and the robot operating system. High-quality nursing care is practicable only by a human. The robot operating system is a means of fulfilling a wish by expanding and separating the body of the human.

(Processing Flow by Robot Operating System)

FIGS. 23 and 24 illustrate a processing flow of a working example of a basic application "greeting/calming down-vital measurement". Numerical values of distances and angles of positions illustrated in FIGS. 23 and 24 are representative examples, and it is important to pass through stages of a long distance, a medium distance, and a short distance. An optimum value for each object person 101 is set for each of the above-described numerical values. In the robot operating system, the nursing care robot 100 implements greeting with speech and a motion and vital measurement at each via point, and confirms the presence or absence of a negative reaction while measuring a reaction, and moves to a via point. FIG. 25 illustrates this sensing flow. Measured evaluation data is outputted as a table so as to allow the staff member 200 to confirm the evaluation data, and the evaluation data is made displayable on the small information terminal 12 such as a tablet operated by the staff member 200 (FIG. 26).

In the robot operating system, even in a case where the staff member 200 observes the object person 101 and is able to determine that the object person 101 is unwilling, it is possible to provide an instruction for termination of application execution by a voice instruction or the like. Data of an approach distance, a relative angle with the object person 101, and a hand coordinate position is stored as approach parameters for each object person 101 for a hand approach position correction amount, and an optimum hand approach position for each object person 101 is learned to increase a measurement success rate.

Next, description is given of a processing operation of the "greeting/calming down-vital measurement application" in FIG. 23.

In the robot operating system, first, the nursing care robot 100 performs standby charging, and fixed-point watching at an initial position P0 (standard standby position) (step S101). Next, the robot operating system starts a scheduler set at a time t1 (step S102). Next, the robot operating system starts execution of an application (a user No. 1, a place No. 1, and individual setting No. 1) set at a time t1-1 (step S103). Next, the robot operating system causes the nursing care robot 100 to move to the long-distance position P3 for a seat No. 1 (a position 2 m forward from the front of a seating position) (step S104). Next, the robot operating system causes the nursing care robot 100 to search for the face of the user No. 1 (step S105). In a case where a person (care-receiving object person 101) is found in step S105, the robot operating system then proceeds to processing in step S108. In a case where no person is found in step S105, the robot operating system then terminates the execution of the application set at the time t1-1 and causes the nursing care robot 100 to move to the initial position P0 (step S106). Next, the robot operating system starts execution of an application (a user No. 2, a place No. 2, and individual setting No. 2) set at a time t1-2 (step S107).

Meanwhile, in a case where a person is found in step S105, the robot operating system next causes the nursing care robot 100 to start speech-motion and perform contactless vital measurement (body temperature) (step S108). In a case where a negative reaction arises in step S108 or in a case where there is accessible distance setting, the robot operating system next proceeds to processing in step S106. In a case where no negative reaction arises in step S108, the robot operating system causes the nursing care robot 100 to move to the short-distance position P2 for the seat No. 1 (a position 1.2 m diagonally forward by 45 degrees from the seating position) (step S109).

In a case where a negative reaction arises in step S109, the robot operating system next proceeds to processing in step S106. In a case where no negative reaction arises in step S109, the robot operating system next causes the nursing care robot 100 to start speech-motion, and causes the nursing care robot 100 to perform contactless vital measurement (body temperature) (step S110). In a case where a negative reaction arises in step S110 or in a case where there is accessible distance setting, the robot operating system next proceeds to processing in step S106. In a case where no negative reaction arises in step S110, the robot operating system next causes the nursing care robot 100 to move to the short-distance position P1 for the seat No. 1 (a position 0.6 m diagonally forward by 70 degrees from the seating position) (step S111).

In a case where a negative reaction arises in step S111, the robot operating system next proceeds to processing in step S106. In a case where no negative reaction arises in step S111, the robot operating system next causes the nursing care robot 100 to start speech-motion, and causes the nursing care robot 100 to perform contactless vital measurement (body temperature) and execute contact vital measurement (a heart rate, a blood pressure, and oxygen saturation) (step S112). In a case where a measurement error occurs in step S112, the robot operating system next corrects the hand approach position (step S114), and performs processing in step S112 again. In a case where measurement is completed in step S112, the robot operating system next causes the nursing care robot 100 to perform speech-motion for termination of the application (step S113). Next, the robot operating system causes the nursing care robot 100 to move to the medium-distance position P2, starts speech-motion for termination (step S115), and then proceeds to processing in step S106.

Next, description is given of an operation of evaluation data output processing by the "greeting/calming down-vital measurement application" in FIG. 25.

First, the robot operating system performs processing of a scheduler, individual setting, speech motion, and a database (step S201). Next, the robot operating system starts execution of an application (the user No. 1, the place No. 1, and the individual setting No. 1) set at the time t1-1 (step S202).

Next, the robot operating system causes the nursing care robot 100 to move to the long-distance position P3 (a position 2 m forward from the front of the sitting position) and implement speech-motion-sensing (step S203). In a case where no negative reaction arises in step S203, the robot operating system next causes the nursing care robot 100 to move to the short-distance position P2 (a position 1.2 m diagonally forward by 45 degrees from the sitting position) and implement speech-motion-sensing (step S204). In a case where no negative reaction arises in step S204, the robot operating system next causes the nursing care robot 100 to move to the short-distance position P1 (a position 0.6 m diagonally forward by 70 degrees from the sitting position) and implement speech-motion-sensing (step S205). Next, the robot operating system terminates the execution of the application set at the time t1-1 (step S206).

In addition, in each of step S203, step S204, and step S205, the robot operating system outputs, as evaluation data, a gaze time (a time in which faces or eyes face each other), a speech time, the presence or absence of detection of a smile, and the presence or absence of a negative reaction (step S207).

Next, description is given of a flow of an operation of implementing a plurality of applications in FIG. 29.

First, in the robot operating system, the nursing care robot 100 performs standby charging, and fixed-point watching at the initial position P0 (standard standby position) (step S301). Next, the robot operating system starts a scheduler set at the time t1 (step S302). Next, the robot operating system executes an application A (step S303). As the application A, an application (the user t1-1, the place No. 1, and the individual setting No. 1) set at the time t1-1, an application (the user No. 2, the place No. 2, and the individual setting No. 2) set at the time t1-2, and an application (a user No. n, a place No. n, and individual setting No. n) set at a time t1-*n* are sequentially executed.

Next, the robot operating system performs standby charging of the nursing care robot 100 at a time t1-0. In addition, in the robot operating system, data obtained by executing the application A is stored, and fixed-point watching is performed at the initial position P0 (standard standby position) by the nursing care robot 100 (step S304). Next, the robot operating system starts a scheduler set at a time t2 and executes an application B (step S305). Next, the robot operating system performs standby charging of the nursing care robot 100. In addition, data obtained by executing the application B is stored, and fixed-point watching is performed at the initial position P0 (standard standby position) by the nursing care robot 100 (step S306). Next, the robot operating system starts a scheduler set at a time tn and executes an application n (step S307). Next, the robot operating system performs standby charging of the nursing care robot 100. In addition, data obtained by executing the application B is stored, and fixed-point watching is performed at in the initial-position P0 (standard standby position) by the nursing care robots 100 (step S308).

Next, description is given of a flow of an operation of implementing an application in a case where another application is interrupted in FIG. 30.

First, in the robot operating system, the nursing care robot 100 performs standby charging, and fixed-point watching at the initial position P0 (standard standby position) (step S401). Next, the robot operating system starts a scheduler, and executes the application A (step S402). Next, the robot operating system starts interruption, and executes an interrupt application (e.g., an application F) (step S403). After processing in step S403, in a case where an implementable time is sufficient within the schedule of the application A (an implementation pattern A), the robot operating system next executes the continuation of the application A (step S404). After processing in the step S403, in a case where the implementable time is insufficient within the schedule of the application A and the remaining charge amount of the nursing care robot 100 does not satisfy an necessary amount (an implementation pattern B), the robot operating system next cancels processing of the continuation of the application A (step S405), and then performs standby charging processing of the nursing care robot 100, processing for storing data obtained by executing the application A, and fixed-point watching processing by the nursing care robot 100 (step S406).

After processing in step S403, in a case where the implementable time is insufficient within the schedule of the application A and the remaining charge amount of the nursing care robot 100 satisfies the necessary amount (an implementation pattern C), the robot operating system next starts a new scheduler, and executes the application B (step S407). Next, the robot operating system performs standby charging processing of the nursing care robot 100, processing for storing data obtained by executing the application B, and fixed-point watching processing by the nursing care robot 100 (step S408). Next, the robot operating system starts a new scheduler, and executes the application n (step S409). Next, the robot operating system performs standby charging processing of the nursing care robot 100, processing for storing data obtained by executing the application n, and fixed-point watching processing by the nursing care robot 100 (step S410).

Figure 32:
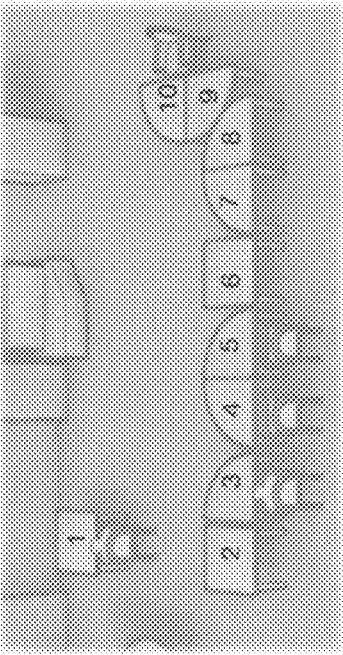
FIG. 32 is an explanatory diagram illustrating an example of a setting interface for performing individual setting for a care-receiving object person by the robot operating system according to the first embodiment.

Next, description is given of a setting interface for performing individual setting in FIG. 32.

In the setting interface, the name and face of the care-receiving object person 101, the place of the seat 404, and the place of the residence room 402 (FIG. 28) are registered. Individual settings about robot applications related to characteristics about dementia and acceptability for each care-receiving object person 101 are registered in judgement of the staff member 200.

For example, in a case where the staff member 200 first introduces the nursing care robot 100 to the care-receiving object person 101, the staff member 200 performs judgement and setting in consideration of the reaction and cognitive characteristics of the care-receiving object person 101. After that, for example, each time change occurs in the reaction or the characteristics during continuing of use, setting is changed in judgement of the staff member 200. In addition, evaluation data after application implementation is transmitted to the staff member 200, and is used as information for making a judgement about setting change. For example, it is possible to register an individual correspondence pattern, and a pattern is selected for the care-receiving object person 101 with a similar tendency, and setting and details are adjusted.

Next, description is given of a flow of the processing operation of the "individual recreation application" in FIGS. 33 and 34.

First, the robot operating system obtains family information of the object person 101 (step S501). Next, the robot operating system prepares for knowing a thing the object person 101 wants to do (step S502). As preparation for knowing the thing, the object person 101 is caused to select a content from provided contents (photographs and the like) outputted (displayed) from the application generator 323 of the center PC 320 to the small information terminal 130 carried by the nursing care robot 100. Next, the robot operating system performs processing for knowing the thing the object person 101 wants to do (step S503). As the processing for knowing the thing the object person 101 want to do, first, the nursing care robot 100 makes a conversation while looking at a photograph outputted (displayed) to the small information terminal 130 to create a "memory talk album". As the photograph, for example, a personal photograph (family photograph) or a general photograph (related photograph) is used. As the family photograph, for example, a photograph with some personal episode is used. As the related photograph, for example, a photograph including a common specialty, a famous product, and a famous place is used. Then, the robot operating system performs sensitivity measurement (a smile, an speech frequency, a voice volume, and the like) of the object person 101 with the nursing care robot 100, and creates a mental activation map and performs evaluation.

In a case where evaluation of the mental activation map created in step S503 is equal to or more than a predetermined number of points (for example, equal to or more than five points), the robot operating system determines that the thing the object person 101 want to do is found (step S504). Next, the robot operating system prepares for deeply knowing the thing the object person 101 wants to do (step S505). To prepare for deeply knowing the thing the object person 101 wants to do, the nursing care robot 100 causes the staff member 200 to look at a result of the mental activation map in step S503 through the small information terminal 130, and causes the staff member 200 to determine contents to be provided for more deeply knowing the thing. Next, the robot operating system performs processing for deeply knowing the thing the object person 101 wants to do (step S506). As the processing for deeply knowing the thing the object person 101 wants to do, first, the nursing care robot 100 makes a conversation while looking at a photograph or while listening to music to create a "want-to-do album". As the photograph, a general photograph (related photograph) is used. As the music, general music (related music) is used. Then, the robot operating system performs sensitivity measurement (a smile, an speech frequency, a voice volume, and the like) of the object person 101 with the nursing care robot 100, and creates a mental activation map and performs evaluation.

In a case where evaluation of the mental activation map created in step S506 is equal to or more than a predetermined number of points (for example, equal to or more than five points), the robot operating system determines that the thing the object person 101 wants to do is found (step S507). Next, the robot operating system prepares for fulfilling the thing the object person 101 wants to do (step S508). To prepare for fulfilling the thing the object person 101 wants to do, the nursing care robot 100 causes the staff member 200 to look at a result of the mental activation map in step S506 through the small information terminal 130, and causes the staff member 200 to determine a thing that the object person 101 can possibly actually do. Next, the robot operating system performs processing for fulfilling the thing the object person 101 wants to do (step S509). As the processing for fulfilling the thing the object person 101 wants to do, first, the nursing care robot 100 carries a tool, and makes a conversation while looking at a photograph or while listening to music, and performs processing by a "fulfillment application". As the photograph, a general photograph (related photograph) is used. In addition, as the music, general music (related music) is used. In addition, as the tool, a general tool (related tool) is used. Then, the robot operating system performs sensitivity measurement (a smile, an speech frequency, a voice volume, and the like) of the object person 101, and creates a mental activation map and performs evaluation.

Through the above processing, the thing the object person 101 wants to do is fulfilled (step S510).

Description is given of a working example of a "watching-vital application" in a story format with reference to FIG. 35. In the robot operating system, it is possible to realize the following nursing care story, for example, in the nursing care room 400 illustrated in FIG. 28 by the "watching-vital application".

A staff member A is worried about a user (care-receiving object person 101) of the living room 401 during assistance in a residence room in the morning, and goes back and forth between the living room 401 and the residence room 402. In the living room 401, right after waking up in the morning, an elderly woman (care-receiving object person 101) looks bored (step S351).

In such a situation, the nursing care robot 100 slowly approaches the elderly woman and performs vital measurement (step S352). The nursing care robot 100 performs vital measurement while telling a favorite story of the elderly woman (step S353). Thus, the staff member A performs assistance in the residence room 402 without anxiety. The elderly woman forgets boredom and enjoys the story (step S354).

Next, description is given of a working example of a "tea serving application" in a story format with reference to FIG. 36. In the robot operating system, it is possible to realize the following nursing care story, for example, in the nursing care room 400 illustrated in FIG. 28 by the "tea serving application".

The staff member A needs to timely serve tea to a user (care-receiving object person 101) who has woken up and come to the living room 401 during wake-up assistance in the residence room 402, and has a high workload. In the living room 401, right after waking up from a nap, an elderly woman (care-receiving object person 101) looks lonely. In addition, the elderly woman has toilet anxiety; therefore, she is not positive about staying hydrated (step S361).

In such a situation, when the elderly woman is seated, the nursing care robot 100 goes to pick up tea for the elderly woman (step S362). The nursing care robot 100 serves tea while talking with the elderly woman and encourages the elderly woman to stay hydrated (step S363). This reduces the workload of the staff member A. The elderly woman forgets loneliness and becomes positive about staying hydrated (step S364).

Next, description is given of a working example of a "snack serving application" in a story format with reference to FIG. 37. In the robot operating system, it is possible to realize the following nursing care story, for example, in the nursing care room 400 illustrated in FIG. 28 by the "snack serving application".

The staff member A needs to timely serve a snack to a user (care-receiving object person 101) who has woken up and come to the living room 401 during wake-up assistance in the residence room 402, and has a high workload. In the living room 401, right after waking up from a nap, an elderly woman (care-receiving object person 101) looks bored. In addition, the elderly woman does not like a new snack; therefore, she is not positive about having the snack (step S371).

In such a situation, when the elderly woman is seated, the nursing care robot 100 goes to pick up a snack for the elderly woman (step S372). The nursing care robot 100 serves the snack while talking with the elderly woman and encourages the elderly woman to have the snack (step S373). This reduces the workload of the staff member A. The elderly woman forgets boredom and has positively eaten up the new snack (step S374).

Next, description is given of a working example of a "wet towel serving application" in a story format with reference to FIG. 38. In the robot operating system, it is possible to realize the following nursing care story, for example, in the nursing care room 400 illustrated in FIG. 28 by the "wet towel serving application".

The staff member A has a high load of serving meals in a kitchen before lunch. In the living room 401 before lunch, an elderly woman (care-receiving object person 101) looks bored. In addition, the elderly woman often forgets to wipe her hands with a wet towel (step S381).

In such a situation, when the elderly woman is seated, the nursing care robot 100 goes to pick up a wet towel (step S382). The nursing care robot 100 hands the wet towel to the elderly woman while talking with the elderly woman, and encourages the elderly woman to wipe her hands (step S383). This reduces the workload of the staff member A. The elderly woman forgets boredom and wipes her hands with the wet bowl (step S384).

Next, description is given of a working example of an "excretion preparation application" in a story format with reference to FIG. 35. In the robot operating system, it is possible to realize the following nursing care story, for example, in the nursing care room 400 illustrated in FIG. 28 by the "excretion preparation application".

The staff member A is in trouble because the staff member A urgently needs additional excretion care supplies. An elderly woman (care-receiving object person 101) who is receiving assistance becomes worried (step S391). An elderly man (care-receiving object person 101) who is waiting in the living room 401 is restless due to long absence of the staff member A (step S392).

In such a situation, the nursing care robot 100 carries a bag with excretion care supplies and goes to the staff member A (step S393). The bag with excretion care supplies contains diapers, cleansing products, and the like. The nursing care robot 100 hands the excretion care supplies to the staff member A (step S394). The absence time of the staff member A is shortened, which makes the elderly man feel relieved (step S395). Thus, the staff member A is happy to be able to save the time and effort for going to get urgently necessary excretion care supplies. The staff member stays with the elderly woman, which makes the elderly woman feel relieved (step S396).

Next, description is given of a "telephone assistance application" with reference to FIG. 40.

For example, due to an influence of various infectious diseases, there is a possibility that prohibition or restriction of family visits to users (the care-receiving object persons 101) in the nursing facility continues for a long period of time. For this reason, there is a growing need for telephone meeting with families. In response to such a need, it is possible for the robot operating system to meet the need by a "telephone assistance application".

For example, as illustrated in FIG. 40, the small information terminal 130 such as a tablet terminal capable of making a call (a voice call or a video call) is mounted on one hand 73 of the nursing care robot 100. For example, the small information terminal 130 is fixed to a thumb-side outer surface of the hand 73. Alternatively, a grip section of the small information terminal 130 is gripped by the hand 73. Thereafter, the "telephone assistance application" is implemented in accordance with a flow illustrated in FIG. 40.

The small information terminal 130 may have, for example, a function of being able to receive and transmit a call. With regard to telephone numbers, the small information terminal 130 may be allowed to transmit or receive a call to or from registered telephone numbers only. For example, a time when making a call may be scheduled mainly for each user, and a call may be automatically made at a fixed time. A point is that the small information terminal 130 that is call-capable is mounted on a tip (hand 73) of a multi-axis manipulator in the nursing care robot 100 and is manipulated into a posture position that is easy for the user to use to enable an approach. Some users have difficulty in twisting their necks and bodies, and even if the small information terminal 130 is placed at a position next to the table 500, it is difficult to make a call. It is to be noted that in a general telepresence robot, the small information terminal 130 is fixed to a trunk frame with no movable axis. Accordingly, it is difficult to place the small information terminal 130 in front of the user in a seated posture, and it is difficult to control both a height position and a pitch angle. Therefore, the user makes a call in a posture difficult for the user.

The user often sits in front of the table 500 while staying in the living room 401, and the table 500 is an obstacle, which makes it difficult to approach from the front. In the robot operating system according to the first embodiment, it is possible for the nursing care robot 100 to extend an arm from a side of the table 500 and place the small information terminal 130 at an optimum posture position for the user. In the case of a video call, it is possible for the robot operating system to capture the face of the user who is a caller by, for example, a camera disposed in the small information terminal 130. The robot operating system performs tracking of the user's face with the camera of the small information terminal 130 with the degree of freedom of the multi-axis manipulator of the nursing care robot 100 (mainly with use of a pitch axis and a yaw axis of a wrist joint), which allows for a video call that always appropriately captures the user's face. In addition, it is possible to perform a call approach using the small information terminal 130 at an optimum position and an optimum angle not only for a user in a seated posture but also for a user in a posture lying on a bed or a reclined posture.

Description is given below of a flow of a processing operation of the "telephone assistance application" in FIG. 40.

First, the robot operating system transmits a call (a voice call or a video call) to a family of a user (care-receiving object person 101) using the small information terminal 130 mounted on the nursing care robot 100, or receives a call (a voice call or a video call) from the family of the user (step S601).

Next, the robot operating system causes the nursing care robot 100 to execute greeting and a talking motion to the user at the long-distance position P3 (step S602). Next, the robot operating system causes the nursing care robot 100 to execute greeting and a talking motion to the user at the medium-distance position P2 (step S603).

Next, the robot operating system causes the nursing care robot 100 to execute greeting and the talking motion to the user at the short-distance position P1. For example, the nursing care robot 100 is caused to give the user an explanation about a call with a family and an explanation about placing the small information terminal 130 with a call function on the table 500 (step S604).

Next, the robot operating system causes the nursing care robot 100 to move the small information terminal 130 mounted on the hand of the nursing care robot 100 to a position that is easy for the user to see, and starts a call (step S605). After the call is finished, the robot operating system causes the nursing care robot 100 to implement greeting and the talking motion to the user. Next, the robot operating system causes the nursing care robot 100 to implement greeting and the talking motion again at the medium-distance position P2, and causes the nursing care robot 100 to return to the initial position P0 (step S606).

Next, description is given of a working example of an "story-telling (a story about a memorable photograph, a photograph about hobbies and preferences, and the like) application" with reference to FIG. 41.

First, the robot operating system causes the nursing care robot 100 to execute greeting and a talking motion to a user (care-receiving object person 101) at the long-distance position P3 (step S701). Next, the robot operating system causes the nursing care robot 100 to execute greeting and the talking motion to the user at the medium-distance position P2 (step S702).

Next, the robot operating system causes the nursing care robot 100 to execute greeting and the talking motion to the user at the short-distance position P1. Here, the robot operating system causes the nursing care robot 100 to execute an explanation about story-telling using a photograph (step S703).

Next, the robot operating system causes the nursing care robot 100 to move the small information terminal 130 such as a tablet terminal mounted on the hand of the nursing care robot 100 to a position that is easy for the user to see (step S704). Then, the robot operating system displays a photograph on the small information terminal 130, and causes the nursing care robot 100 to tell a story corresponding to the content of the photograph. A photograph suitable for hobbies and preferences of each user, a family photograph, or a memorable photograph is used. It is to be noted that, instead of the photograph displayed on the small information terminal 130, a photograph itself may be carried by the nursing care robot 100 and presented to the user.

After finishing story-telling, the robot operating system causes the nursing care robot 100 to implement greeting and the talking motion to the user. Next, the robot operating system causes the nursing care robot 100 to implement greeting and the talking motion again at the medium-distance position P2, and causes the nursing care robot 100 to return to the initial position P0 (step S705).

Next, description is given of a working example of the "excretion preparation application" with reference to FIG. 42.

First, the robot operating system causes the nursing care robot 100 to move to a cabinet 601 in which excretion care tools are stocked in the nursing facility (step S801). Next, the robot operating system causes the nursing care robot 100 to hold a bag with excretion care supplies (before use) placed in the cabinet 601, and moves the nursing care robot 100 (step S802).

Next, the robot operating system causes the nursing care robot 100 to go to a residence room (step S803). Next, the robot operating system causes the nursing care robot 100 to move to a cabinet 602 in the residence room (step S804). Next, the robot operating system causes the nursing care robot 100 to put the bag with excretion care supplies in the cabinet 602 in the residence room (step S805).

Next, description is given of a working example of an "excretion cleanup application" with reference to FIG. 43.

First, the robot operating system causes the nursing care robot 100 to move to the front of the cabinet 602 in a residence room (or a space for placing the bag with excretion care supplies in the residence room) in the nursing facility (step S901). Next, the robot operating system causes the nursing care robot 100 to hold a bag with excretion care supplies (after use) in the cabinet 602 in the residence room (or on a floor surface in the residence room) (step S902).

Next, the robot operating system causes the nursing care robot 100 to move to a dirty utility room on the same floor in the nursing facility (step S903). Next, the robot operating system causes the nursing care robot 100 to move to the front of a cabinet 603 in the dirty utility room and place the bag with excretion care supplies (after use) in the cabinet 603 (or on a floor surface in the dirty utility room) (step S904).

[1.4 Workings and Effects of Robot Operating System]

According to the robot operating system according to the first embodiment, the following workings and effects are obtained.

(Achievement of Acceptability)

1. An active watching application by the robot operating system is implemented, which makes it possible to come close to the care-receiving object person 101, and execute high-quality applications such as active watching, greeting/calming down, vital measurement, tea serving, and story recreation in accordance with the dementia level of the care-receiving object person 101. This is realized by selecting an individual approach corresponding to the object person 101. The term "high quality" as used herein refers to a state in which "acceptability" (staying close without being feared or easy to understand the meanings of speech and motions) is high.
2. Performing an applied application by the robot operating system makes it possible to expect effects such as an improvement in acquisition frequency of vital measurement and an improvement in water drinking frequency by encouragement of hydration as functional effects. An effect of reducing the workload of the staff member 200 as work assistance such as excretion preparation is also achieved.
3. Even in the living room 401 (FIG. 28) or the residence room 402 (FIG. 28) during absence of the staff member 200, it is possible to prevent the care-receiving object person 101 from becoming anxious, and calm down the care-receiving object person 101.
4. The life rhythm of the care-receiving object person 101 is regulated by repeatedly implementing applications according to a schedule.
5. The life rhythm of the care-receiving object person 101 is regulated and the care-receiving object person 101 is prevented from becoming anxious, which leads to stabilization in the entire facility, and also leads to an improvement in efficiency of an entire nursing care work and cost reduction.
6. It is possible for one robot to deal with the care-receiving object persons 101 in one unit (about 10 people) in the nursing facility.
7. The QOL (Quality of Life) of the care-receiving object persons 101 increases.
8. It is possible to reduce the workload of the staff member 200 and carry out a care work with peace of mind.
9. The number of applicants for admission to a facility that has introduced the robot operating system increases.
10. The number of job applicants as staff members 200 for nursing care or staff members 200 for nursing in a facility that has introduced the robot operating system increases.
11. It is possible for the care-receiving object persons 101 to love the nursing care robot 100 like a child or a grandchild, and to live with a role by taking care of the nursing care robot 100.

(Acquisition of Personal Memory)

12. A further effect achieved by realizing achievement of acceptability is achieved by having big data of condition observation. It is also possible to know information about a personal memory, identity, and an episode memory in the mind of each care-receiving object person 101.

(Dream and Desire to be Accomplished)

13. An interaction individual approach during active watching and greeting is also optimized by acquisition of the personal memory. As a result, an ultimate goal is to halt progression of dementia even slightly (change in nursing care level, and making an index from reaction data). Qualitatively, the goal is to increase "smiles of elderly men and elderly women".

It is to be noted that the effects described herein are merely illustrative and non-limiting, and other effects may be included. The same applies to effects of the following other embodiments.

2. Other Embodiments

The technology according to the present disclosure is not limited to description of the embodiments described above, and may be modified in a variety of ways.

For example, the present technology may have the following configurations.

According to the present technology having the following configurations, as viewed from a side direction in a standard posture, a neck joint axis is offset in a backward direction from a shoulder joint axis, and a hip joint axis is offset in a forward direction from the shoulder joint axis. This makes it possible to enhance acceptability for a care-receiving object person.

(1)

A nursing care robot including:

a head section including an eyeball section;

a chest section;

an arm section mounted on the chest section;

a movable neck provided between the head section and the chest section, and having a neck joint axis;

a movable shoulder provided between the chest section and the arm section, and having a shoulder joint axis; and a movable hip provided below the chest section, and having a hip joint axis, in which, as viewed from a side direction in a standard posture, the neck joint axis is offset in a backward direction from the shoulder joint axis, and the hip joint axis is offset in a forward direction from the shoulder joint axis.

(2)

The nursing care robot according to (1), in which $$0 < L2/L1 < 1.5, \text{ and} \quad (1)$$

$$0.2 < L5/L4 < 0.6 \quad (2)$$

are satisfied, where L1 indicates a distance between the hip joint axis and the shoulder joint axis in a front-back direction, L2 indicates a distance between the shoulder joint axis and the neck joint axis in the front-back direction, L4 indicates a distance between the hip joint axis and the shoulder joint axis in an up-down direction, and L5 indicates a distance between the shoulder joint axis and the neck joint axis in the up-down direction.

(3)

The nursing care robot according to (1) or (2), in which $$3.3 < L7/L6 < 5.0 \qquad (3)$$

is satisfied,
where L6 indicates a total head height in the standard posture, and L7 indicates a height in the standard posture.

(4)

The nursing care robot according to any one of (1) to (3), in which the eyeball section is disposed at a position lower than a center position in an up-down direction of the head section.

(5)

The nursing care robot according to (4), in which $$0.2 < L17/L6 < 0.5 \qquad (4)$$

is satisfied,
where L6 indicates a total head height in the standard posture, and L17 indicates a distance from a center position of the eyeball section to a bottom of a chin of the head section in the up-down direction.

(6)

The nursing care robot according to any one of (1) to (5), in which $$0.3 < L5/L6 < 0.6 \qquad (5)$$

is satisfied,
where L5 indicates a distance between the shoulder joint axis and the neck joint axis in an up-down direction, and L6 indicates a total head height in the standard posture.

(7)

The nursing care robot according to any one of (1) to (6), in which $$1.3 < L18/L17 < 2.5, \text{ and} \qquad (6)$$

$$0.4 < L19/L17 \le 1.0 \qquad (7)$$

are satisfied,
where L17 indicates a distance from a center position of the eyeball section to a bottom of a chin of the head section in an up-down direction, L18 indicates a distance from the center position of the eyeball section to the shoulder joint axis in the up-down direction, and L19 indicates a distance from the center position of the eyeball section to the neck joint axis in the up-down direction.

(8)

The nursing care robot according to any one of (1) to (7), in which a motion range of a pitch axis of the neck is configured to be made larger in an upward direction than in a downward direction.

(9)

The nursing care robot according to any one of (1) to (8), in which a face front surface section of the head section is configured to be located behind a front surface section of the chest section as viewed from the side direction in the standard posture.

(10)

The nursing care robot according to (9), in which $$1 < L22/L21 < 1.3 \qquad (8)$$

is satisfied,
where L21 indicates a distance from the neck joint axis to the face front surface section of the head section as viewed from the side direction in the standard posture, and L22 indicates a distance from the neck joint axis to the front surface section of the chest section as viewed from the side direction in the standard posture.

(11)

The nursing care robot according to any one of (1) to (10), in which a distance image sensor is provided on a front upper section of the head section.

(12)

The nursing care robot according to any one of (1) to (11), in which a vital sensor is provided on a front upper section of the chest section.

(13)

The nursing care robot according to any one of (1) to (12), in which
the eyeball section includes
a transparent solid cylindrical section having a first end surface and a second end surface,
a display that is provided on side of the first end surface of the cylindrical section, and displays an operation of an iris, and
a hemispherical transparent spherical section that is provided on side of the second end surface of the cylindrical section, and outputs display light from the display incoming through the cylindrical section.

(14)

The nursing care robot according to (13), in which a center position of an eyeball of the eyeball section is configured to be offset inward from a center position of an outer periphery of the spherical section.

This application claims the priority on the basis of Japanese Patent Application No. 2021-97442 filed on Jun. 10, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A robot comprising:
a head section including an eyeball section;
a chest section;
an arm section mounted on the chest section;
a movable neck provided between the head section and the chest section, and having a neck joint axis;

a movable shoulder provided between the chest section and the arm section, and having a shoulder joint axis; and
a movable hip provided below the chest section, and having a hip joint axis, wherein,
as viewed from a side direction in an upright posture, the neck joint axis is offset in a backward direction from the shoulder joint axis, and the hip joint axis is offset in a forward direction from the shoulder joint axis, wherein
the eyeball section includes
  a transparent solid cylindrical section having a first end surface and a second end surface,
  a display that is provided on side of the first end surface of the transparent solid cylindrical section, and displays an operation of an iris, and
  a hemispherical transparent spherical section that is provided on side of the second end surface of the transparent solid cylindrical section and outputs display light from the display incoming through the transparent solid cylindrical section, and wherein
a center position of an eyeball of the eyeball section is configured to be offset inward from a center position of an outer periphery of the hemispherical transparent spherical section.

2. The robot according to claim 1, wherein $0 < L2/L1 < 1.5$, and $0.2 < L5/L4 < 0.6$ are satisfied,
where L1 indicates a distance between the hip joint axis and the shoulder joint axis in a front-back direction, L2 indicates a distance between the shoulder joint axis and the neck joint axis in the front-back direction, L4 indicates a distance between the hip joint axis and the shoulder joint axis in an up-down direction, and L5 indicates a distance between the shoulder joint axis and the neck joint axis in the up-down direction.

3. The robot according to claim 1, wherein $3.3 < L7/L6 < 5.0$ is satisfied,
where L6 indicates a total head height in the upright posture, and L7 indicates a height of the robot in the upright posture.

4. The robot according to claim 1, wherein
the eyeball section is disposed at a position lower than a center position in an up-down direction of the head section.

5. The robot according to claim 4, wherein $0.2 < L17/L6 < 0.5$ is satisfied,
where L6 indicates a total head height in the upright posture, and L17 indicates a distance from a center position of the eyeball section to a bottom of a chin of the head section in the up-down direction.

6. The robot according to claim 1, wherein $0.3 < L5/L6 < 0.6$ is satisfied,
where L5 indicates a distance between the shoulder joint axis and the neck joint axis in an up-down direction, and L6 indicates a total head height in the upright posture.

7. The robot according to claim 1, wherein $1.3 < L18/L17 < 2.5$, and $0.4 < L19/L17 \leq 1.0$ are satisfied,
where L17 indicates a distance from a center position of the eyeball section to a bottom of a chin of the head section in an up-down direction, L18 indicates a distance from the center position of the eyeball section to the shoulder joint axis in the up-down direction, and L19 indicates a distance from the center position of the eyeball section to the neck joint axis in the up-down direction.

8. The robot according to claim 1, wherein
a motion range of a pitch axis of the movable neck is configured to be made larger in an upward direction than in a downward direction.

9. The robot according to claim 1, wherein
a face front surface section of the head section is configured to be located behind a front surface section of the chest section as viewed from the side direction in the upright posture.

10. The robot according to claim 9, wherein $$0 < L2/L1 < 1.5, \text{ and} \qquad (1)$$

$$0.2 < L5/L4 < 0.6 \qquad (2)$$

is satisfied,
where L21 indicates a distance from the neck joint axis to the face front surface section of the head section as viewed from the side direction in the upright posture, and L22 indicates a distance from the neck joint axis to the front surface section of the chest section as viewed from the side direction in the upright posture.

11. The robot according to claim 1, wherein a distance image sensor is provided on a front upper section of the head section.

12. The robot according to claim 1, wherein a vital sensor is provided on a front upper section of the chest section.

* * * * *